US012634933B2

(12) United States Patent
Yang et al.

(10) Patent No.: US 12,634,933 B2
(45) Date of Patent: May 19, 2026

(54) DISTRIBUTED TRANSMISSION ACROSS 80MHZ

(71) Applicant: QUALCOMM Incorporated, San Diego, CA (US)

(72) Inventors: Lin Yang, San Diego, CA (US); Bin Tian, San Diego, CA (US); Youhan Kim, Saratoga, CA (US); Qifan Chen, Newark, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 18/394,707

(22) Filed: Dec. 22, 2023

(65) Prior Publication Data

US 2024/0365320 A1     Oct. 31, 2024

Related U.S. Application Data

(60) Provisional application No. 63/499,176, filed on Apr. 28, 2023.

(51) Int. Cl.
*H04W 28/02*          (2009.01)
*H04L 1/00*           (2006.01)
(Continued)

(52) U.S. Cl.
CPC ....... *H04W 72/1273* (2013.01); *H04L 1/0068* (2013.01); *H04L 5/0041* (2013.01); *H04W 72/0453* (2013.01)

(58) Field of Classification Search
CPC ............. H04L 27/2627; H04L 27/2602; H04L 5/0092; H04L 5/0041; H04L 1/0068;
(Continued)

(56) References Cited

U.S. PATENT DOCUMENTS

2021/0392661 A1* 12/2021 Cao ................... H04W 72/0453
2022/0255690 A1*  8/2022 Hu ......................... H04L 1/0008
(Continued)

FOREIGN PATENT DOCUMENTS

WO     WO-2022245463 A1    11/2022
WO     WO-2023132662 A1     7/2023

OTHER PUBLICATIONS

International Search Report and Written Opinion—PCT/US2024/022454—ISA/EPO—Aug. 7, 2024.

*Primary Examiner* — Phuoc H Doan
(74) *Attorney, Agent, or Firm* — Norton Rose Fulbright US LLP

(57)          ABSTRACT

This disclosure provides methods, components, devices and systems for extending distributed resource units (dRUs) beyond 80 MHz. Some aspects more specifically relate to supporting enhanced tone distribution mapping schemes and signaling. In some examples, a wireless station may receive, from an access point, scheduling information for a physical layer (PHY) protocol data unit (PDU) (PPDU) to be transmitted by one or more wireless stations including the wireless station over a wireless channel. The scheduling information may indicate one or more dRUs within the wireless channel, each dRU comprising a respective set of tones distributed across a distribution bandwidth of the wireless channel. The distribution bandwidth may be larger than 80 MHz, and the one or more dRUs including a first dRU allocated to the wireless station. The wireless station may modulate a plurality of symbols for the PPDU onto the set of tones of the first dRU. The wireless station may transmit the plurality of symbols via the first dRU.

52 Claims, 24 Drawing Sheets

(51) Int. Cl.
  *H04L 5/00*        (2006.01)
  *H04W 72/0453*    (2023.01)
  *H04W 72/1273*    (2023.01)
(58) Field of Classification Search
  CPC ......... H04W 72/1273; H04W 72/0453; H04W
              74/0816; H04W 24/02; H04W 24/08
  See application file for complete search history.

(56)                References Cited

U.S. PATENT DOCUMENTS

| 2022/0311565 A1 | 9/2022 | Hu et al. |
| 2022/0329373 A1 | 10/2022 | Hu et al. |
| 2023/0035113 A1 | 2/2023 | Shellhammer |
| 2023/0124579 A1 | 4/2023 | Yang et al. |

* cited by examiner

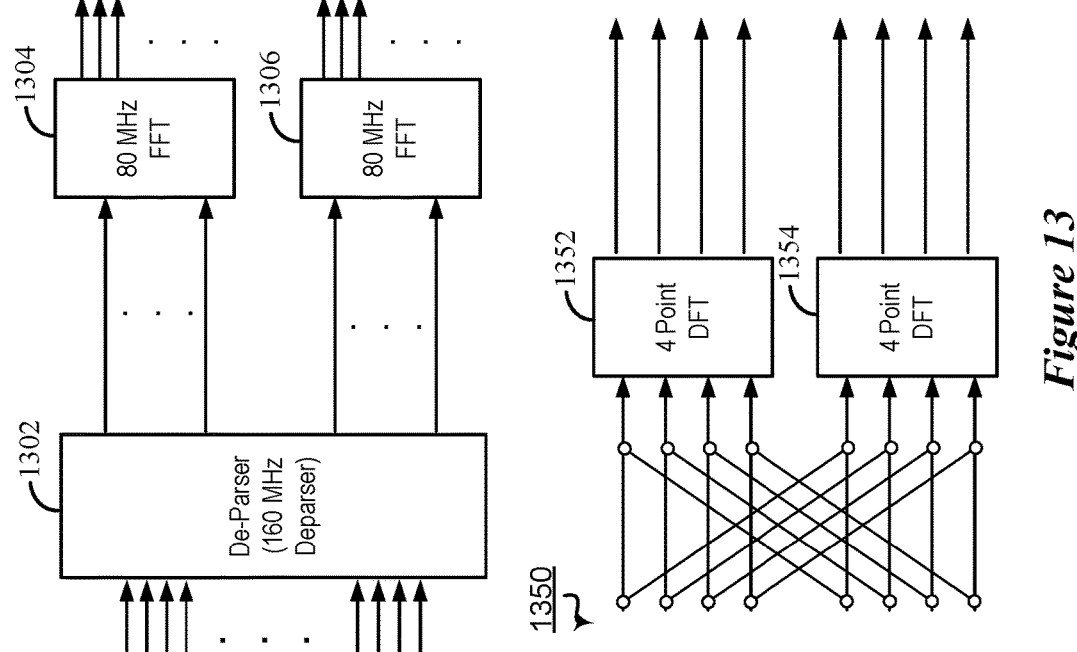
*Figure 13*

1400

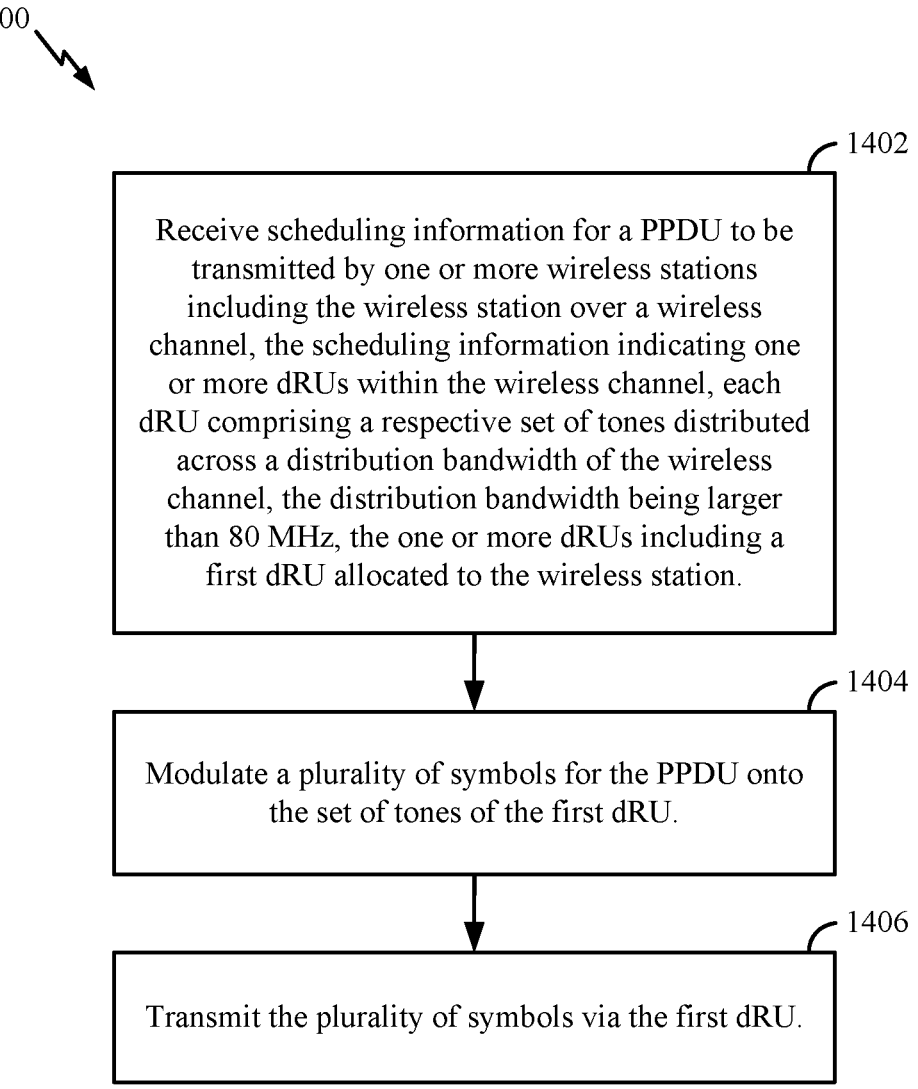

1402

Receive scheduling information for a PPDU to be
transmitted by one or more wireless stations
including the wireless station over a wireless
channel, the scheduling information indicating one
or more dRUs within the wireless channel, each
dRU comprising a respective set of tones distributed
across a distribution bandwidth of the wireless
channel, the distribution bandwidth being larger
than 80 MHz, the one or more dRUs including a
first dRU allocated to the wireless station.

1404

Modulate a plurality of symbols for the PPDU onto
the set of tones of the first dRU.

1406

Transmit the plurality of symbols via the first dRU.

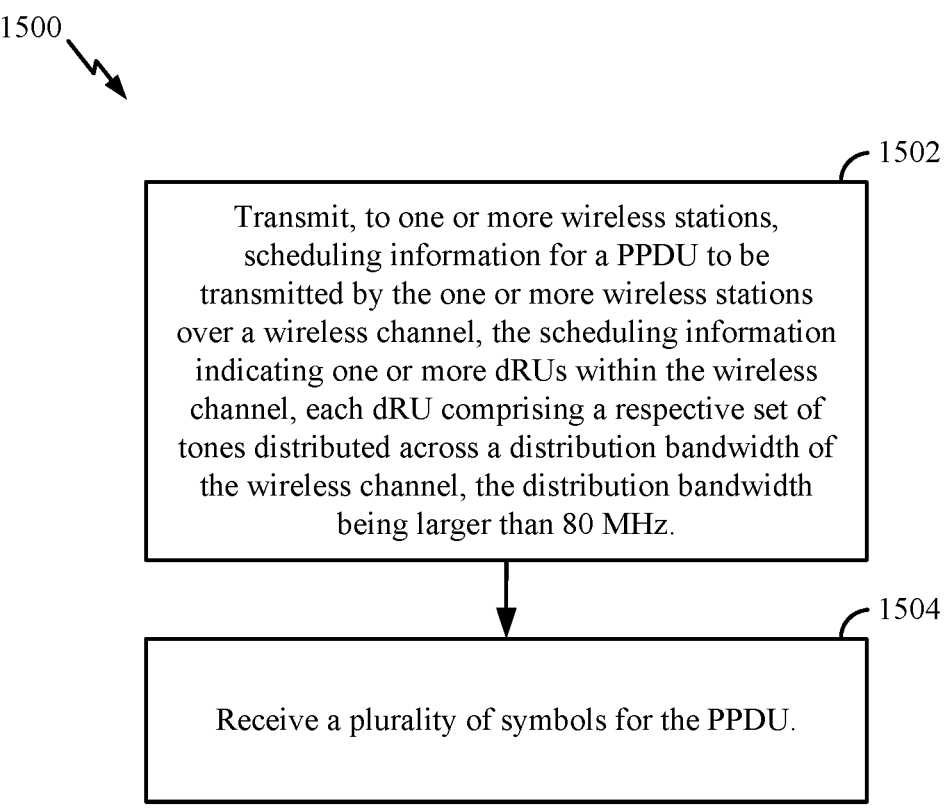

1502

Transmit, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz.

1504

Receive a plurality of symbols for the PPDU.

2000

| | dRU1 | dRU2 | dRU3 | dRU4 |
|---|---|---|---|---|
| 106-tone dRU i=1:16 | dRU1<br>[-1002:72:-570,-493:72:-61, 88:72:448,525:72:957]<br>[-978:72:-546,-469:72:-109,40:72:472,549:72:981]<br>[-962:72:-530,-453:72:-93,56:72:488,565:72:925]<br>[-946:72:-586,-509:72:-77,72:72:504,581:72:941]<br><br>dRU5<br>[-1000:72:-568,-491:72:-59, 90:72:450,527:72:959]<br>[-976:72:-544,-467:72:-107,42:72:474,551:72:983]<br>[-960:72:-528,-451:72:-91,58:72:490,567:72:927]<br>[-944:72:-584,-507:72:-75,74:72:506,583:72:943] | dRU2<br>[-994:72:-562,-485:72:-53, 96:72:456,533:72:965]<br>[-970:72:-538,-461:72:-101,48:72:480,557:72:989]<br>[-954:72:-522,-445:72:-85,64:72:496,573:72:933]<br>[-938:72:-578,-501:72:-69,80:72:440,517:72:949]<br><br>dRU6<br>[-992:72:-560,-483:72:-51, 98:72:458,535:72:967]<br>[-968:72:-536,-459:72:-99,50:72:482,559:72:991]<br>[-952:72:-520,-443:72:-83,66:72:498,575:72:935]<br>[-936:72:-576,-499:72:-67,82:72:442,519:72:951] | dRU3<br>[-990:72:-558,-481:72:-49, 100:72:460,537:72:969]<br>[-966:72:-534,-457:72:-97,52:72:484,561:72:993]<br>[-950:72:-518,-441:72:-81,68:72:500,577:72:937]<br>[-934:72:-574,-497:72:-65,84:72:444,521:72:953]<br><br>dRU7<br>[-988:72:-556,-479:72:-47,102:72:462,539:72:971]<br>[-964:72:-532,-455:72:-95,54:72:486,563:72:995]<br>[-948:72:-516,-439:72:-79,70:72:502,579:72:939]<br>[-932:72:-572,-495:72:-63,86:72:446,523:72:955] | dRU4<br>[-998:72:-566,-489:72:-57, 92:72:452,529:72:961]<br>[-974:72:-542,-465:72:-105,44:72:476,553:72:985]<br>[-958:72:-526,-449:72:-89,60:72:492,569:72:929]<br>[-942:72:-582,-505:72:-73,76:72:508,585:72:945]<br><br>dRU8<br>[-996:72:-564,-487:72:-55, 94:72:454,531:72:963]<br>[-972:72:-540,-463:72:-103,46:72:478,555:72:987]<br>[-956:72:-524,-447:72:-87,62:72:494,571:72:931]<br>[-940:72:-580,-503:72:-71,78:72:438,515:72:947] |
| | dRU9<br>dRU1+1 | dRU10<br>dRU2+1 | dRU11<br>dRU3+1 | dRU12<br>dRU4+1 |
| | dRU13<br>dRU5+1 | dRU14<br>dRU6+1 | dRU15<br>dRU7+1 | dRU16<br>dRU8+1 |
| 242-tone dRU i=1:8 | dRU1<br>[-1010:8:-522, -509:8:-45, 40:8:504, 517:8:1005] | dRU2<br>dRU1+4 | dRU3<br>dRU1+2 | dRU4<br>[-1004:8:-516, -503:8:-39, 46:8:502, 515:8:1011] |
| | dRU5<br>dRU1+1 | dRU6<br>dRU2+1 | dRU7<br>dRU3+1 | dRU8<br>dRU4+1 |
| 484-tone dRU i=1:4 | dRU1<br>[-1010:4:-518, -509:4:-41, 40:4:508, 517:4:1009] | dRU2<br>[-1008:4:-516, -507:4:-39, 42:4:506, 515:4:1011] | | |
| | dRU3<br>dRU1+1 | dRU4<br>dRU2+1 | | |
| 996-tone dRU i=1:2 | dRU1<br>[-1012:2:-516, -509:2:-13, 12:2:508, 515:2:1011] | dRU2<br>dRU1+1 | | |

*Figure 20A*

2002
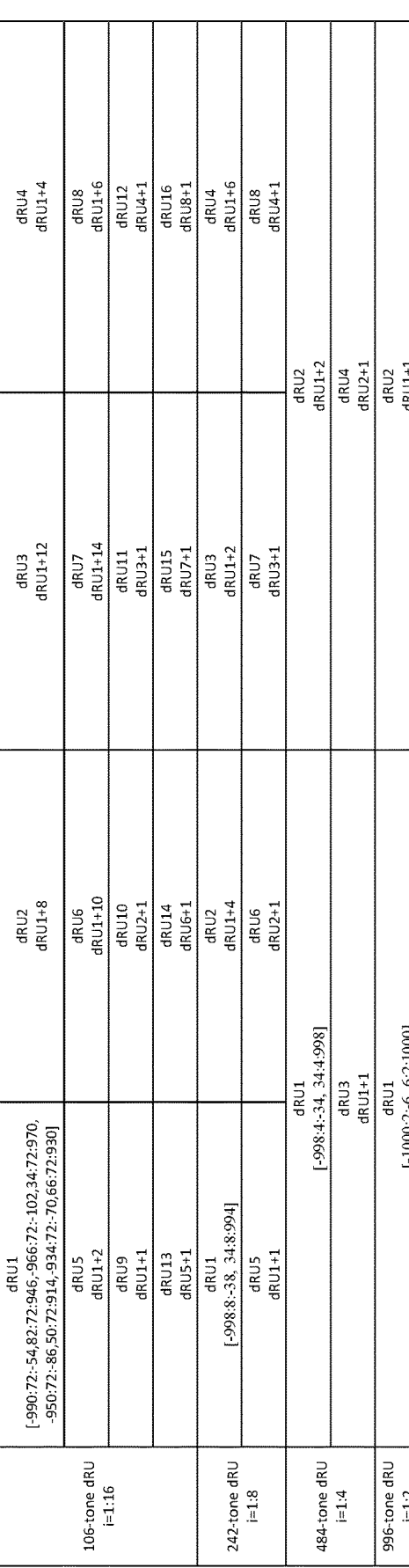
| | | | | |
|---|---|---|---|---|
| 106-tone dRU i=1:16 | dRU1 [-990:72:-54,82:72:946,-966:72:-102,34:72:970, -950:72:-86,50:72:914,-934:72:-70,66:72:930] | dRU2 dRU1+8 | dRU3 dRU1+12 | dRU4 dRU1+4 |
| | dRU5 dRU1+2 | dRU6 dRU1+10 | dRU7 dRU1+14 | dRU8 dRU1+6 |
| | dRU9 dRU1+1 | dRU10 dRU2+1 | dRU11 dRU3+1 | dRU12 dRU4+1 |
| | dRU13 dRU5+1 | dRU14 dRU6+1 | dRU15 dRU7+1 | dRU16 dRU8+1 |
| 242-tone dRU i=1:8 | dRU1 [-998:8:-38, 34:8:994] | dRU2 dRU1+4 | dRU3 dRU1+2 | dRU4 dRU1+6 |
| | dRU5 dRU1+1 | dRU6 dRU2+1 | dRU7 dRU3+1 | dRU8 dRU4+1 |
| 484-tone dRU i=1:4 | dRU1 [-998:4:-34, 34:4:998] | | dRU2 dRU1+2 | |
| | dRU3 dRU1+1 | | dRU4 dRU2+1 | |
| 996-tone dRU i=1:2 | dRU1 [-1000:2:-6, 6:2:1000] | | dRU2 dRU1+1 | |
*Figure 20B*

2100

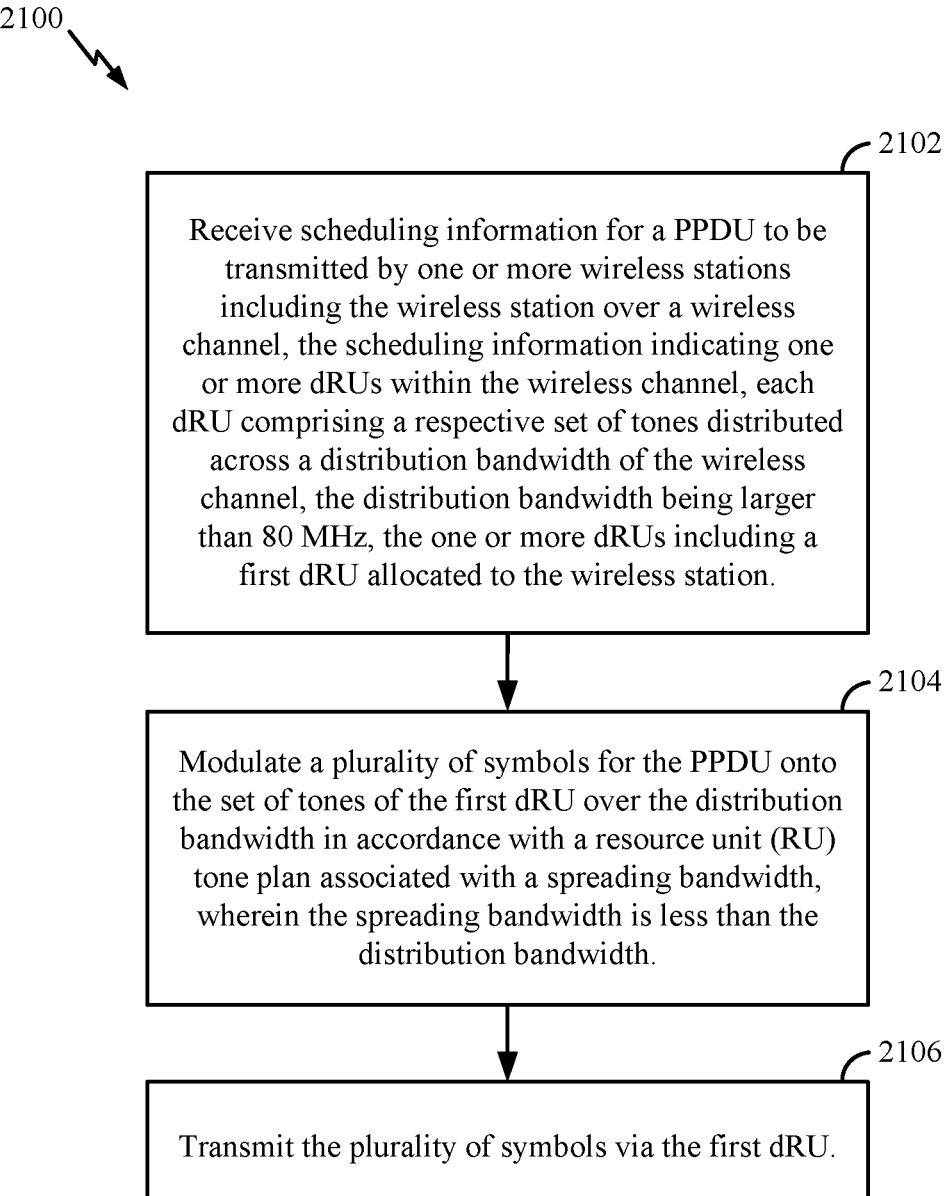

2102

Receive scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station.

2104

Modulate a plurality of symbols for the PPDU onto the set of tones of the first dRU over the distribution bandwidth in accordance with a resource unit (RU) tone plan associated with a spreading bandwidth, wherein the spreading bandwidth is less than the distribution bandwidth.

2106

Transmit the plurality of symbols via the first dRU.

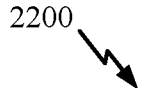

2202

Transmit, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz.

2204

Receive a plurality of symbols for the PPDUin accordance with a tone mapping of a resource unit (RU) tone plan associated with a spreading bandwidth, wherein the spreading bandwidth is less than the distribution bandwidth.

*Figure 22*

DISTRIBUTED TRANSMISSION ACROSS 80MHZ

CROSS-REFERENCE TO RELATED APPLICATIONS

This application claims the benefit of U.S. Provisional Patent Application No. 63/499,176, entitled, "DISTRIBUTED TRANSMISSION ACROSS 80 MHZ," filed on Apr. 28, 2023, which is expressly incorporated by reference herein in its entirety.

TECHNICAL FIELD

This disclosure relates generally to wireless communication, and more specifically, to distributed transmissions including tones spread over bandwidths greater than 80 megahertz (MHz), as well as enhanced distribution and signaling schemes.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some wireless communication networks, including WLAN networks, transmission with distributed resource units (dRUs), often referred to as distributed transmissions, can be used to overcome power spectral density (PSD) limitations, which may be imposed by regulators of the wireless medium. For example, with respect to uplink OFDMA communications from multiple STAs, each STA may spread the "tones" of their allocated resource units (RUs) over a portion (which may be referred to as a "spreading bandwidth") of the bandwidth of a wireless channel. This spreading of the tones allocated to each individual device among a wider bandwidth enables the device to transmit symbols on each of the distributed tones with a higher power while still satisfying the PSD limitations. The increased transmit power increases a gain of the transmitted signal, enabling extended range and/or higher throughput.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless station (STA). The wireless STA includes one or more memories storing processor-readable code and one or more processors coupled with the one or more memories and individually or collectively operable to receive, from an access point (AP), scheduling information for a physical layer (PHY) protocol data unit (PDU) (PPDU) to be transmitted by one or more wireless stations including the wireless station over a wireless channel, the scheduling information indicating one or more distributed resource units (dRUs) within the wireless channel, each dRU comprising a respective set of tones distributed across a distribution bandwidth of the wireless channel, the distribution bandwidth being larger than 80 MHz, the one or more dRUs including a first dRU allocated to the wireless station; modulate a plurality of symbols for the PPDU onto the set of tones of the first dRU; and transmit the plurality of symbols via the first dRU.

Another innovative aspect of the subject matter described in this disclosure can be implemented in a method for wireless communication performed by a wireless STA. The method includes: receiving, from an AP, scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station; modulating a plurality of symbols for the PPDU onto the set of tones of the first dRU; and transmitting the plurality of symbols via the first dRU.

Another innovative aspect of the subject matter described in this disclosure can be implemented in an apparatus configured for wireless communication. The apparatus includes means for receiving, from an AP, scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station; means for modulating a plurality of symbols for the PPDU onto the set of tones of the first dRU; and means for transmitting the plurality of symbols via the first dRU.

Another innovative aspect of the subject matter described in this disclosure can be implemented in a non-transitory computer-readable medium storing instructions that, when executed by a processor, cause the processor to perform operations including: receiving, from an AP, scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station; modulating a plurality of symbols for the PPDU onto the set of tones of the first dRU; and transmitting the plurality of symbols via the first dRU.

Another innovative aspect of the subject matter described in this disclosure can be implemented in an AP. The AP includes one or more memories storing processor-readable code and one or more processors coupled with the one or more memories and individually or collectively operable to: transmit, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and receive a plurality of symbols for the PPDU.

Another innovative aspect of the subject matter described in this disclosure can be implemented in a method for wireless communication performed by an AP. The method includes: transmitting, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and receiving a plurality of symbols for the PPDU.

Another innovative aspect of the subject matter described in this disclosure can be implemented in an apparatus configured for wireless communication. The apparatus includes: means for transmitting, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and means for receiving a plurality of symbols for the PPDU.

Another innovative aspect of the subject matter described in this disclosure can be implemented in a non-transitory computer-readable medium storing instructions that, when executed by a processor, cause the processor to perform operations including: transmitting, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and receiving a plurality of symbols for the PPDU.

Details of one or more examples of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 13 shows a block diagram of an example of a deparsing process and deparsing architecture that is configured to perform distributed tone demapping.

FIG. 14 shows a flowchart illustrating an example process performable by a wireless communication device that supports enhanced distributed transmission operations.

FIG. 15 shows a flowchart illustrating another example process performable by a wireless communication device that supports enhanced distributed transmission operations.

FIGS. 20A and 20B each show an example of a distributed resource unit tone mapping index table that supports enhanced distributed transmission operations.

FIG. 21 shows a flowchart illustrating another example process performable by a wireless communication device that supports enhanced distributed transmission operations.

FIG. 22 shows a flowchart illustrating another example process performable by a wireless communication device that supports enhanced distributed transmission operations.

Like reference numbers and designations in the various drawings indicate like elements.

DETAILED DESCRIPTION

Figure 1:
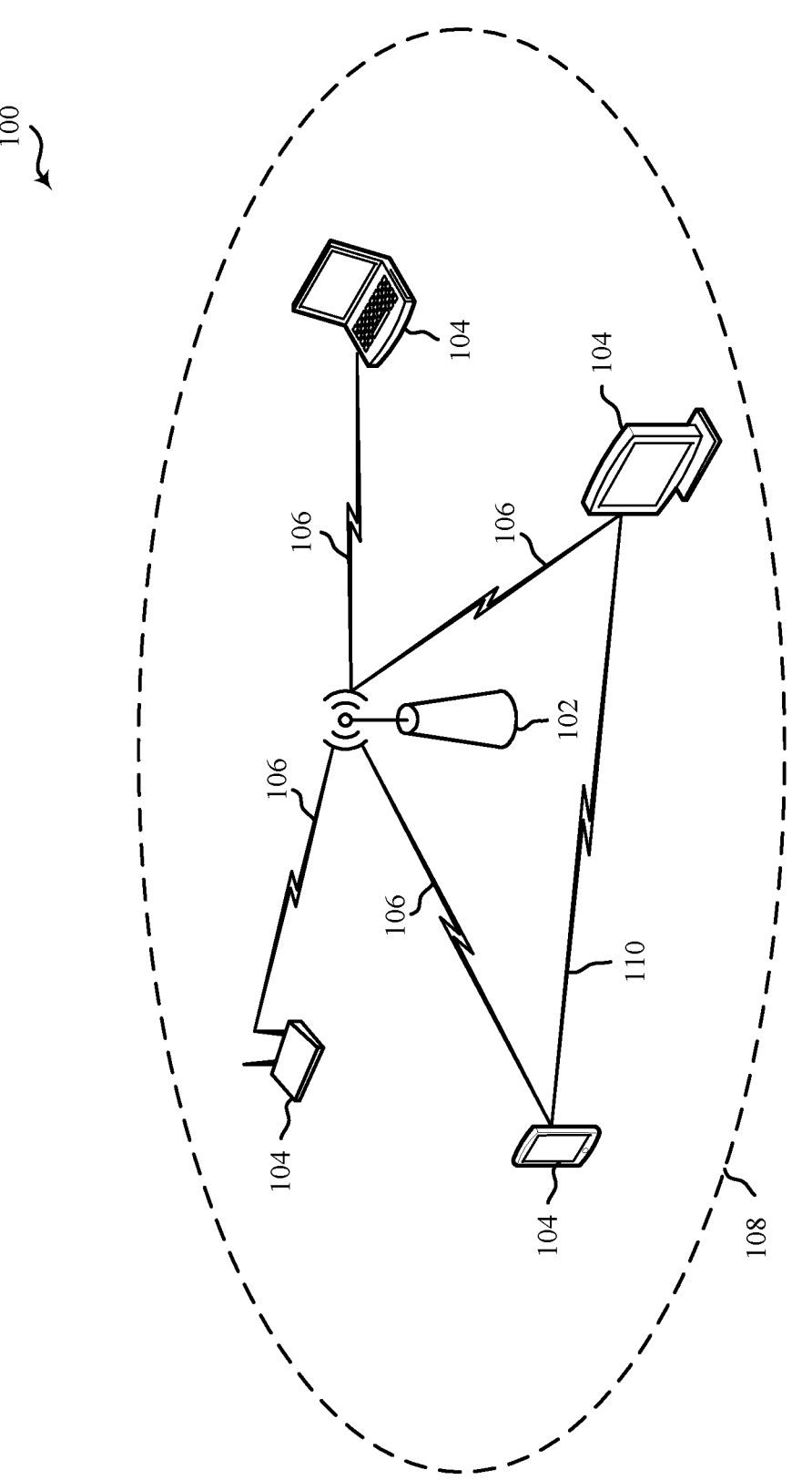
FIG. 1 shows a pictorial diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to wireless communication, and more particularly, to enhanced distributed transmissions. Some aspects more specifically relate to tone distribution schemes and signaling for supporting the extension of distributed resource unit (dRU) transmissions beyond an 80 MHz bandwidth. In some examples, each wireless station that is to participate in an UL OFDMA distributed transmission may receive, from an access point (AP), scheduling information for a physical layer (PHY) protocol data unit (PDU) (PPDU) to be transmitted by the wireless stations over a wireless channel. The scheduling information may indicate one or more dRUs for each of the wireless stations within the wireless channel, each dRU comprising a respective set of tones distributed across a distribution bandwidth of the wireless channel, which may be larger than 80 MHz (e.g., 160 MHz, 240 MHz, 320 MHz, or larger). Each wireless station may modulate and transmit a plurality of modulation symbols for the PPDU onto the respective set of tones of the respective dRU allocated to that wireless station.

In some examples, to modulate the plurality of symbols for the PPDU onto the set of tones (distributed tones) of a dRU, the associated wireless station may first determine a tone distribution for or associated with contiguous, non-distributed tones of an allocated logical resource unit (RU). The tone distribution may indicate how to distribute the tones of the logical RU to determine the tone locations of the distributed tones of the dRU. The wireless station may then map the symbols corresponding to the logical RU to the distributed tones of the first dRU. The tone distribution may be referred to as a tone distribution plan or pattern, and the act of determining the distributed tones and modulating the symbols on the distributed tones may be referred to as distributed tone mapping.

In some examples, the distributed tones for the distributed tone mapping are determined in a two-stage process. For example, performance of a distributed tone mapping process may include a first stage of mapping or distributing tones (such as tones for data symbols and tones for LTF symbols) over a spreading bandwidth (for example, an 80 MHz subchannel or segment). In a second stage of the distributed tone mapping process, these partially-distributed tones are mapped or distributed a second time over a distribution bandwidth larger than the initial spreading bandwidth. In some examples, the distribution bandwidth may extend throughout a wireless channel, such as a 160 MHz, 240 MHz, 320 MHz or larger channel. Such a wireless channel may be segmented into 80 MHz subchannels or segments. The second stage of the distributed tone mapping process may include increasing a spacing (for example, in tones) between each adjacent modulation symbol or tone, re-distributing the partially distributed modulation symbols according to a second tone distribution scheme for the larger distribution bandwidth, or alternating/interleaving the partially distributed modulation symbols for a particular device with second partially distributed modulation symbols for one or more other devices.

In some other examples, the distributed tones for the distributed tone mapping are determined in a one-stage process. For example, the performance of a distributed tone mapping process may be a single-stage process that includes mapping allocated tones of a RU across the entire distribution bandwidth of the transmission or channel, according to a new distributed tone distribution plan or scheme for larger bandwidths, such as a new dedicated distributed tone distribution plan for 160 MHz, 240 MHz, or 320 MHz bandwidths that differs from the current distributed tone distribution plan for 80 MHz bandwidths (or a factor thereof).

In some examples, the determination of the distributed tones for the distributed tone mapping is performed using a segment parser or a quantized segment parser (also referred to as simply a quantized parser). For example, a device may be allocated an amount of tones across a distribution bandwidth wider than 80 MHz and the device may segment a portion of the allocated tones to two or more 80 MHz blocks or segments of the distribution bandwidth (e.g., 160 MHz, 240 MHz, or 320 MHz) according to a spreading bandwidth (e.g., 80 MHz). The device may use a round robin type parser to segment or split the allocated tones into groups corresponding to the two or more 80 MHz segments of the distribution bandwidth. After the allocated tones are segmented or split into the respective 80 MHz blocks of bandwidth, the segmented tones are distributed amongst their respective 80 MHz block of bandwidth according to a stored (e.g., standard specification specified) tone distribution scheme or to a locally determined tone distribution scheme.

In some other examples, the distributed tone mapping for distribution bandwidths larger than 80 MHz is performed according to an upclocked version of a currently specified existing 80 MHz tone distribution pattern. In such examples, the determination of the distributed tones for the distributed tone mapping may be performed in a one-stage or a two-stage process. For example, an upclocked tone plan of the 80 MHz tone distribution pattern may be used to distribute the allocated tones over a wider distribution bandwidth, such as 160 MHz, 240 MHz, or 320 MHz. As another example, a wireless station may perform a conventional 80 MHz tone mapping to obtain partially distributed tones and may then increase a tone spacing between each partially-distributed tone by a factor, such as 2 or 4, to further spread the partially-distributed tones from 80 MHz of bandwidth to the wider 160 or 320 MHz bandwidth.

Particular aspects of the subject matter described in this disclosure can be implemented to realize one or more of the following potential advantages. In some examples, by extending dRUs past 80 MHz, the described techniques can be used to increase transmission power without increasing PSD, and thus satisfy a PSD limitation or requirement while using a higher transmission power per symbol or tone, such as data symbols, pilot symbols, or both. Increasing the transmit power per symbol or tone enables higher power gains, which increases signal-to-noise ratio (SNR) and may increase throughput and transmission range. In some examples, by extending dRUs past 80 MHz, the described techniques can be used to increase channel bandwidth of transmissions, such as transmission capacity. Increasing the channel bandwidth enables an increased amount of tones to be used in a transmission and enables an increased amount of tones for a particular dRU. Using increased tones per dRU or per transmission enables increased throughput and higher transmission power and gain for a given PSD.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHz, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

Figure 2:
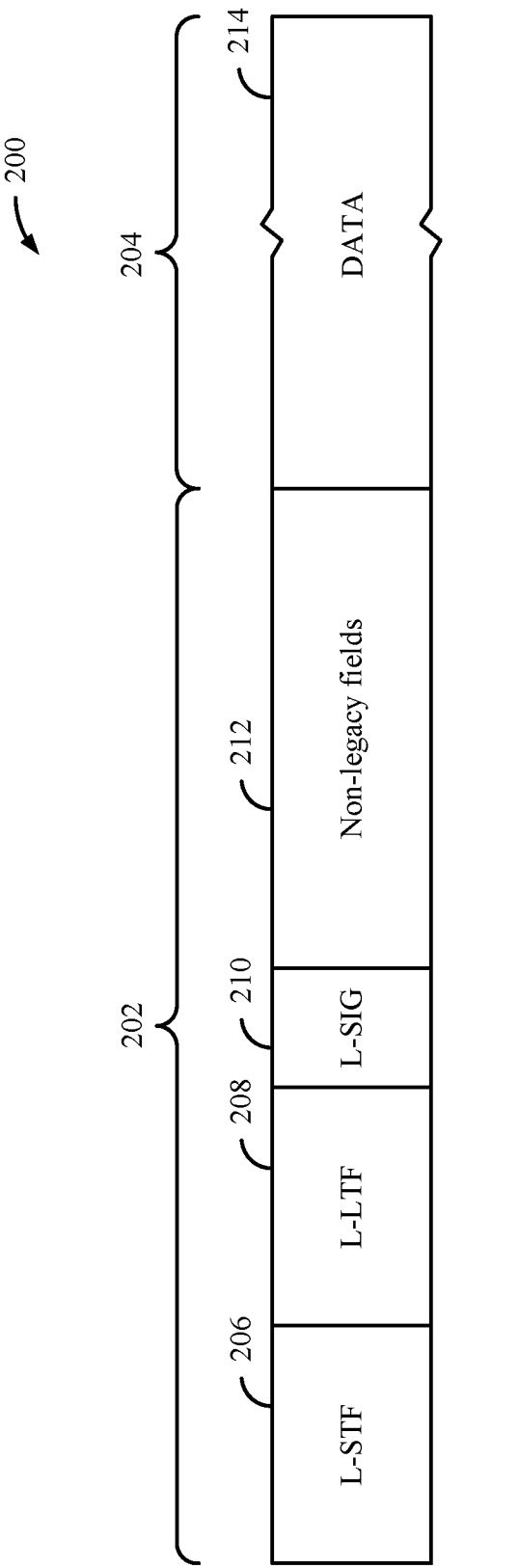
FIG. 2 shows an example protocol data unit (PDU) usable for communications between a wireless access point and one or more wireless stations.

FIG. 2 shows an example protocol data unit (PDU) 200 usable for wireless communication between a wireless AP 102 and one or more wireless STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two symbols, a legacy long training field (L-LTF) 208, which may consist of two symbols, and a legacy signal field (L-SIG) 210, which may consist of two symbols. The legacy portion of the preamble 202 may be configured according to the IEEE 802.11a wireless communication protocol standard. The preamble 202 also may include a non-legacy portion including one or more non-legacy fields 212, for example, conforming to one or more of the IEEE 802.11 family of wireless communication protocol standards.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine (for example, obtain, select, identify, detect, ascertain, calculate, or compute) a duration of the PDU and to use the determined duration to avoid transmitting on top of the PDU. The legacy portion of the preamble, including the L-STF 206, the L-LTF 208 and the L-SIG 210, may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of MAC protocol data units (MPDUs) or an aggregated MPDU (A-MPDU).

Figure 3:
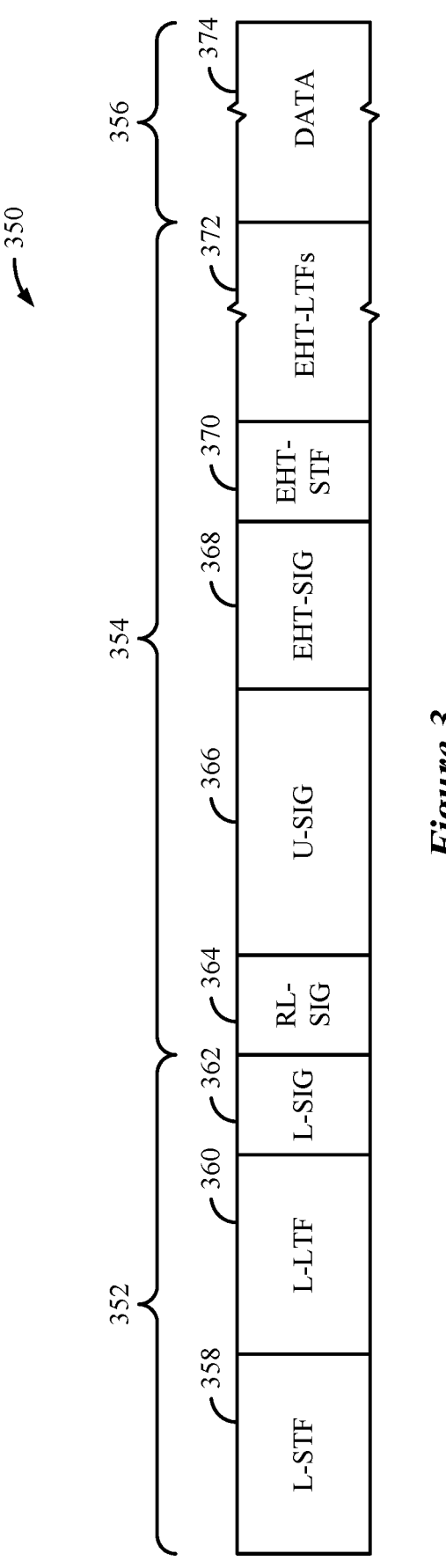
FIG. 3 shows an example physical layer (PHY) protocol data unit (PPDU) usable for communications between a wireless access point (AP) and one or more wireless stations (STAs).

FIG. 3 shows another example PPDU 350 usable for wireless communication between a wireless AP and one or more wireless STAs. The PPDU 350 may be used for SU, OFDMA or MU-MIMO transmissions. The PPDU 350 may be formatted as an Extremely High Throughput (EHT) WLAN PPDU in accordance with the IEEE 802.11be amendment to the IEEE 802.11 family of wireless communication protocol standards, or may be formatted as a PPDU conforming to any later (post-EHT) version of a new wireless communication protocol conforming to a future IEEE 802.11 wireless communication protocol standard, such as the 802.11 amendment associated with Wi-Fi 8), or another wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes a repetition of L-SIG (RL-SIG) 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. One or both of U-SIG 366 and EHT-SIG 368 may be structured as, and carry version-dependent information for, other wireless communication protocol versions associated with amendments to the IEEE family of standards beyond EHT. For example, U-SIG 366 may be used by a receiving device to interpret bits in one or more of EHT-SIG 368 or the data field 374. Like L-STF 358, L-LTF 360, and L-SIG 362, the information in U-SIG 366 and EHT-SIG 368 may be duplicated and transmitted in each of the component 20 MHz channels in instances involving the use of a bonded channel.

The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation.

EHT-SIG 368 may be used by an AP to identify and inform one or multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user (for example, STA-specific) signaling information. Each EHT-SIG 368 may include a common field and at least one user-specific field. In the context of OFDMA, the common field can indicate RU distributions to multiple STAs 104, indicate the RU assignments in the frequency domain, indicate which RUs are allocated for MU-MIMO transmissions and which RUs correspond to OFDMA transmissions, and the number of users in allocations, among other examples. The user-specific fields are assigned to particular STAs 104 and carry STA-specific scheduling information such as user-specific MCS values and user-specific RU allocation information. Such information enables the respective STAs 104 to identify and decode corresponding RUs in the associated data field 374.

Figure 4:
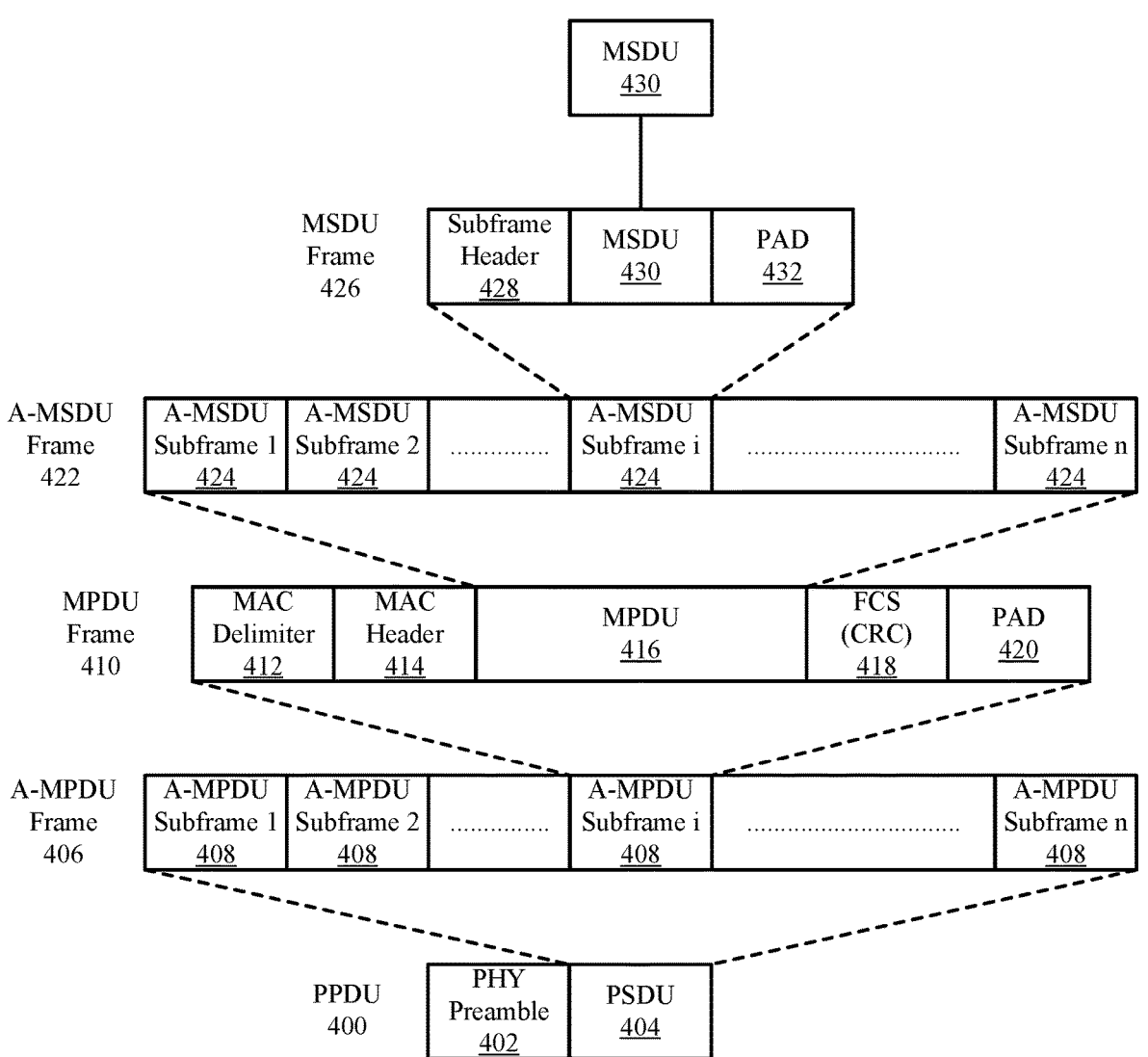
FIG. 4 shows a hierarchical format of an example PPDU usable for communications between a wireless AP and one or more wireless STAs.

FIG. 4 shows a hierarchical format of an example PPDU usable for communications between a wireless AP 102 and one or more wireless STAs 104. As described, each PPDU 400 includes a PHY preamble 402 and a PSDU 404. Each PSDU 404 may represent (or "carry") one or more MAC protocol data units (MPDUs) 416. For example, each PSDU 404 may carry an aggregated MPDU (A-MPDU) 406 that includes an aggregation of multiple A-MPDU subframes 408. Each A-MPDU subframe 406 may include an MPDU frame 410 that includes a MAC delimiter 412 and a MAC header 414 prior to the accompanying MPDU 416, which includes the data portion ("payload" or "frame body") of the MPDU frame 410. Each MPDU frame 410 also may include a frame check sequence (FCS) field 418 for error detection (for example, the FCS field may include a cyclic redundancy check (CRC)) and padding bits 420. The MPDU 416 may carry one or more MAC service data units (MSDUs). For example, the MPDU 416 may carry an aggregated MSDU (A-MSDU) 422 including multiple A-MSDU subframes 424. Each A-MSDU subframe 424 contains a corresponding MSDU frame 426 having a MSDU 430 preceded by a subframe header 428 and in some cases followed by padding bits 432.

Referring back to the MPDU frame 410, the MAC delimiter 412 may serve as a marker of the start of the associated MPDU 416 and indicate the length of the associated MPDU 416. The MAC header 414 may include multiple fields containing information that defines or indicates characteristics or attributes of data encapsulated within the frame body of MPDU frame 406. The MAC header 414 includes a duration field indicating a duration extending from the end of the PPDU until at least the end of an acknowledgment (ACK) or Block ACK (BA) of the PPDU that is to be transmitted by the receiving wireless communication device.

The use of the duration field serves to reserve the wireless medium for the indicated duration, and enables the receiving device to establish its network allocation vector (NAV). The MAC header 414 also includes one or more fields indicating addresses for the data encapsulated within the frame body of MPDU frame 406. For example, the MAC header 414 may include a combination of a source address, a transmitter address, a receiver address or a destination address. The MAC header 414 may further include a frame control field containing control information. The frame control field may specify a frame type, for example, a data frame, a control frame, or a management frame.

APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUS) each including multiple frequency subcarriers (also referred to as "tones"). Different RUs may be allocated or assigned by an AP 102 to different STAs 104 at particular times. The sizes and distributions of the RUs may be referred to as an RU allocation. In some examples, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs also may be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

In some environments, locations or conditions, a regulatory body may impose a power spectral density (PSD) limit for one or more communication channels or for an entire band (for example, the 6 GHz band). A PSD is a measure of transmit power as a function of a unit bandwidth (such as per 1 MHz). The total transmit power of a transmission is consequently the product of the PSD and the total bandwidth by which the transmission is sent. The United States Federal Communications Commission (FCC) has defined three power classes for operation in the 6 GHz band: standard power, low power indoor, and very low power. Some APs and STAs that operate in the 6 GHz band may conform to the low power indoor (LPI) power class, which limits the transmit power of APs and STAs to 5 decibel-milliwatts per megahertz (dBm/MHz) and −1 dBm/MHz, respectively. In other words, transmit power in the 6 GHz band is PSD-limited on a per-MHz basis.

Such PSD limits can undesirably reduce transmission ranges, reduce packet detection capabilities, and reduce channel estimation capabilities of APs and STAs. In some examples in which transmissions are subject to a PSD limit, the AP 102 and/or STAs 104 of the WLAN 100 may transmit over a greater transmission bandwidth to allow for an increase in the total transmit power, which may increase an SNR and extend coverage of the wireless communication devices. For example, to overcome or extend the PSD limit, a wireless communication device may implement a dupli-cate (DUP) mode for a transmission, by which data in a payload portion of a PPDU is modulated for transmission over a "base" frequency sub-band, such as a first RU of an OFDMA transmission, and copied over (for example, dupli-cated) to another frequency sub-band, such as a second RU of the OFDMA transmission. While the data rate for trans-mission of each copy of the user data using the DUP mode may be the same as a data rate for a transmission using a "normal" mode, the transmit power for the transmission using the DUP mode may be essentially multiplied by the number of copies of the data being transmitted, at the expense of requiring an increased bandwidth. As such, using the EHT DUP mode may extend range but reduce spectrum efficiency.

In some other examples in which transmissions are sub-ject to a PSD limit, a distributed tone mapping operation may be used to increase the bandwidth via which a STA 104 transmits an uplink communication to the AP 102. As used herein, the term "distributed transmission" refers to a PPDU transmission on noncontiguous tones (or subcarriers) of a wireless channel. In contrast, the term "contiguous trans-mission" refers to a PPDU transmission on contiguous tones. As used herein, a logical RU represents a number of tones or subcarriers that are allocated to a given STA 104 for transmission of a PPDU. As used herein, the term "regular RU" (or rRU) refers to any RU or MRU tone plan that is not distributed, such as a configuration supported by 802.11be or earlier versions of the IEEE 802.11 family of wireless communication protocol standards. As used herein, the term "distributed RU" (or dRU) refers to the tones distributed across a set of noncontiguous subcarrier indices to which a logical RU is mapped. The term "distributed tone plan" refers to the set of noncontiguous subcarrier indices asso-ciated with a dRU. The channel or portion of a channel within which the distributed tones are interspersed is referred to as a spreading bandwidth, which may be, for example, 40 MHz, 80 MHz or more.

By enabling a STA 104 to modulate modulation symbols in a distributed manner onto noncontiguous tones inter-spersed throughout all or a portion of a wireless channel, distributed transmissions may enable an increase in the per-tone transmit power used for each individual distributed tone, and thus the overall transmit power of the PPDU, without exceeding the PSD limits of the wireless channel. Furthermore, distributed transmissions by multiple STAs 104 may be multiplexed onto different sets of distributed tones of a shared wireless channel, such as to enable an increase in the transmit power of each device without sacrificing spectral efficiency. Such increases in transmit power can be combined with some modulation coding schemes (MCS) s to increase the range and throughput of wireless communications on PSD-limited wireless channels.

Distributed transmissions also may provide greater flexibil-ity in medium utilization for PSD-limited wireless channels. Distributed transmissions also may improve packet detec-tion and channel estimation capabilities.

Figure 5:
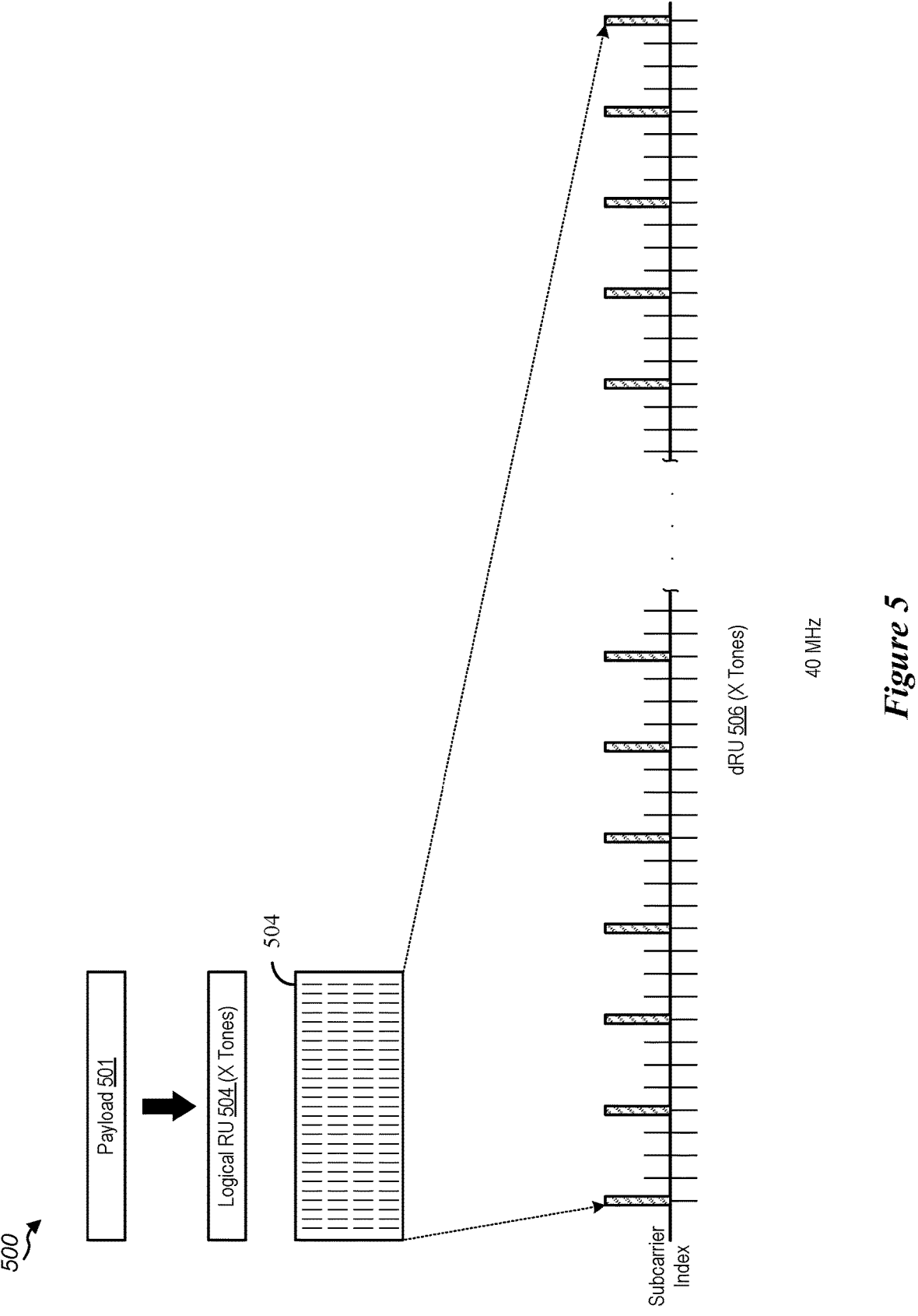
FIG. 5 shows a frequency diagram depicting an example distributed tone mapping according to some examples.

FIG. 5 shows a frequency diagram 500 depicting an example distributed tone mapping according to some examples. More specifically, FIG. 5 shows an example mapping of how tones of a payload 501 of a PPDU, such as PPDU 400 of FIG. 4, are distributed for transmission over a spreading bandwidth of a wireless channel. In the illustrated example, the tones in a logical RU 504 associated with payload 501 are mapped to a dRU 506 in accordance with a distributed tone plan. In some examples, the payload 501 may be modulated on a logical RU 504 associated with a non-distributed tone plan (such as a legacy tone plan or a non-legacy tone plan) and further mapped to a dRU 506 in accordance with a distributed tone plan. The logical RU 504 represents a number of tones or subcarriers that are allocated for the transmission of the PPDU 502. In contrast, the dRU 506 represents the physical resources (identified by subcar-rier indices) that symbols are modulated over or onto to transmit the PPDU 502.

To perform a distributed tone transmission, a STA (such as STA 104) may distribute tones by modulating symbols onto tones according to a legacy tone plan. In such examples, the wireless communication device may modulate a portion of the symbols on a number (M) of tones repre-senting a logical RU associated with the one or more legacy tone plans and may further map the M tones to M noncon-tiguous subcarrier indices associated with a wireless channel in accordance with a distributed tone plan. In some other examples, a wireless communication device may distribute tones by modulating symbols based directly on a distributed tone plan. In such examples, the wireless communication device may modulate a portion of the symbols on a number (M) of tones coinciding with M noncontiguous subcarrier indices associated with a wireless channel in accordance with the distributed tone plan.

In some examples, the logical RU 504 may represent an rRU as defined by existing versions of the IEEE 802.11 standard. In other words, the logical RU 504 maps directly to a respective rRU according to a legacy or non-distributed tone plan. In the example of FIG. 5, the logical RU 504 includes 26 tones. When mapped to an rRU, the transmit power of the logical RU 504 may be severely limited based on the PSD of the wireless channel. For example, the LPI power class limits the transmit power of APs and STAs to 5 dBm/MHz and −1 dBm/MHz, respectively, in the 6 GHz band. As such, the per-tone transmit power of the logical RU 504 is limited by the number of tones mapped to each 1 MHz subchannel of the wireless channel. Accordingly, each 1 MHz subchannel of a PSD-limited channel may be referred to herein as a "PSD-limited subchannel."

Aspects of the present disclosure recognize that the per-tone transmit power of the logical RU 504 can be increased by distributing the tones across a wider bandwidth. Increas-ing the per-tone transmit power can also increase the overall transmit power of the logical RU 504. Thus, in some examples, the logical RU 504 may be mapped to a set of noncontiguous subcarrier indices spanning a wider-band-width channel (often referred to in the art as a "spreading bandwidth" or "distribution bandwidth"). With reference for example to FIG. 5, the logical RU 504 is mapped to the dRU 506 according to a distributed tone plan. More specifically, the logical RU 504 is mapped to 26 noncontiguous subcar-rier indices spread across a 40 MHz wireless channel (where the spreading bandwidth is equal to 40 MHz). Compared to the tone mapping described above with respect to the non-distributed tone plan, the distributed tone mapping depicted in FIG. 5 effectively reduces the number of tones (of the logical RU 504) in each 1 MHz subchannel. For example, each of the 26 tones can be mapped to a different 1 MHz subchannel of the 40 MHz channel. As a result, each AP or STA implementing the distributed tone mapping of FIG. 5 can maximize its per-tone transmit power (which may maximize the overall transmit power of the logical RU 504).

To support distributed transmissions, new packet designs and signaling are needed to indicate whether a PPDU is transmitted on tones spanning rRU (according to a legacy tone plan) or dRU 506 (according to a distributed tone plan). For example, existing versions of the IEEE 802.11 standard define a trigger frame format which can be used to solicit the transmission of a trigger-based (TB) PPDU from one or more STAs 104. The trigger frame allocates resources to the STAs 104 for the transmission of the TB PPDU and indicates how the TB PPDU is to be configured for transmission. For example, the trigger frame may indicate a logical RU or MRU allocated for transmission in the TB PPDU. In some examples, the trigger frame may be further configured to carry tone distribution information indicating whether the logical RU (or MRU) maps to a rRU or a dRU.

In some examples, a transmitting device (such as a STA or an AP) may include a distributed tone mapper that maps the logical RU 504 to the dRU 506 in the frequency domain (such as described with reference to FIG. 5). The dRU 506 is then converted to a time-domain signal (such as by an inverse fast Fourier transform (IFFT)) for transmission over a wireless channel. A receiving device (such as an AP or a STA) receives the time-domain signal over the wireless channel and converts (reconstructs) the time-domain signal back to the dRU 506 (such as by a fast Fourier transform (FFT)). In some examples, the receiving device may include a distributed tone demapper that demaps the dRU 506 to the logical RU 504. In other words, the distributed tone demapper reverses the mapping performed by the distributed tone mapper at the transmitting device. The receiving device can then recover the information carried (or modulated) on the logical RU 504 as a result of the demapping.

In the example of FIG. 5, the logical RU 504 is distributed evenly across the spreading bandwidth. While the example shown in FIG. 5 illustrates a spreading bandwidth of 40 MHz, spreading bandwidths may also include 80 MHz, 160 MHz, or 320 MHz. However, in actual examples, the logical RU 504 can be mapped to any suitable pattern of noncontiguous subcarrier indices. For example, in various examples, the distance between any pair of adjacent modulated tones may be different (such as less or greater) than the distances depicted in FIG. 5. Still further, in some aspects multiple logical RUs may be mapped to interleaved subcarrier indices of a shared wireless channel.

Figure 6:
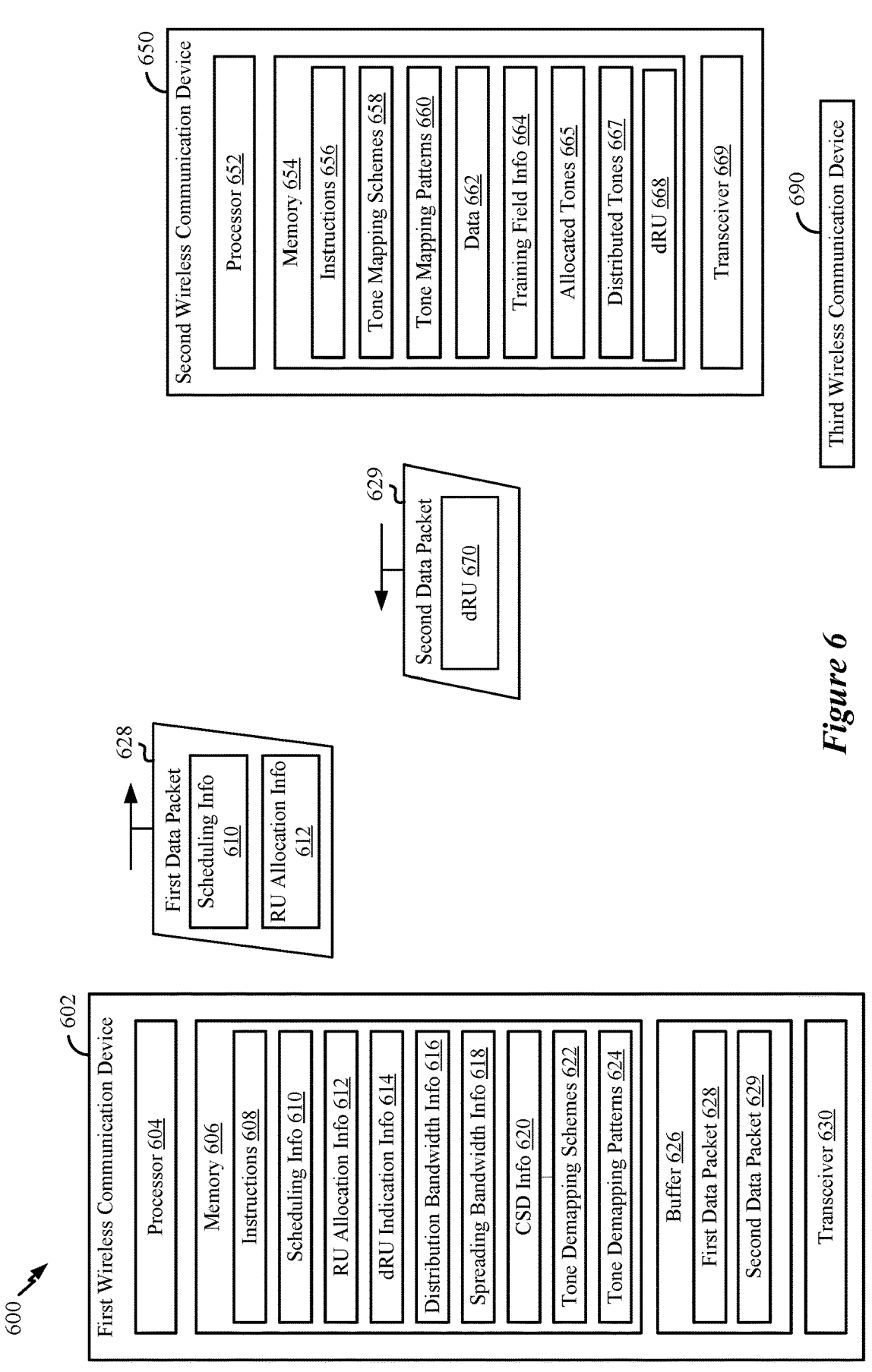
FIG. 6 shows a block diagram of an example wireless communication system that supports enhanced distributed transmission operations.

FIG. 6 shows a block diagram of an example wireless communication system 600 that supports enhanced distributed transmission operations according to some aspects of the present disclosure. For example, FIG. 6 illustrates an example of extending dRU to bandwidths, such as distribution or spreading bandwidths, past 80 MHz. In some examples, the wireless communication system 600 may implement aspects of the wireless communication network 100 of FIG. 1. Wireless communication system 600 may include a first wireless communication device 602 and a second wireless communication device 650. In some examples, the first wireless communication device 602 may include or correspond to the AP 102 of FIG. 1, and the second wireless communication device 650 may include or correspond to the STA 104 of FIG. 1. In some other examples, the first wireless communication device 602 may include or correspond to the STA 104 of FIG. 1, and the second wireless communication device 650 may include or correspond to the AP 102 of FIG. 1. Although two wireless communication devices 602 and 650 are illustrated, in some other examples, the wireless communication system 600 may generally include more than three wireless communication devices, such as multiple APs, multiple STAs, or a combination thereof. For example, the wireless communication system 600 may optionally include one or more other wireless communication devices, such as a third wireless communication device 690. In some examples, the third wireless communication device 690 may be a second STA, such as STA 104.

The first wireless communication device 602 may include a variety of components (such as structural, hardware components) used for carrying out one or more functions described herein. For example, these components may include one or more processors 604 (hereinafter referred to collectively as "processor 604"), one or more memory devices 606 (hereinafter referred to collectively as "memory 606"), a buffer 626, and one or more transceivers 630 (hereinafter referred to collectively as "transceiver 630"). In some examples, the transceiver 630 may include an interface (such as a communication interface) that includes a transmitter and a receiver. In some other examples, the first wireless communication device 602 may include a transmitter, a receiver, or a combination thereof. The processor 604 may be configured to execute instructions 608 stored in the memory 606 to perform the operations described herein.

The memory 606 includes or is configured to store the instructions 608 and scheduling information 610 and RU allocation information 612. The memory 606 may further include or be configured to store one or more of dRU indication information 614, distribution bandwidth information 616, spreading bandwidth information 618, dRU cyclic shift delay (CSD) information 620, tone demapping scheme information 622, and tone demapping pattern information 624.

The scheduling information 610 may be generated by the first wireless communication device 602 to schedule transmissions for other devices of the wireless communication system 600. For example, the scheduling information 610 may indicate or allocate wireless communication resources for the second wireless communication device 650. To illustrate, the scheduling information 610 may be included in a data packet, such as a trigger frame, and as shown in a first data packet 628 in the example of FIG. 6, to schedule a second data packet 629. The scheduling information 610 may include the RU allocation information 612 in some examples. Additionally, or alternatively, the scheduling information 610 may include one or more of the dRU indication information 614, the distribution bandwidth information 616, the spreading bandwidth information 618, or the dRU CSD information 620.

The RU allocation information 612 indicates a logical RU (or MRU) that is allocated for STA (also known as a user) associated with a user information field and the dRU indication information 614 indicates whether the allocated logical RU maps to an rRU or a dRU.

The RU allocation information 612 may allocate a dRU to a STA based on an RU assignment index that conforms with an existing RU allocation table. The RU assignment index or RU index may indicate the size and relative position of the dRU within a given bandwidth (such as the first 26-tone dRU of a 40 MHz bandwidth, the second 26-tone dRU of a 40 MHz bandwidth, the first 52-tone dRU of an 80 MHz bandwidth, or the second 52-tone dRU of an 80 MHz bandwidth, among other examples).

The RU allocation information 612 may be carried in an RU allocation subfield of a user information field, such as defined by existing versions of the IEEE 802.11 standard. In other words, the existing RU allocation subfield can be reused to indicate the logical RU associated with an rRU or dRU transmission.

The dRU indication information 614 (also referred to as distributed transmission information or mixed dRU and rRU indication information) indicates if one or more of the allocated logical RUs comprise a dRU. For example, the dRU indication information 614 may be indicated per STA and indicates if an allocated logical RU is a dRU or an rRU. In some examples, the dRU indication information 614 is a per spreading bandwidth indication or a per fixed bandwidth (such as a per 80 MHz) indication. The dRU indication information 614 may indicate if the PPDU is a mixed or hybrid transmission that includes one or more non-distributed RUs (rRUs) and the one or more dRUs. In some examples, the dRU indication information 614 is related to or determined by per 80 MHz voting with respect to bandwidth allocated to rRU or dRU for mixed transmissions.

The distribution bandwidth information 616 indicates a distribution bandwidth associated with the one or more dRUs. For example, the distribution bandwidth information 616 may indicate a bandwidth upon which all dRUs are spread. In some examples, each dRU is spread over this entire bandwidth. In other examples, each dRU occupies a smaller bandwidth (such as a spreading bandwidth) within the distribution bandwidth. The distribution bandwidth may be indicated by a field or indicator of three or more bits to indicate bandwidths larger than 80 MHz.

The spreading bandwidth information 618 indicates a spreading bandwidth associated with the one or more dRUs. For example, the spreading bandwidth information 618 may indicate a bandwidth size upon which all dRUs are first distributed or mapped, before being further mapped, distributed, or interleaved over the distribution bandwidth. As another example, the spreading bandwidth information 618 may indicate a bandwidth size and a particular portion of the bandwidth of the distribution bandwidth for which a particular dRU is first partially or locally distributed and then further distributed over the distribution bandwidth.

Accordingly, each STA can determine its RU assignment, if the RU is a dRU or rRU, and what is the distribution bandwidth and spreading bandwidth associated with its assigned RU are, based on receiving one or more of 610-618.

The dRU CSD information 620 includes CSD information, such as CSD values for dRUs or distributed transmissions. For example, the dRU CSD information 620 includes, indicates, or can be used to determine CSD start index information. CSD start index information may identify a starting CSD value for the one or more dRUs. To illustrate, dRU CSD start index information may point to a respective entry of a global CSD table that stores a number (N) of global CSD values.

Distributed tone demapping scheme information 622 includes or corresponds to data for determining which tone demapping scheme to apply, which distributed tone demapping plan or pattern to apply or both. For example, the distributed tone demapping scheme information 622 may include information for multiple types of distributed tone demapping operations, such as demapping operations for demapping dRUs generated by one-step mapping operations, two-step mapping operations, quantized operations, or upclocking operations, as illustrative, non-limiting examples. Various different distributed tone mapping schemes are described further with reference to FIGS. 8-12.

Additionally, the distributed tone demapping scheme information 622 may include or correspond to one or more thresholds or conditions for selecting a particular type of scheme or demapping pattern. To illustrate, a particular tone demapping scheme may be determined based on an operating mode (such as OFDMA, MIMO, UL, SU-DL as illustrative non-limiting examples) or by indication, and a particular tone demapping pattern may be determined based on the determined tone demapping scheme and information of the distribution transmission, such as distribution bandwidth, number of allocated RUs, RU tone size, mixed dRU and rRU transmission, as illustrative, non-limiting examples.

Distributed tone demapping pattern information 624 includes or corresponds to data for demapping distributed tones (subcarrier indices) of a dRU back to contiguous tones of an allocated RU for further receive processing. For example, the distributed tone demapping pattern information 624 may include information for demapping or deparsing non-contiguous tones under different conditions. To illustrate, the distributed tone demapping pattern information 624 may include different demapping patterns for different distribution bandwidths, different spreading bandwidths, different amounts of tones (such as RU tone size), different mapping schemes, as illustrative, non-limiting examples.

The buffer 626 is configured to temporarily store (such as to buffer) one or more data packets generated by, or to be processed by, the first wireless communication device 602. For example, the buffer 626 may include or correspond to a TX buffer that buffers one or more data packets to be wirelessly transmitted by the first wireless communication device 602. The buffer 626 may store data packets until the data packets are transmitted, until a particular time, until a flush operation is initiated, for a particular packet lifetime, until the buffer 626 is full, or until another trigger condition is detected. Additionally, the buffer 626 may store received data packets until the data packets are processed, until a particular time, until a flush operation is initiated, for a particular packet lifetime, until the buffer 626 is full, or until another trigger condition is detected.

The transceiver 630 is configured to transmit control information and data, such as one or more packets, to one or more other devices, and to receive control information and data from one or more other devices. For example, the transceiver 630 may transmit control information and data to, and may receive control information and data from, the second wireless communication device 650. In some examples, the transceiver 630 may include or correspond to one or more components of AP 102 or STA 104 described with reference to FIG. 1.

The second wireless communication device 650 may include a variety of components (such as structural, hardware components) used for carrying out one or more functions described herein. For example, these components may include one or more processors 652 (hereinafter referred to collectively as "processor 652"), one or more memory devices 654 (hereinafter referred to collectively as "memory 654"), and one or more transceivers 669 (hereinafter referred to collectively as "transceiver 669"). In some examples, the transceiver 669 may include an interface (such as a communication interface) that includes a transmitter and a receiver. In some other examples, the second wireless communication device 650 may include a transmitter, a receiver, or a combination thereof. The processor 652 may be configured to execute instructions 656 stored in the memory 654 to perform the operations described herein.

The memory 654 includes or is configured to store instructions 656 and distributed tone mapping scheme information 658, distributed tone mapping pattern information 660, data 662, training field information 664, allocated tone information 665, distributed tone information 667, and dRU information 668.

The distributed tone mapping scheme information 658 includes or corresponds to data for determining which tone mapping scheme to apply, which distributed tone mapping plan or pattern to apply or both. For example, the distributed tone mapping scheme information 658 may include information for multiple types of distributed tone mapping operations, such as one-step mapping operations, two-step mapping operations, quantized operations, or upclocking operations, as illustrative, non-limiting examples. Various different distributed tone mapping schemes are described further with reference to FIGS. 8-12.

Additionally, the distributed tone mapping scheme information 658 may include or correspond to one or more thresholds or conditions for selecting a particular type of scheme or mapping pattern. To illustrate, a particular tone mapping scheme may be determined based on an operating mode (such as OFDMA, MIMO, UL, SU-DL as illustrative non-limiting examples) or by indication, and a particular tone mapping pattern may be determined based on the determined tone mapping scheme and information of the distribution transmission, such as distribution bandwidth, number of allocated RUs, RU tone size, mixed dRU and rRU transmission, as illustrative, non-limiting examples.

Figure 12:
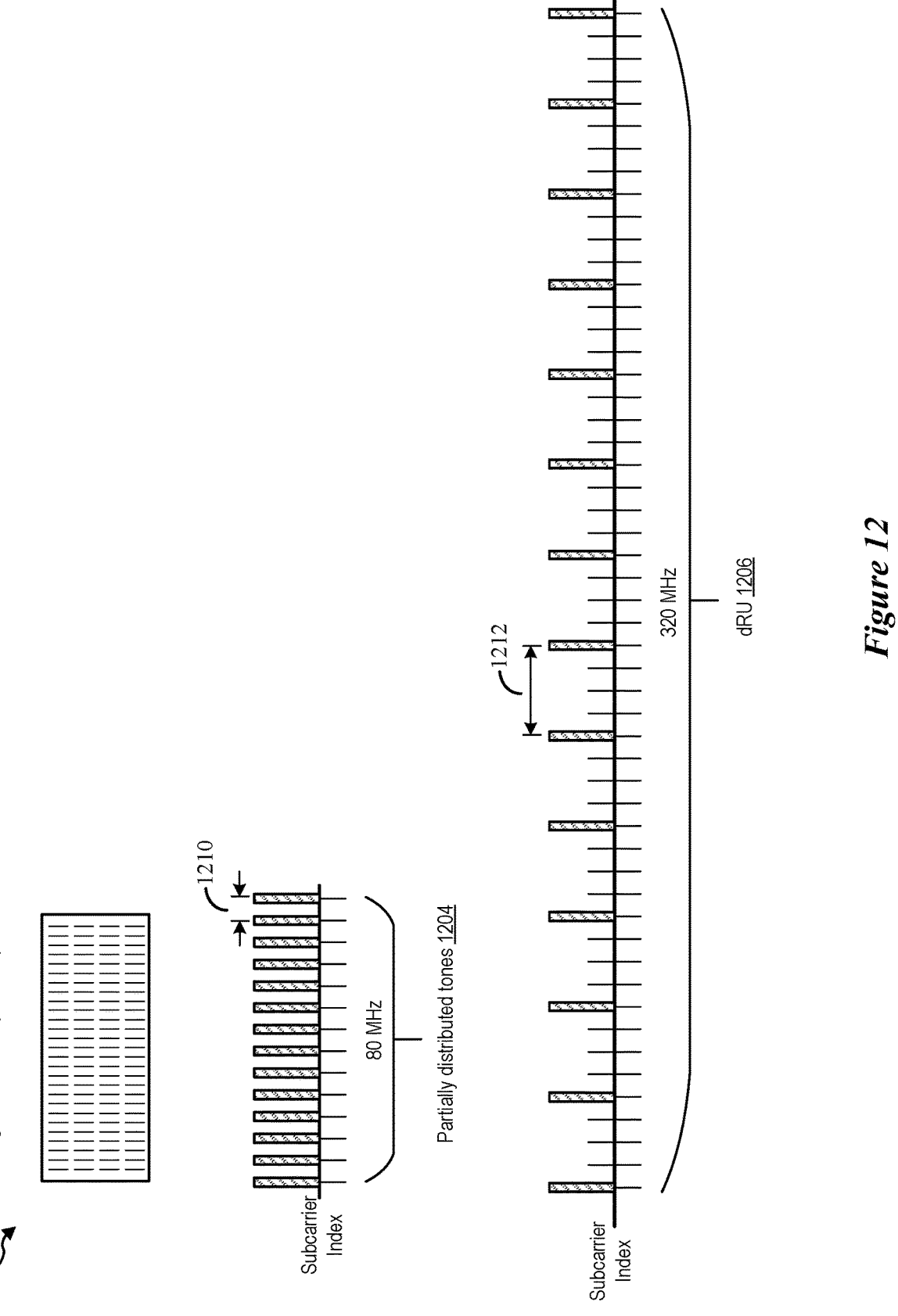
FIG. 12 shows another example of a distributed tone mapping process that supports enhanced distributed transmission operations.

As the distributed tones of a dRU may include payload symbols and LTF symbols, the distributed tone mapping scheme information 658 may include distributed LTF tone mapping schemes. For example, the distributed tone mapping scheme information 658 may include distribution schemes for LTF tones over a spreading bandwidth, a distribution bandwidth or both. A distribution scheme for LTF tones may be determined based on or in association with a distribution scheme for tones the payload data. To illustrate, if an upclocking distribution scheme, as described with reference to FIG. 12, is used for determining the distributed tones for payload data, an upclocking distribution scheme may be used for determining the distributed LTF tones for LTF sequence.

The distributed tone mapping pattern information 660 includes or corresponds to data for distributing contiguous tones of an allocated RU to distributed tones (subcarrier indices) of a dRU or for determining location (subcarrier indices) for the distributed tones. For example, the distributed tone mapping pattern information 660 may include information for distributing contiguous tones to non-contiguous tones under different conditions. To illustrate, the distributed tone mapping pattern information 660 may include different mapping patterns for different distribution bandwidths, different spreading bandwidths, different amounts of tones (such as RU tone size), different mapping schemes, as illustrative, non-limiting examples.

Additionally, as the distributed tones of a dRU may include payload symbols and LTF symbols, the distributed tone mapping pattern information 660 may include distributed LTF tone mapping patterns. For example, the distributed tone mapping pattern information 660 may include distribution patterns for LTF tones over a spreading bandwidth, a distribution bandwidth or both. The distribution patterns for LTF tones may be determined based on or in association with a dRU tone plan for the payload data.

The data 662 includes or corresponds to payload data (such as 501) that is to be sent by the second wireless communication device 650. For example, symbols corresponding to the data 662 may be modulated and transmitted by the wireless communication device in a payload of a data packet. The symbols corresponding to the data may be modulated onto distributed tones or subcarrier indices when the modulate symbols are transmitted via a dRU.

The training field information 664 includes or corresponds to STF information, LTF information, or both for dRUs or distributed transmissions. The training field information 664 may include or correspond to STF sequences and LTF sequences.

The allocated tones information 665 includes or corresponds to contiguous tones of the logical RU allocated to the second wireless communication device 650. The distributed tones information 667 includes or corresponds to distributed, non-contiguous tones of the allocated tones indicated by the allocated tones information 665. The second wireless communication device 650, such as tone mapper thereof, determines the distributed, non-contiguous tones for a dRU and corresponding to the allocated tones by modifying a position of one or more of the contiguous tones, such as based on a tone mapping plan of the tone mapping pattern information 660, which may be determined based on the tone mapping scheme information 658. To illustrate, the contiguous tones may be mapped sequentially, according to a tone pattern associated with the distribution bandwidth or interleaved with other allocated tones of other logical RUs and dRUs, to distribute the allocated tones. In some examples, the demapper may perform a two-stage tone mapping/distribution operation to generate partially distributed tones over a spreading bandwidth and then generate the distributed tones based on the partially distribute tones and a distribution bandwidth.

The dRU information 668 includes or corresponds to data indicating or corresponding to associating the symbols for the data 662 and the symbols for the training field information 664 with the corresponding tones of the distributed tones of the distributed tones information 667.

The transceiver 669 is configured to transmit control information and data to one or more other devices, and to receive reference signals, control information and data from one or more other devices. For example, the transceiver 669 may transmit control information and data to, and receive control information and data from, the first wireless communication device 602. In some examples, the transceiver 669 may include or correspond to one or more components of AP 102 or STA 104 described with reference to FIG. 1.

Although not illustrated for simplicity, the second wireless communication device 650 may include a buffer, similar to the buffer 626 of the first wireless communication device 602. The buffer may be configured to temporarily store (such as to buffer) one or more data packets generated by, to be transmitted by, received by, or to be processed by, the second wireless communication device 650. Additionally, the buffer may be configured to store symbols corresponding to or representing payload data, LTF data, STF data, or a combination thereof, to be transmitted.

During operation of the wireless communications system 600, the first wireless communication device 602 may generate one or more data packets to be transmitted to other devices, such as a first data packet 628. During a generation process and until transmission, or another time or occurrence of a triggering condition, the first data packet 628 may be stored in the buffer 626 as the first wireless communication device 602. The first data packet 628 may include the scheduling information 610 and the RU allocation information 612. The scheduling information 610 may indicate a PPDU to be transmitted by one or more wireless devices of the wireless communications system 600, including the second wireless communication device 650. The scheduling information 610 may include the RU allocation information 612 and may allocate RUs of the PPDU to the one or more wireless devices of the wireless communications system 600. For example, the RU allocation information may indicate one or more logical RUs for one or more wireless devices of the wireless communications system 600. The scheduling information 610, such as the dRU indication information, the distributed bandwidth information, and the spreading bandwidth information thereof, may indicate if the allocated logical RUs are dRUs, and how to determine the distributed tones for the dRUs.

The first wireless communication device 602 may determine the how much data to allocate to wireless devices of the wireless communications system 600 based on buffered data at each of the device. The first wireless communication device 602 may determine how much data to allocate to each device based on an amount of buffered data at the devices.

Additionally, or alternatively, the first wireless communication device 602 may also determine which tone mapping scheme and tone mapping plan to use based on an operating mode, configurations or types of the wireless devices of the wireless communications system 600, a spectrum, as illustrative, non-limiting options.

In some examples, the first wireless communication device 602 may determine that the second wireless communication device 650 has data to send and is operable to or configured to distribute tones over bandwidths greater than 80 MHz and modulate symbols over the distributed tones. The second wireless communication device 650 may transmit the second data packet 629 to the first wireless communication device 602, which includes the dRU 670. To transmit the second data packet 629, the second wireless communication device 650 may map the plurality of symbols from a first logical resource unit (RU) across a distribution bandwidth in accordance with a dRU tone plan associated with the distribution bandwidth, as described further with reference to FIG. 9.

In some such examples, to map the plurality of symbols across the distribution bandwidth (or spreading bandwidth) includes to map data symbols of the plurality of symbols across the distribution bandwidth (or spreading bandwidth) in accordance with the dRU tone plan associated with the distribution bandwidth (or spreading bandwidth), and to map long training field (LTF) symbols of the plurality of symbols across the distribution bandwidth (or spreading bandwidth) in accordance with a dRU data tone plan (or a separate dRU LTF tone plan) associated with the distribution bandwidth (or spreading bandwidth).

In some other examples, the first wireless communication device 602 may determine that the second wireless communication device 650 is not operable to or configured to distribute tones over bandwidths greater than 80 MHz using a single distribution or determining step. The second wireless communication device 650 may be capable of distributing tones over bandwidths greater than 80 MHz by first spreading the tones over a spreading bandwidth, and then distributing the partially distributed tones over a distribution bandwidth. To illustrate, the second wireless communication device 650 may transmit the second data packet 629 by first mapping the plurality of symbols from a first logical resource unit (RU) across a spreading bandwidth in accordance with a dRU tone plan associated with the spreading bandwidth. The second wireless communication device 650 may further distribute the partially distributed tones by a second tone distribution plan, interleaving tones with other dRUs, such as from other devices and as described further with reference to FIG. 8, or by increasing a tone spacing between each tone to determine the distributed tones, as described further with reference to FIG. 12. The second wireless communication device 650 may then modulate symbols for the data 662 and the training field information 664 over the distributed tones to transmit the dRU and the second data packet 629.

Alternatively, the second wireless communication device 650 may utilize logical or segmented dRUs to transmit the dRU. For example, the second wireless communication device 650 may perform tone mapping operations by splitting tones associated with a first logical resource unit (RU) between 80 MHz subchannels (such as based on a spreading bandwidth size) of the distribution bandwidth according to a proportional round robin (PRR) parser to generate first tones for a first 80 MHz subchannel of the distribution bandwidth and second tones for a second 80 MHz subchannel of the distribution bandwidth. The second wireless communication device 650 may then map first symbols of the plurality of symbols over the first tones of the first 80 MHz subchannel of the distribution bandwidth in accordance with a dRU tone plan associated with a spreading bandwidth, and map second symbols of the plurality of symbols over the second tones of the second 80 MHz subchannel of the distribution bandwidth in accordance with the dRU tone plan associated with the spreading bandwidth, as described further with reference to FIG. 10.

Figure 11:
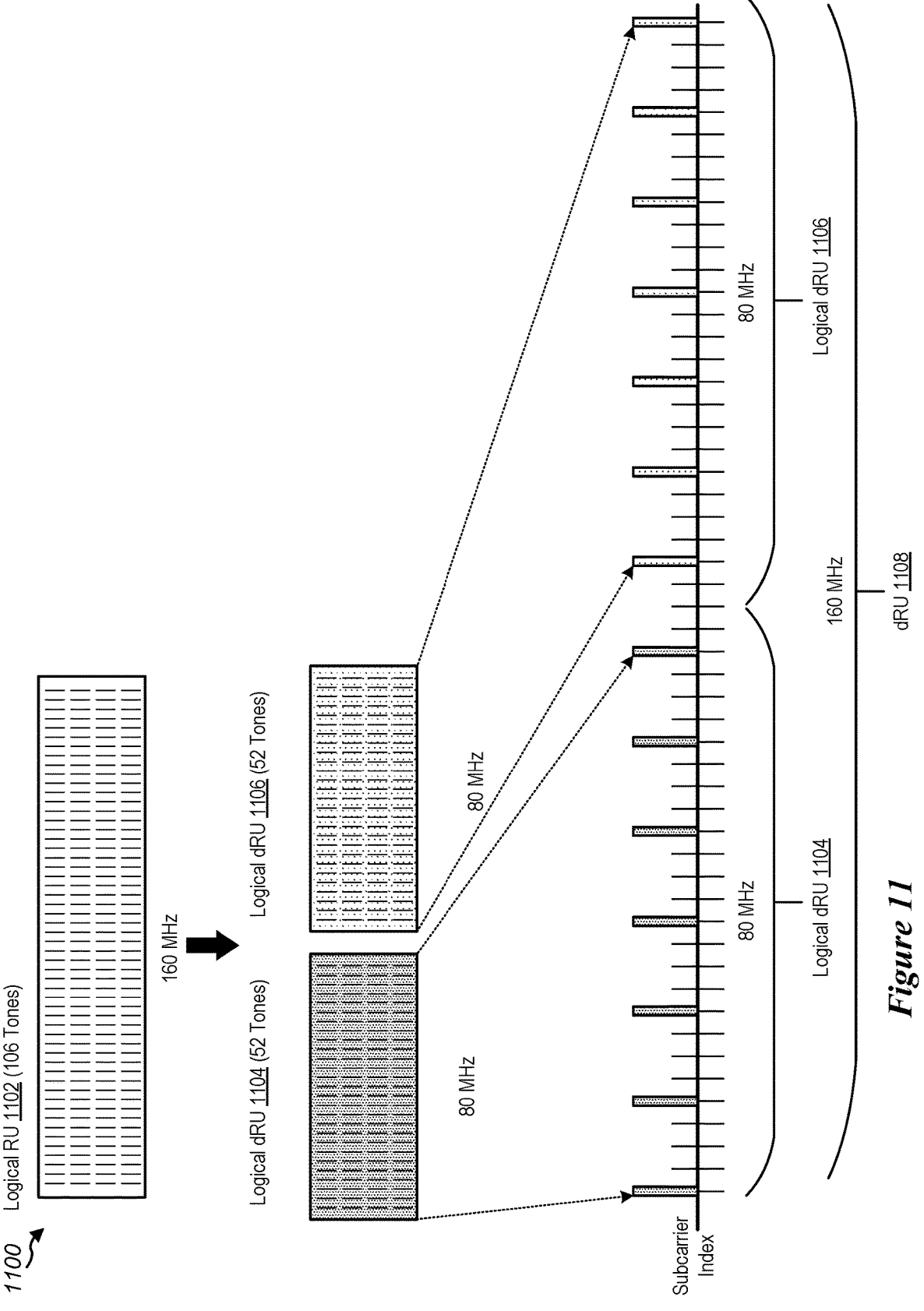
FIG. 11 shows another example of a distributed tone mapping process that supports enhanced distributed transmission operations.
Figure 18:
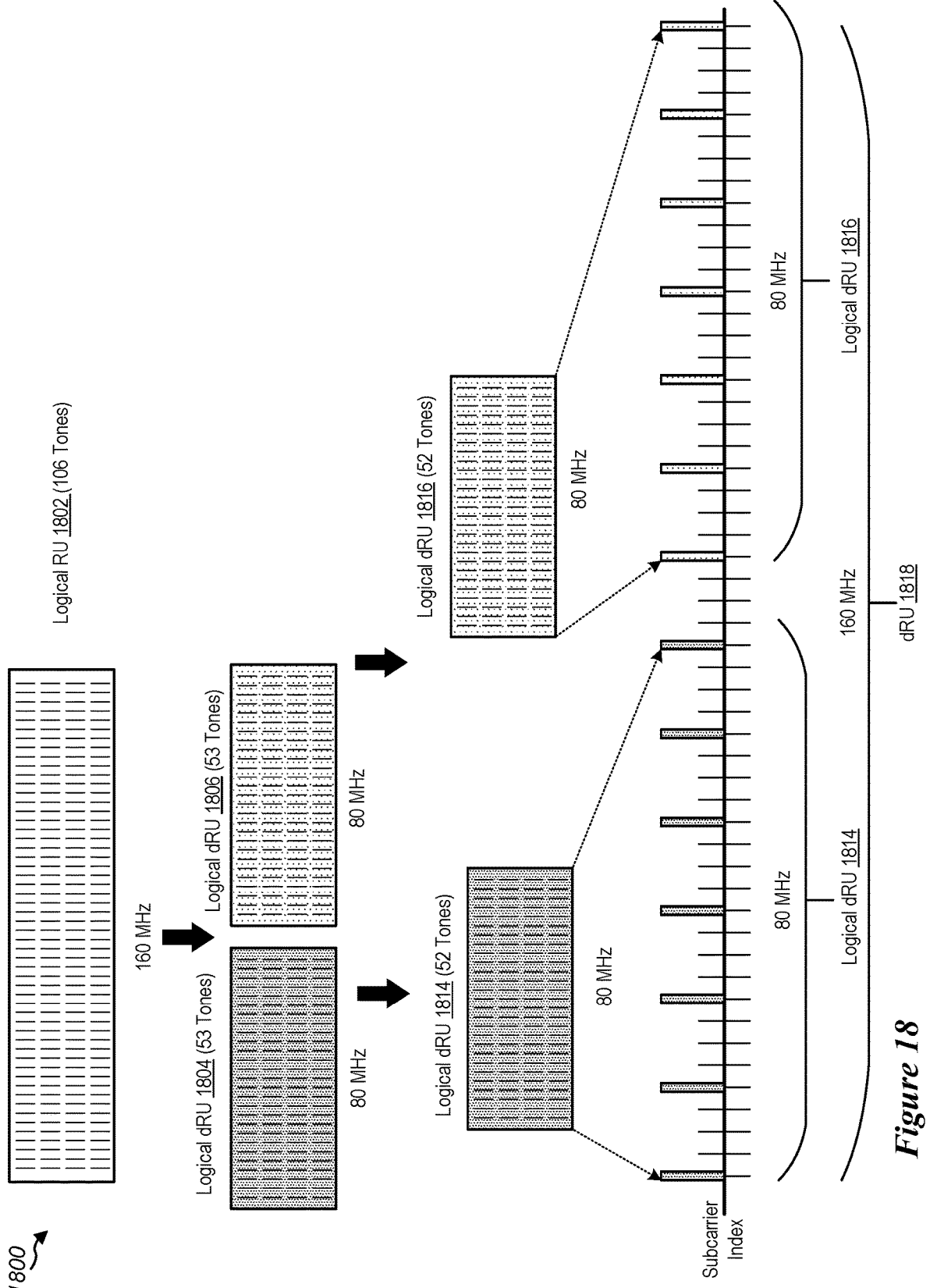
FIG. 18 shows another example of a distributed tone mapping process that supports enhanced distributed transmission operations.

In some such examples, the second wireless communication device 650 may first quantize or reduce the amount of tones to enable the second wireless communication device 650 to use a stored tone distribution plan, as described further with reference to FIG. 11 and FIG. 18.

With regards to the two-step tone mapping procedures, the LTF tones may be mapped or distributed in a two-step manner similar to the data tones. For example, the LTF tones may be distributed across a spreading bandwidth according to a dRU LTF tone plan for the spreading bandwidth and then interleaved across the distribution bandwidth, distributed across the distribution bandwidth according to a dRU LTF tone plan for the distribution bandwidth, or have its tone spacing increased according to an upclocked version of the dRU LTF tone plan for the spreading bandwidth. Alternatively, for when data tones are first segment into subchannels and then distributed over the subchannels, the LTF tones may be segmented into the subchannels and then distributed over the subchannels according to a dRU LTF tone plan for the spreading bandwidth.

The first wireless communication device 602 receives the second data packet 629, and optionally other data packets which make up the PPDU indicated by the first data packet 628. The first wireless communication device 602 may store the second data packet 629 in the buffer 626 and process the second data packet 629. For example, the first wireless communication device 602 may use the distributed tone demapping scheme information 622 and the distributed tone demapping pattern information 624 to demap the modulated and distributed symbols of the second data packet 629. To illustrate, the first wireless communication device 602 may demap or deparse the received modulated and distributed symbols in a step operation if the first wireless communication device 602 is configured to, such as the hardware for, processing received signals across the entire distribution bandwidth.

However, if the first wireless communication device 602 is operable to process received signals across only a portion of the distribution bandwidth, such as the spreading bandwidth, the first wireless communication device 602 may perform a two-step demapping process to reverse the distributed tone mapping performed by the second wireless communication device 650 and reorder the received modulated symbols. An example of a two-step demapping process is described further with reference to FIG. 13. After the received modulated symbols are demapped, the symbols may be demodulated. Alternatively, the symbols may be demodulated during the demapping process. For example, the received symbols may be deparsed or deinterleaved across the entire distribution bandwidth to re-segment or group the symbols, and then each group of symbols may be demodulated and further demapped according to a tone distribution plan for the spreading bandwidth.

As described above with reference to FIG. 6, the wireless communications system 600 may support enhanced distributed transmission operations. In some examples, by extending dRUs to greater than 80 MHz, the wireless communications system 600 enables increased power gain for wider channels for a given PSD while utilizing current hardware.

Figure 7:
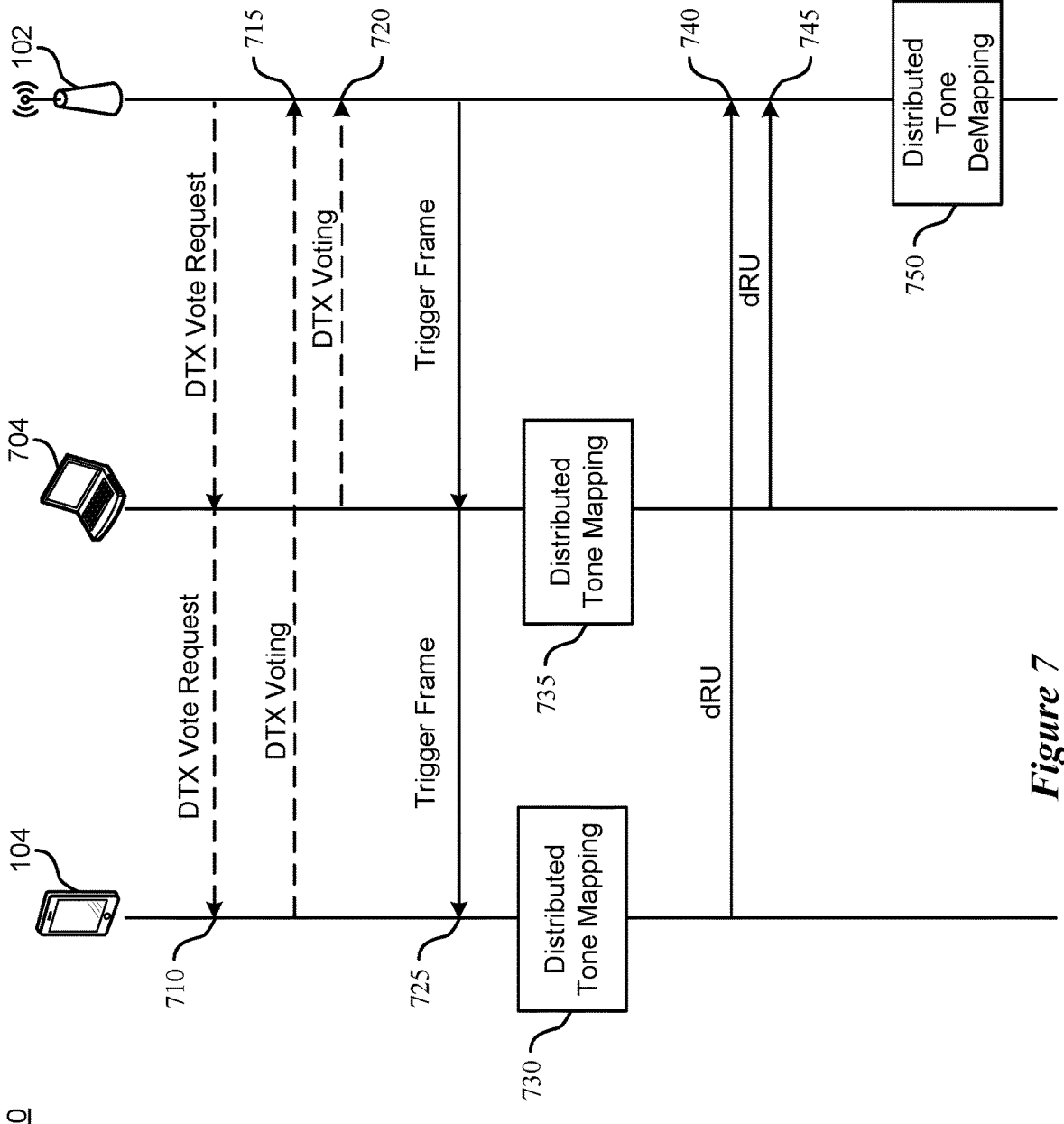
FIG. 7 shows a timing diagram of an example wireless communication system that supports enhanced distributed transmission operations.

Referring to FIG. 7, FIG. 7 is a timing diagram 700 illustrating a wireless communication system that supports enhanced distributed transmissions according to one or more aspects. The example of FIG. 7 corresponds to an example of enhanced distributed transmissions operations for uplink communications to an AP.

The example of FIG. 7 includes similar devices to the devices described in FIGS. 1 and 6, such as an AP 102, a first STA 104, and a second STA 704. The devices of FIG. 7 may include one or more of the components as described in FIG. 6, 16, or 17.

At 710, the AP 102 transmits a distributed transmission voting transmission to the first STA 104, the second STA 704 or both. For example, the AP 102 may transmit (such as broadcast) a trigger frame, a voting message, or another transmission which requests STAs to provide information, such as vote, on whether to use dRUs or rRUs for one or more upcoming transmissions, such as a to be scheduled PPDU. The AP 102 may request STAs vote on which 80 MHz blocks or subchannels of a bandwidth of a wireless channel to use dRUs or rRUs.

At 715 and 720 the STAs may respond to the distributed transmission voting transmission. For example, the first STA 104 may transmit a message or frame indicating its preference or capability for dRU or rRU. The indication may indicate a maximum spreading bandwidth the STA is configured for. The second STA 704 may also transmit a similar message or frame indicating its preference or capability for dRU or rRU for one or more 80 MHz blocks of the wireless channel to use dRUs or rRUs.

At 725, the AP 102 transmits a trigger frame to the first STA 104, the second STA 704, or both to schedule a PPDU. For example, the AP 102 may transmit (such as broadcast) a trigger frame indicating a PPDU (such as a distributed transmission) with one or more dRUs. The PPDU or distributed transmission may be a hybrid PPDU or hybrid transmission that also includes a rRU. The trigger frame includes scheduling information for the PPDU as described with reference to FIG. 6. The trigger frame (such as the scheduling information thereof) may further include RU allocation information, mixed dRU and rRU information, dRU indication information, distribution bandwidth information, spreading bandwidth information, CSD information, or a combination thereof.

At 730 and 735, the STAs may perform distributed tone mapping. For example, the first STA 104 may determine distributed tones for an indicated dRU that correspond to a logical RU allocated to the first STA 104 by the trigger frame at 725. The second STA 704 may also determine distributed tones for an indicated dRU that correspond to a logical RU allocated to the first STA 104 by the trigger frame at 725. The STAs may determine the distributed tones as described with reference to any of FIG. 5, 6, or 8-12. In some examples, the distributed tones include tones for or associated with payload data (data tones or simply tones) and tones for or associated with an LTF sequence (LTF tones). As described with reference to FIG. 6 and further in FIGS. 8-12, the LTF tones may be determined or distributed according to an LTF tone distribution plan which is based on or associated with the tone distribution plan for the payload data and the spreading bandwidth.

At 740 and 745, the STAs may transmit their respective dRU(s). For example, the first STA 104 may modulate symbols over the determined distributed tones for the indicated dRU to transmit the dRU for the PPDU. The second STA 704 may also modulate symbols over the determined distributed tones for the indicated dRU to transmit the dRU for the PPDU. The symbols modulated over the distributed tones may include or correspond to symbols for payload data (data symbols or simply symbols) and symbols for LTF sequence data (LTF symbols).

In some examples, STF symbols may be modulated onto different tones an according to an STF tone plan for or associated with the dRU tone plan, such as a dRU tone plan associated with the distribution bandwidth. In some such examples, the STAs may apply a CSD, such as per user or STA, CSD, to a STF associated with the PPDU. For example, a STA may apply a CSD value to the STF based on a dRU tone plan associated with the distribution bandwidth. The CSD value may be determined based on the dRU CSD start index information. The CSD may enable the AP 102 to determine which STA sent which symbol. Additionally, or alternatively, one or more of the STAs allocated RUs for the PPDU may employ phase rotation to differentiation its symbols from other STAs.

At 750, the AP 102 receives the dRUs from the STAs, such signals representing the modulated symbols, and processes the received dRUs. For example, the AP 102 receives the first symbols for the first dRU from the first STA 104 and the second symbols for the second dRU from the second STA 704. However, as the first and second symbols are on distributed tones and may even be interleaved with one another in some examples, the AP 102 must demap the received symbols to process the PPDU. To illustrate, the AP 102 may process the received symbols by deparsing the received symbols to segment the first symbols and the second symbols. The AP 102 may further process or map the first symbols and the second symbols separately according to a tone distribution plan, such as a tone distribution plan associated with the spreading bandwidth to reorder the symbols according to the allocated logical RUs indicated by the trigger frame at 725.

Although an uplink example with multiple STAs is illustrated in FIG. 7, in other examples, additional or fewer STAs may be allocated dRUs. Additionally, or alternatively, one or more other STAs may be allocated one or more rRUs. Furthermore, in other examples an AP may transmit a PPDU having a dRU. For example, in a single user downlink scenario, an AP may transmit a logical RU which does not occupy an entire channel, and thus may experience a power gain by utilizing dRUs to transmit the PPDU in downlink.

Accordingly, in the example of FIG. 7, devices of the network may be able to engage in enhanced distributed transmission operations to increase a power gain without increasing a PSD (such as satisfying a PSD setting or limit), which may improve network operations and user experience.

FIGS. 8-12 illustrate examples of tone distribution operations according to some aspects of the present disclosure. The operations of FIGS. 8-12 may be implemented by a wireless AP, a wireless STA, or components thereof, as described herein. For example, the processes of FIGS. 8-12 may be performed by a wireless communication device, such as the first wireless communication device 602 of FIG. 6 or the wireless communication device 1600 described with reference to FIG. 16, operating as or within a wireless AP or a wireless STA. In some examples, the process 1100 may be performed by a wireless AP such as one of the APs 102 described with reference to FIG. 1, or a wireless STA such as one of the 104 described with reference to FIG. 1. In FIGS. 8-12 spectral or spectrum lines are illustrated denoting a bandwidth of a wireless channel or a PPDU within a wireless channel. Spacing within the wireless channel along the spectral lines is approximated by tick marks.

Figure 8:
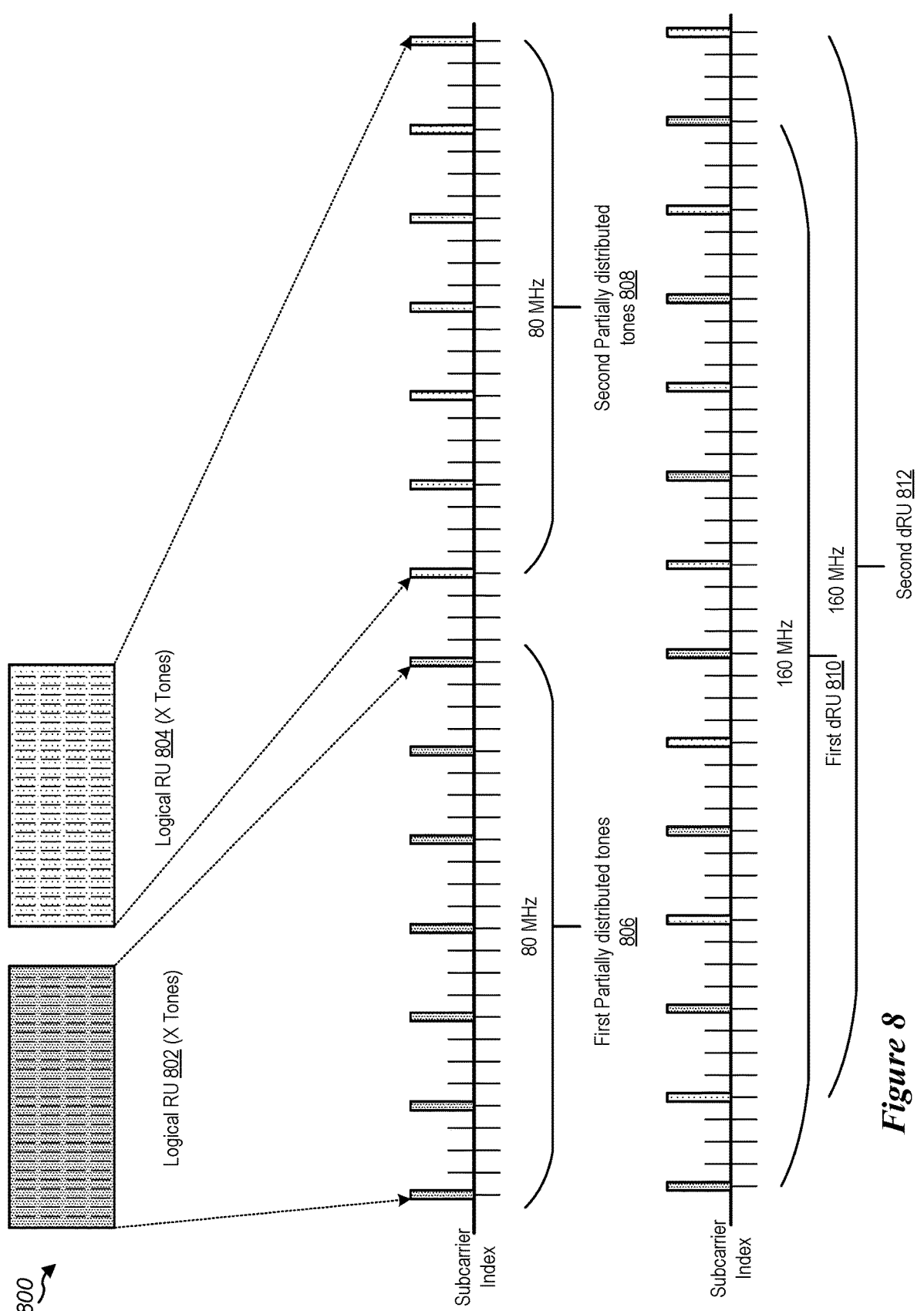
FIG. 8 shows an example of a distributed tone mapping process that supports enhanced distributed transmission operations.

Referring to FIG. 8, FIG. 8 illustrates an example process 800 performable at a wireless communication device that is capable of or configured for enhanced distributed transmission tone mapping operations according to some aspects of the present disclosure. Process 800 is a two-step tone mapping operation where a device first distributes its allocated tones over a spreading bandwidth or local bandwidth allocation, such as a local 80 MHz bandwidth that the allocated logical RU belongs to, and then distributes the partially or locally distributed tones over a larger bandwidth, such as a distribution bandwidth, a full bandwidth of the PPDU, or a full bandwidth of the channel.

The spreading and distribution bandwidths may be allocated by the scheduling device, such as an AP 102. For example, the trigger frame may include two indications for the spreading and distribution bandwidths, one bandwidth for spreading or local/partial distribution of a smaller bandwidth or subchannel, and another bandwidth for full distribution over the distribution bandwidth. Alternatively, in some examples a single distribution bandwidth may be provided which indicates the full spreading bandwidth, such as 160 MHz or 320 MHz. Devices of the network may then partially or locally spread or distribute the allocated tones according to a maximum tone distribution plan bandwidth or according to hardware limitations, such as 80 MHz. After the distributed tones of a dRU corresponding to tones of an allocated logical RU are identified, the device may modulate symbols for or associated with the logical RU onto or over the distributed, non-contiguous tones of the dRU.

In the example of FIG. 8, a device, such as AP 102, schedules a PPDU (such as a distributed transmission or hybrid transmission) including a logical RU 802 (first logical RU) and a logical RU 804 (second logical RU). The logical RU 802 may be allocated to a first device (first STA) and the logical RU 804 may be allocated to a second device (second STA).

During operation, the first device, such as a first STA 104, performs tone distribution operations to distribute (partially distribute) the allocated contiguous tones of logical RU 802 across a spreading bandwidth associated with the logical RU 802 or the dRU 810. To illustrate, the first STA may perform distributed tone mapping to determine which distributed tones to modulate symbols for the PPDU and distribute the contiguous tones associated with the logical RU 802 to a first 80 MHz portion of a 160 MHz channel or a 160 MHz PPDU to generate first partially distributed tones 806.

The second device also performs tone distribution operations to distribute (partially distribute) the allocated contiguous tones of logical RU 804 across a second spreading bandwidth associated with the logical RU 804 or the dRU 812. To illustrate, the second STA may perform distributed tone mapping to determine which distributed tones to modulate symbols for the PPDU and distribute the contiguous tones associated with the logical RU 804 to a second 80 MHz portion of 160 MHz channel or 160 MHz PPDU to generate second partially distributed tones 808. Although the second spreading bandwidth associated with the logical RU 804 or the dRU 812 is the same as the spreading bandwidth associated with the logical RU 802 or the dRU 810 in the example of FIG. 8, in other examples the spreading bandwidths may be indicated per dRU or device and may be different.

The first device then performs second tone distribution operations to further distribute the first partially distributed tones 806 corresponding to the tones of the logical RU 802 across a distribution bandwidth associated with the logical RU 802 or the dRU 810. To illustrate, in the example of FIG. 8 the first STA distributes the first partially distributed tones 806 across the entire bandwidth of the 160 MHz channel or 160 MHz PPDU to generate distributed, non-contiguous tones of the first dRU 810. The first device may then modulate symbols associated with the logical RU 802 of the PPDU to the distributed, non-contiguous tones of the first dRU 810 to transmit its portion of the PPDU.

The second device then performs second tone distribution operations to further distribute the second partially distributed tones 808 corresponding to the tones of the logical RU 804 across a distribution bandwidth associated with the logical RU 804 or the dRU 812. To illustrate, in the example of FIG. 8 the second STA distributes the second partially distributed tones 808 across the entire bandwidth of the 160 MHz channel or 160 MHz PPDU to generate distributed, non-contiguous tones of the second dRU 812. The second device may then modulate symbols (second symbols) associated with the logical RU 804 of the PPDU to the distributed, non-contiguous tones of the second dRU 812 to transmit its portion of the PPDU.

As illustrated in FIG. 8, the distributed tones of multiple dRUs are interspersed with each other over the distribution bandwidth. Specifically, in the example of FIG. 8, the distributed tones of the first dRU 810 are interleaved with the distributed tones of the second dRU 812. The second tone distribution operations performed by the first and second STAs may be referred to as interleaving the tones (the partially distributed tones 806 and 808) which may be used to identify the distributed tones of the dRUs 810 and 812. The STAs may the transmit their respective symbols in an interleaved fashion over their respective tones, which are interleaved with one another. For example, tones from the first dRU 810 (first 80 MHz or spreading bandwidth) occupy odd tones of the distribution bandwidth and those from the second dRU 812 (second 80 MHz) take on even tones of the distribution bandwidth.

Although the distributed tones of dRUs 810 and 812 are distributed across a distribution bandwidth which spans or occupies the entire bandwidth of the wireless channel or the PPDU in the example illustrated in FIG. 8, in other examples, the distributed tones of dRUs 810 and 812 may be distributed across the distribution bandwidth that is less than the entire bandwidth of the channel or the PPDU. To illustrate, the distributed tones of dRUs 810 and 812 may be distributed over a distribution bandwidth of 160 MHz of a 240 or 320 MHz channel. In some such examples, the other portion of the wireless channel (such as the other 80 or second 160 MHz of the wireless channel) may be punctured or may be dedicated to one or more rRUs, such as when the PPDU is a hybrid transmission of dRUs and rRUs.

Although, two logical RUs are allocated in the example of FIG. 8, one or more other RUs may be allocated in other examples. For example, an additional RU may be allocated to one or more other devices (such as a third device), an additional RU may be allocated to the first device or the second device, or a combination thereof.

In some examples, a device may distribute LTF tones or determine distributed LTF tones based on the tone plan for the payload data. For example, the device may modulate LTF symbols over distributed LTF tones that were determined by mapping allocated LTF tones based on an existing 80 MHz dRU LTF tone plan and interleaving the mapped LTF tones over the distribution bandwidth. In such examples, the LTF tone plan and values of LTF symbols may correspond to a tone plan and values of LTF symbols for the spreading bandwidth that are distributed across the distribution bandwidth. Values of LTF tones or LTF symbols may include or corresponds to values of one or negative one.

Alternatively, the device may distribute LTF tones or determine distributed LTF tone values based on a new tone plan for distribution bandwidth. For example, the device may utilize a LTF sequence for a 160 MHz for dRU/RU, which includes more LTF symbols and LTF tones than an LTF sequence for an 80 MHz dRU/RU. In such examples, the LTF tone plan and values of LTF symbols may correspond to a tone plan and value of LTF symbols for the distribution bandwidth, such as an increased amount of LTF symbols.

The tone index values or tone indices of the dRUs 810 and 812 may be determined based on a table or a calculated from a formula. Examples of such tone index value determination for tone mapping and interleaving operations are described further with reference to FIGS. 19A and 19B, and FIGS. 20A and 20B. Deriving dRU tone indices with a formula or a simplified table, such as one that leverages existing 80 MHz tones for dRU tone index determination enables simpler tables and less memory to store the dRU tone indices or data for deriving the dRU tone indices. In some such examples, half of the dRUs are just one tone shift away from the other half of the dRUs. Such interleaving may enable even spreading from 80 MHz to larger bandwidth and may retain all of the 80 MHz dRU properties, including a peak-to-average power ratio (PAPR). Additionally, in some examples no new LTF designs are needed.

Figure 9:
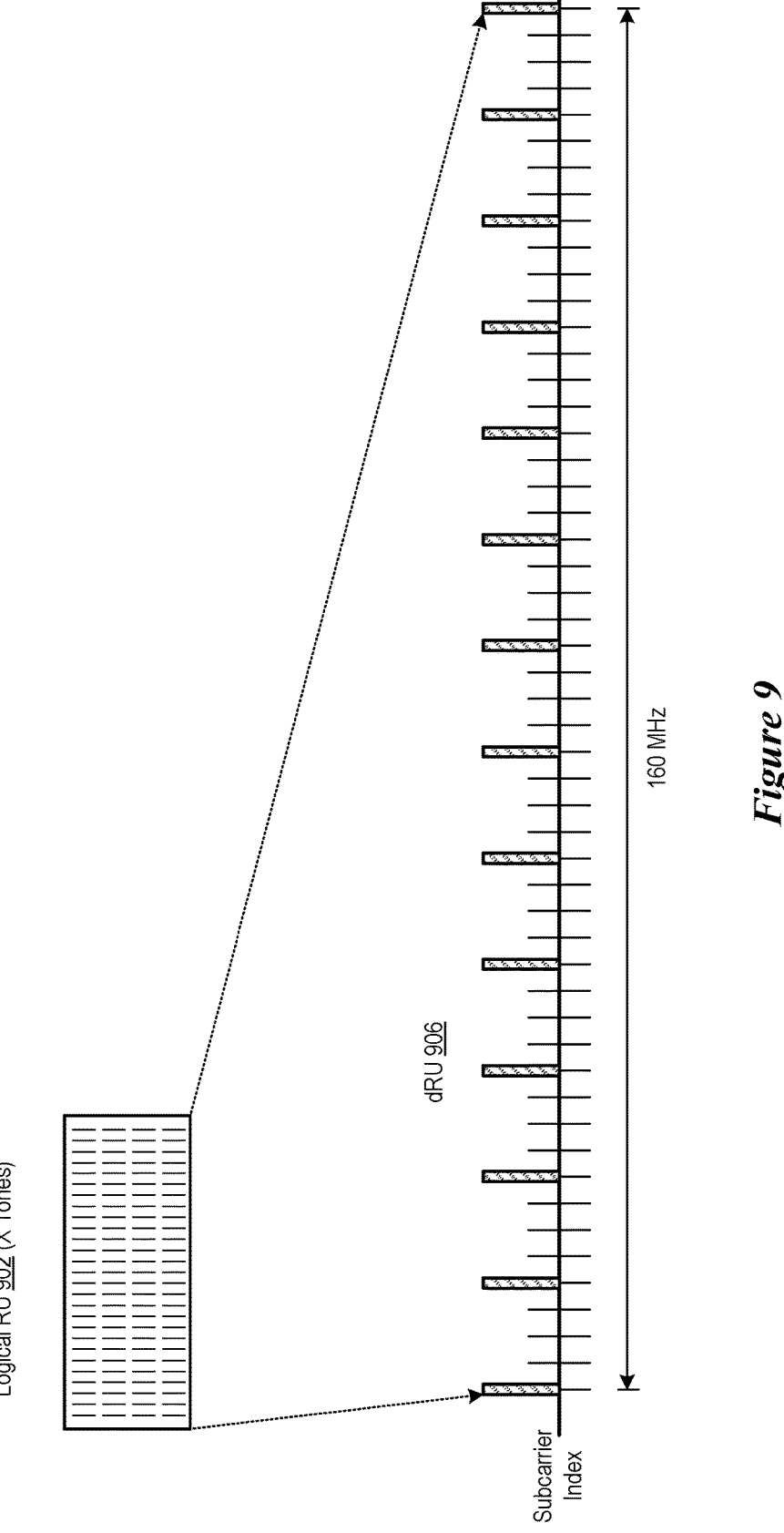
FIG. 9 shows another example of a distributed tone mapping process that supports enhanced distributed transmission operations.

Referring to FIG. 9, FIG. 9 illustrates an example process 900 performable at a wireless communication device that is capable of or configured for enhanced distributed transmission tone mapping operations according to some aspects of the present disclosure. Process 900 is a one-step tone mapping operation where a device distributes its allocated tones over a distribution bandwidth that is larger than 80 MHz, or where the device distributes its allocated tones over a spreading bandwidth that is larger than 80 MHz and that is equal to a size of a distribution bandwidth. In such examples, where two bandwidths are used, such as spreading and distribution bandwidths, the spreading and distribution bandwidths are equal and may also be equal to or less than a size of the PPDU or wireless channel. To illustrate, the equal spreading and distribution bandwidth may be less than the PPDU or wireless channel when the PPDU does not span the entire channel or when the wireless channel is punctured and has a portion of its bandwidth restricted or not allocated to the PPDU.

The spreading bandwidth, the distribution bandwidth, or both may be allocated by the scheduling device, such as AP 102. For example, the trigger frame may include two indications for the spreading and distribution bandwidths, or a single indication for one or the other. Devices of the network may then distribute the allocated tones of a particular logical RU according to the indicated bandwidth to determine the distributed, non-contiguous tones of the dRU. After the tones of a dRU corresponding to an allocated logical RU are identified, the device may modulate symbols for or associated with the logical RU onto or over the distributed, non-contiguous tones of the dRU.

In the example of FIG. 9, a device, such as AP 102, schedules a PPDU (such as a distributed transmission or hybrid transmission) including a logical RU 902. The logical RU 902 may be allocated to a device (STA 104).

During operation, the first device, such as a first STA 104, performs tone distribution operations to distribute (fully distribute) the allocated contiguous tones of logical RU 902 across a spreading bandwidth or distribution bandwidth associated with the logical RU 902 or the dRU 906. To illustrate, the STA may perform distributed tone mapping to determine which distributed tones to modulate symbols for the PPDU and distribute the contiguous tones associated with the logical RU 802 across the entire portion of a 160 MHz channel or a 160 MHz PPDU. As compared to the two-step tone mapping operations of FIG. 8, the tone mapping operations of FIG. 9 are performed in one step across the full distribution bandwidth. As described above, the one-step distributed tone mapping can be signaled by using both spreading and distribution bandwidths, that is the spreading bandwidth is equal to the distribution bandwidth, or by using a single bandwidth indication (spreading or distribution) for one-step spreading or distributing of the tones of the logical RU 902.

The device may then modulate symbols associated with the logical RU 902 of the PPDU to the distributed, non-contiguous tones of the dRU 906 to transmit its portion of the PPDU. Although FIG. 9 illustrates operations for a single RU and a single STA, in other examples, one or more other (second) STAs may be allocated logical RUs and may perform one-step distributed tone mapping operations. Additionally, a STA may be allocated multiple RUs in other examples.

Additionally, or alternatively, although the distributed tones of the dRU 906 are distributed across a spreading/distribution bandwidth which spans or occupies the entire bandwidth of the wireless channel or the PPDU in the example illustrated in FIG. 9, in other examples, the distributed tones of the dRU 906 may be distributed across the distribution bandwidth that is less than the entire bandwidth of the channel or the PPDU. To illustrate, the distributed tones of the dRU 906 may be distributed over a distribution bandwidth of 160 MHz of a 240 or 320 MHz channel. In some such examples, the other portion of the wireless channel (such as the other 80 or second 160 MHz of the wireless channel) may be punctured or may be dedicated to one or more rRUs, such as when the PPDU is a hybrid transmission of dRUs and rRUs.

In some examples, a device may distribute LTF tones or determine distributed LTF tone values based on the tone plan for the payload data. For example, the device may modulate symbols over distributed LTF tones that were mapped based on an existing 80 MHz dRU LTF tone plan and interleaved over the distribution bandwidth, as described with reference to FIG. 8. In such examples, the LTF tone plan and values of LTF symbols may correspond to extended LTF symbols of an 80 MHz dRU LTF.

Alternatively, the device may distribute LTF tones or determine distributed LTF tones based on a new tone plan for the distribution bandwidth similar to the one-step operations for distributing the tones for payload data described in FIG. 9. For example, the device may utilize a new LTF sequence and new LTF tone plan for bandwidths wider than 80 MHz, such as an LTF sequence and corresponding dRU LTF tone plan for a 160 MHz for dRU/RU, which includes more LTF symbols and LTF tones than an LTF sequence for an 80 MHz dRU/RU.

Figure 10:
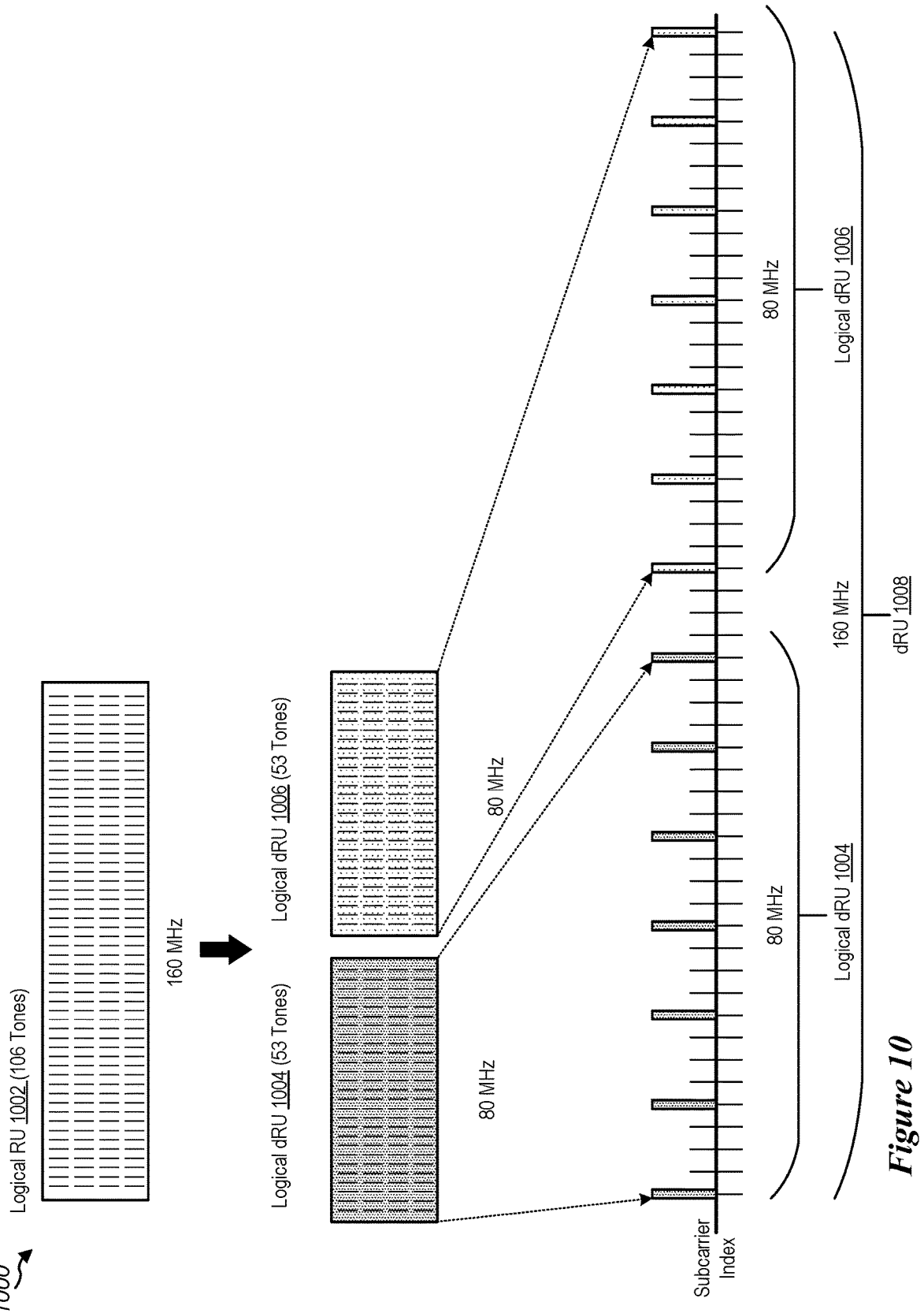
FIG. 10 shows another example of a distributed tone mapping process that supports enhanced distributed transmission operations.

Referring to FIG. 10, FIG. 10 illustrates an example process 1000 performable at a wireless communication device that is capable of or configured for enhanced distributed transmission tone mapping operations according to some aspects of the present disclosure. Process 1000 is a two-step tone mapping operation where a device first segments its allocated tones to available subchannels of the distribution bandwidth. The size of the subchannels of the distribution bandwidth may be set or fixed, such as at a maximum processing size, for example 80 MHz, or the size of the subchannels of the distribution bandwidth may correspond to a spreading bandwidth. As an illustrative example, a 320 MHz distribution bandwidth may have four 80 MHz subchannels. In the implementation of FIG. 10, the device segments, splits or maps it allocated tones of the logical RU to the subchannels using a parser, such as a proportional parser or a round robin parser.

In some examples, the parser, such as a proportional parser, splits a first half of the allocated tones to a first subchannel and a second half of the allocated tones to a second subchannel. In other examples, the parser, such as a round robin parser, may split the allocated tones in half by routing or distributing even tones to a first subchannel and odd tones to a second subchannel. The parser splits the tones evenly in the example of FIG. 10. However, in other examples where the groups may have uneven bandwidth, due to puncturing or different spreading or distribution bandwidth sizes, a proportional round robin (PPR) parser may split the tones proportionally between the groups based on a bandwidth ratio, such as 1:2, 1:3, 2:3, and so on.

The spreading and distribution bandwidths may be allocated by the scheduling device (such as AP 102), as described with reference to FIGS. 8 and 9. Alternatively, in some examples the scheduling device may indicate a distribution bandwidth and a number of subchannels, and a receiving device, STA, may determine a size of the subchannel based on the distribution bandwidth and number of subchannels. In other examples, the scheduling device may only indicate a distribution bandwidth or a spreading bandwidth, and a receiving device may determine a number of subchannels for the bandwidth based on a pre-configured or stored subchannel size, such as a maximum processing size of 80 MHz.

In the example of FIG. 10 a device, such as AP 102, schedules a PPDU (such as a distributed transmission or hybrid transmission) including a logical RU 1002. The logical RU 1002 may be allocated to a device (STA).

During operation, the device, such as a STA 104, performs tone distribution operations to distribute the allocated contiguous tones of logical RU 1002 over the distribution or spreading bandwidth, which in the example of FIG. 10 is 160 MHz. The device determines a number of subchannels to segment the allocated contiguous tones of logical RU 1002 into. As indicated above, the number of subchannels may be explicitly indicated by the AP or may be determined by the STA based on the distribution bandwidth, and optionally on the spreading bandwidth or a local maximum tone mapping bandwidth. In the example of FIG. 10, the device determines that two subchannels are available for an indicated distribution bandwidth of 160 MHz, and the device segments the allocated tones into two groups or subsets of tones, one for each subchannel. For example, the device may allocate a first half of the allocated tones or all of the even tones to a first 80 MHz subchannel, and may allocate a second half of the allocated tones or all of the odd tones to a second 80 MHz subchannel. Alternatively other allocation schemes are possible to divide the allocated tones into groups for the subchannels.

After the tones are split and segmented or distributed to the respective subchannels, referred to as tone segmentation or segmentation of the tones, the device may perform second tone mapping operations to further distribute the segmented tones of each subchannel. To illustrate, the device may distribute (fully distribute) the tones of logical RU 1002 by performing tone distribution on the groups of segmented tones in each subchannel. For example, the device may distribute the tones of a first logical dRU 1004 (such as a local dRU or segmented dRU) across the first subchannel according to a tone distribution plan for the bandwidth of the subchannel, which may be equal to the spreading bandwidth when indicated by the AP or to a maximum or pre-set local spreading amount.

The device also performs tone distribution operations for the second subchannel. For example, the device may distribute the tones of a second logical dRU 1006 (such as a logical dRU) across the second subchannel according to the tone distribution plan for the bandwidth of the subchannel.

The distribution in the first subchannel generates distributed, non-contiguous tones of the first logical dRU 1004 and the distribution in the second subchannel generates distributed, non-contiguous tones of the second logical dRU 1006. The distributed, non-contiguous tones of the first logical dRU 1004 and the distributed, non-contiguous tones of the second logical dRU 1006 make up the distributed, non-contiguous tones of the dRU 1008 which corresponds to the logical RU 1002. The device then modulates symbols associated with the first logical dRU 1004 of the PPDU over the distributed, non-contiguous tones of the dRU 1008 to transmit its portion of the PPDU.

As the device split the allocated tones of the logical RU into two smaller sets and distributed each smaller set, the device may create additional tone distribution mappings. For example, the AP may allocate the device a 106-tone RU. In dividing the 106-tone RU into two 53-tone RUs, the device may utilize additional and potentially new tone distribution mapping patterns. Additionally, an amount of data symbols and an amount of pilot symbols for the allocated RU may be different than a total amount of data symbols and a total amount of pilot symbols for the two smaller logical dRUs. To illustrate, a 106-tone RU or dRU may include four pilot symbols and each 53-tone RU or dRU may include four pilot symbols. This results in eight total pilot symbols, or four additional pilot symbols, when a 106-tone RU or dRU is converted into 53-tone dRUs by the STA for mapping. These additional two pilot tones (LTF tones) may reduce an amount of tone available for data.

Although, the distributed tones of dRU 1008 are distributed across a distribution bandwidth which spans or occupies the entire bandwidth of the wireless channel or the PPDU in the example illustrated in FIG. 10, in other examples, the distributed tones of dRU 1008 may be distributed across the distribution bandwidth that is less than the entire bandwidth of the channel or the PPDU. To illustrate, the distributed tones of dRU 1008 may be distributed over a distribution bandwidth of 160 MHz of a 240 or 320 MHz channel. In some such examples, the other portion of the wireless channel (such as the other 80 or second 160 MHz of the wireless channel) may be punctured or may be dedicated to one or more rRUs, such as when the PPDU is a hybrid transmission of dRUs and rRUs.

Although, a single logical RU is allocated in the example of FIG. 10, one or more other RUs may be allocated in other examples. For example, an additional RU may be allocated to one or more other devices (such as a third device), an additional RU may be allocated to the first device or the second device, or a combination thereof.

Although the example of FIG. 1000 illustrates a wireless channel without puncturing, in other examples the wireless channel containing the PPDU may be punctured and have a portion of its bandwidth reserved and not available to the PPDU. In such punctured examples, the devices may segment the allocated tones into the unpunctured portions proportionally. For example, when the 106-tone RU of logical RU 1002 is allocated to the device in a 160 MHz channel that has been punctured by 40 MHz, such as into two portions of bandwidth, the remaining bandwidth 120 MHz of the channel may correspond to an actual or usable bandwidth. This usable bandwidth may correspond to bandwidth portions or subchannels for a 484 tone RU and for a 996 tone RU. The PRR parser of the device may parse 36 tones to the first portion RU (RU484) and parse 70 tones to the second portion RU (RU996) to segment the tones into the two unequal subchannels. The device may then distribute the segmented tones in each subchannel according to re-naturalized tone indices, dependent on the punctured bandwidth or pattern, for the RU index.

Referring to FIG. 11, FIG. 11 illustrates an example process 1100 performable at a wireless communication device that is capable of or configured for enhanced distributed transmission tone mapping operations according to some aspects of the present disclosure. Process 1100 is a two-step tone mapping operation, similar to process 1000 of FIG. 10, where a device first segments its allocated tones to available subchannels of the distribution bandwidth. A bandwidth or size of the subchannels may correspond to the spreading bandwidth. However, as compared to process 1000 of FIG. 10 which utilizes a full or indicated amount of tones during segmentation and the subsequent tone distribution/mapping, the process 1100 of FIG. 11 first quantizes an amount of allocated tones to utilize existing or pre-stored tone distribution plans for the tone distribution within the subchannels of the distribution bandwidth. For example, a device may reduce an amount of allocated tones before segmenting the tones to ensure that each subchannel has an amount of tones which corresponds to an existing or pre-stored tone distribution plans after segmentation. To illustrate, for the same 106 tone allocation of FIG. 10, the device may quantize the tones by adjusting, such as reducing, the 106 tones to 104 tones. The device may then follow the same operations as described in FIG. 10.

For example, the device may segment the reduced or quantized amount of tones (104) to the two subchannels to create two logical 52-tone dRUs because the device has a pre-stored or existing tone distribution plan (pattern) for mapping 52 tones over 80 MHz. Accordingly, the device may utilize existing tone distribution plans (such as an RU size currently defined in for an OFDMA tone plan, which some examples are 26, 52, 78, 106, 132, 242, 484, 968, and 996 tones) and may not have to obtain or determine new tone distribution patterns for the subchannels. In addition to any change in the amount of data or pilot (LTF) symbols for the process 1000 of FIG. 10, the process 1100 of FIG. 11 also imparts a small data or pilot (LTF) symbol adjustment when the quantizer reduces an amount of the tones.

Alternatively, in other examples the quantizer may increase an amount of tones to a nearest existing stored tone distribution plan and pad the added tones, that is send symbols representing padded data or send additional pilot (LTF) symbols over the additional tones. Additionally or alternatively, in other examples after the initial distribution of the quantized amount of tones in each 80 MHz using the existing tone distribution plans, the tone mapper further pads some extra tones so that the amount of tones in each 80 MHz is the same as the amount of the segmented tones before quantization, that is send symbols representing padded data or send additional pilot (LTF) symbols over the additional tones.

In the example of FIG. 1100 a device, such as AP 102, schedules a PPDU (such as a distributed transmission or hybrid transmission) including a logical RU 1102. The logical RU 1102 may be allocated to a device (STA).

During operation, the device, such as a STA 104, performs tone distribution operations to distribute the allocated contiguous tones of logical RU 1102 over the distribution or spreading bandwidth, which in the example of FIG. 11 is 160 MHz. The device determines a number of subchannels to segment the allocated contiguous tones of logical RU 1102 into, as described with reference to FIG. 10.

In the example of FIG. 11, the device determines that two subchannels are available for an indicated distribution bandwidth of 160 MHz, such as based on the spreading bandwidth of 80 MHz. However, in the process 1100 of FIG. 11, the device further determines that dividing the 106 tones (106 RU) of the allocated logical RU 1102 into two subchannels would result in two 53-tone logical dRUs (2×53 dRU), first logical dRU 1104 and second logical dRU 1106. The device determines to quantize or adjust the amount of allocated tones such that the amount of segmented tones for each logical dRU matches an amount of tones of an existing tone distribution plan for the subchannel bandwidth or the spreading bandwidth. As the device has an existing tone distribution plan for 52 tones over 80 MHz, the device quantizes (reduces) the 106 allocated tones by two to generate a quantized amount of tones (also referred to as quantized tones) of 104 tones.

The device segments the quantized tones (that is a quantized amount of the allocated tones) into two groups or subsets of tones, one for each subchannel, similar to as described with reference to FIG. 10. For example, the device may segment the tones using a proportional parser, such as a round robin parser. After the quantized tones are split and segmented or distributed to the respective subchannels, referred to as tone segmentation and quantization, the device may perform tone mapping operations to distribute the segmented and quantized tones of each subchannel.

To illustrate, the device may distribute (fully distribute) the quantized tones of the logical RU 1102 by performing tone distribution in each subchannel. For example, the device may distribute the tones of the first logical dRU 1104 (such as a local dRU or segmented dRU) across the first subchannel according to a tone distribution plan for the bandwidth of the subchannel, which may be equal to the spreading bandwidth when indicated by the AP or to a maximum or pre-set local spreading amount, such as due to network setting or hardware constraints.

The device also performs tone distribution operations for the second subchannel. For example, the device may distribute the tones of the second logical dRU 1106 (such as a local dRU or segmented dRU) across the second subchannel according to the tone distribution plan for the bandwidth of the subchannel.

The distribution in the first subchannel generates distributed, non-contiguous tones of the first logical dRU 1104 and the distribution in the second subchannel generates distributed, non-contiguous tones of the second logical dRU 1106. The distributed, non-contiguous tones of the first logical dRU 1104 and the distributed, non-contiguous tones of the second logical dRU 1106 make up the distributed, non-contiguous tones of the dRU 1108, which corresponds to the logical RU 1102. The device then modulates symbols associated with the first logical dRU 1104 and the second logical dRU 1106 of the PPDU over the distributed, non-contiguous tones of the dRU 1108 to transmit its portion of the PPDU. When modulating the symbols associated with the first logical dRU 1104 and the second logical dRU 1106, the device may modulate a quantized amount of symbols over the quantized tones to account for the change in the number of tones from the amount of allocated tones. As compared to the process 1000 of FIG. 10, the process 1100 of FIG. 11 does not create additional tone distribution mappings, but rather utilizes or leverages existing tone distribution mappings.

Although, the distributed tones of dRU 1108 are distributed across a distribution bandwidth which spans or occupies the entire bandwidth of the wireless channel or the PPDU in the example illustrated in FIG. 11, in other examples, the distributed tones of dRU 1108 may be distributed across the distribution bandwidth that is less than the entire bandwidth of the channel or the PPDU. To illustrate, the distributed tones of dRU 1108 may be distributed over a distribution bandwidth of 160 MHz of a 240 or 320 MHz channel. In some such examples, the other portion of the wireless channel (such as the other 80 or second 160 MHz of the wireless channel) may be punctured or may be dedicated to one or more rRUs, such as when the PPDU is a hybrid transmission of dRUs and rRUs.

Although, a single logical RU is allocated in the example of FIG. 11, one or more other RUs may be allocated in other examples. For example, an additional RU may be allocated to one or more other devices (such as a second device), an additional RU may be allocated to the first device, or a combination thereof.

Although the example of FIG. 11 involves a 106-tone RU, other size tone allocations may be quantized. For example, as illustrative, non-limiting examples of other quantization options, a 242-tone RU may be quantized and segmented into two 80 MHz 106-tone dRUs over 160 MHz or four 80 MHz 52-tone dRUs over 160 MHz; a 484-tone RU may be quantized and segmented into two 80 MHz 242-tone dRUs over 160 MHz or four 80 MHz 106-tone dRUs over 320 MHz; a 996-tone RU may be quantized and segmented into two 80 MHz 484-tone dRUs over 160 MHz or four 80 MHz 242-tone dRUs over 320 MHz; and two 996-tone RU may be quantized and segmented into four 80 MHz 484-tone dRUs over 320 MHz.

Although the example of FIG. 1100 illustrates a wireless channel without puncturing, in other examples the wireless channel containing the PPDU may be punctured and have a portion of its bandwidth reserved and not available to the PPDU. In such punctured examples, the devices may segment the quantized tones into the unpunctured portions proportionally. Thus, for puncturing with quantized segmentation, the quantization may depend on the puncturing and the size of the unpunctured portions or usable subchannels, such that each subchannel is allocated tones proportionally or evenly and receives an amount of tones for which the device has an existing tone plan.

For FIGS. 10 and 11, a device may distribute LTF tones or determine distributed LTF tone values of the allocated tones similar to the two-step segmentation and distribution operations for the tones for the payload data of the allocated tones. For example, the device may distribute the LTF tones or determine the distributed LTF tone values based on the tone plan for the payload data in some examples. To illustrate, the device may first segment the allocated LTF tones in subsets or groups of LTF tones for each subchannel, and then for each subchannel map the corresponding group of LTF tone values based on an existing 80 MHz dRU LTF tone plan and tone values which are associated with the dRU tone plan. In such examples, the LTF tone plan and value of LTF symbols may correspond to an allocated amount of LTF symbols for the distribution bandwidth.

Alternatively, the device may quantize, such as increase, the amount of LTF such that the amount of LTF symbols may correspond to an allocated amount of LTF symbols for each subchannel for the spreading bandwidth. In such examples, the device segments the quantized LTF tones in subsets or groups of LTF tones for each subchannel, and then for each subchannel map the corresponding group of quantized LTF tones and tone values based on an existing 80 MHz dRU LTF tone plan and tone values which are associated with the dRU tone plan. The device may then modulate LTF symbols (or a quantized amount of LTF symbols) over the determined distributed LTF tones, which were distributed in each subchannel according to a dRU LTF tone plan associated with the subchannel or spreading bandwidth.

Additionally, or alternatively, for FIGS. 10 and 11, a device may perform other processing on a per subchannel (such as per 80 MHz) basis to differentiate the symbols on the tones of subchannels and reduce a PAPR. For example, a device may perform phase rotation on a per subchannel (such as per 80 MHz) basis to differentiate the symbols on the tones of subchannels and reduce a PAPR. To illustrate, the device may perform 90-degree phase rotation on the LTF sequence, the STF sequence or both, of one or more subchannels because with such phase rotation the device may have the same LTF or STF sequence repeated on each subchannel. As another example, a device may assign a different RU index to each subchannel to differentiate the symbols on the tones of subchannels and reduce a PAPR. By assigning a different RU index the LTF and STF sequences generated by the device may differ per subchannel.

Referring to FIG. 12, FIG. 12 illustrates an example process 1200 performable at a wireless communication device that is capable of or configured for enhanced distributed transmission tone mapping operations according to some aspects of the present disclosure. Process 1200 uses an upclocked version of a distributed tone mapping plan for a smaller spreading bandwidth to distribute tones over a larger distribution bandwidth. To illustrate, a base distributed tone mapping plan (such as a tone mapping plan for a spreading bandwidth of 80 MHz) may be upclocked by a factor to extend the base distributed tone plan to additional, wider distribution bandwidths. For the example of 80 MHz, a base distributed tone mapping plan for 80 MHz may be upclocked by a factor of 2 for 160 MHz, a factor of 3 for 240

MHz, a factor of 4 for 320 MHz, and so on, to extend 80 MHz distributed tone plans to additional, wider distribution bandwidths.

Process 1200 may be a one-step mapping operation, similar to process 900 of FIG. 9, where a device distributes its allocated tones over the entire distribution bandwidth in one distribution step according to a mapping plan or scheme. As compared to process 900, process 1200 utilizes an upclocked version of an existing or pre-stored tone plan and does not require additional tone plans to be generated or stored.

Alternatively, process 1200 may be a two-step tone mapping operation, similar to process 800 of FIG. 8, where a device first distributes its allocated tones over a spreading bandwidth, such as an 80 MHz bandwidth, and then distributes the partially distributed tones over a larger bandwidth, such as a distribution bandwidth, a full bandwidth of the PPDU, or a full bandwidth of the channel, according to an upclocked version of the tone distribution plan used to partially spread or distribute the tones over the spreading bandwidth. Using the upclocked version of the tone plan may correspond to increasing a spacing (also referred to as tone spacing) between each adjacent tone to further spread the allocated tones over a wider bandwidth while keeping the amount or number of tones the same. To illustrate, the increase in spacing between each tone may correspond to the upclocking factor, such as adjacent tones may be spaced out by 4 times as much when upclocking from 80 MHz to 320 MHz.

Similar to the description for process 800 in FIG. 8, the spreading and distribution bandwidths may be allocated by the scheduling device (such as AP), as described with reference to FIGS. 8, 9, and 10. Devices of the network may then partially or locally spread or distribute the allocated tones according to a maximum tone distribution plan bandwidth or according to hardware limitations, such as 80 MHz. After the tones of a dRU corresponding to an allocated logical RU are identified, the device may modulate symbols for or associated with the logical RU onto or over the distributed, non-contiguous tones of the dRU.

In the example of FIG. 12, a device, such as AP 102, schedules a PPDU (such as a distributed transmission or hybrid transmission) including a logical RU 1202. The logical RU 1202 may be allocated to a device (STA).

During operation, the device, such as a STA 104, performs tone distribution operations to distribute (partially distribute) the allocated contiguous tones of logical RU 1202 across a spreading bandwidth associated with the logical RU 1202 or the dRU 1206. To illustrate, the STA may perform distributed tone mapping to determine which distributed tones to modulate symbols for the PPDU by distributing the contiguous tones associated with the logical RU 1202 over an 80 MHz spreading bandwidth to generate partially distributed tones 1204.

The device then performs second tone distribution operations to further distribute the partially distributed tones 1204 corresponding to the tones of the logical RU 1202 across a distribution bandwidth associated with the logical RU 1202 or the dRU 1206. To illustrate, in the example of FIG. 12 the STA distributes the partially distributed tones 1204 (14 tones) across the entire bandwidth of the 320 MHz channel or 320 MHz PPDU by enlarging the tone spacing to generate distributed, non-contiguous tones of the dRU 1206 (also 14 tones). The device may then modulate symbols associated with the logical RU 1202 of the PPDU to the distributed, non-contiguous tones of the dRU 1206 to transmit its portion of the PPDU. In the second tone distribution operations, the STA increased a first tone spacing 1210 of the partially distributed tones 1204 to a second tone spacing 1212 of the distributed tone of the dRU 1206, such as by a factor of 4.

Although, the distributed tones of the dRU 1206 are distributed across a distribution bandwidth which spans or occupies the entire bandwidth of the wireless channel or the PPDU in the example illustrated in FIG. 12, in other examples, the distributed tones of the dRU 1206 may be distributed across the distribution bandwidth that is less than the entire bandwidth of the channel or the PPDU. To illustrate, the distributed tones of the dRU 1206 may be distributed over a distribution bandwidth of 160 MHz of a 240 or 320 MHz channel, as an illustrative, non-limiting example. In some such examples, the other portion of the wireless channel (such as the other 80 or second 160 MHz of the wireless channel) may be punctured or may be dedicated to one or more rRUs, such as when the PPDU is a hybrid transmission of dRUs and rRUs.

Although, a single logical RU is allocated in the example of FIG. 12, one or more other RUs may be allocated in other examples. For example, an additional RU may be allocated to one or more other devices (such as a second device), an additional RU may be allocated to the device, or a combination thereof.

In some examples, a device may distribute LTF tones or determine distributed LTF tones similar to the upclocking operations for the payload data of the allocated tones of FIG. 12. The upclocking operations for the LTF tones may be performed in one step or two, as described above. For example, for two-step distribution operations the device may distribute the LTF tones or determine the distributed LTF tones by mapping the allocated LTF tones over the spreading bandwidth in accordance with a dRU LTF tone plan associated with the spreading bandwidth and the dRU tone plan, and then distributing the mapped LTF tones further across the distribution bandwidth of the wireless channel according to an upclocked version of the dRU LTF tone plan associated with the spreading bandwidth.

Alternatively, the device may further distribute the mapped LTF across the distribution bandwidth of the wireless channel in accordance with the amount of dRUs of the one or more dRUs and the amount of 80 MHz subchannels of the wireless channel. To illustrate, a factor for increasing a spacing between adjacent LTF tone may be determined based on the amount of dRUs of the one or more dRUs and the amount of 80 MHz subchannels of the distribution bandwidth or wireless channel.

As another example for one-step distribution operations the device may distribute the LTF tones or determine the distributed LTF tones by mapping the LTF tones over the distribution bandwidth in accordance with an upclocked version of a dRU LTF tone plan associated with the spreading bandwidth and the dRU tone plan. The device may then modulate LTF symbols over the determined distributed LTF tones, which were distributed in accordance with an upclocked version of a dRU tone plan.

Upclocking operations may not be compatible with rRUs or hybrid transmissions. Additionally, when operating in a punctured channel, the spreading bandwidth may not exceed 80 MHz to enable upclocking by at least a factor of 2 when operating in 320 MHz channels or less.

Referring to FIG. 13, FIG. 13 illustrates an example deparsing process 1300 performable at a wireless communication device that is capable of or configured for enhanced distributed transmission tone mapping operations according to some aspects of the present disclosure. Deparsing process 1300 may be utilized by a device receiving a PPDU with one or more dRUs. For example, a deparser or distributed tone demapper at a receiving device (such as AP 102) is operable to reverse the mapping performed by the distributed tone mapper at the transmitting device (such as STA 104). The receiving device can then recover the information carried (or modulated) on the distributed tones of the dRU for the corresponding allocated logical RU as a result of the demapping.

The deparsing process 1300 example illustrated in FIG. 13 is for a two-stage deparsing process. That is, the deparsing process first deparses the received signal over the distribution bandwidth to generate multiple partially deparsed portions of the signal, and then individually processes the multiple partially deparsed portions to further or fully deparse the signal and symbols. For example, the deparsing process 1300 deparses received modulated symbols from tones across the entire distribution bandwidth into groups or sets of symbols for each subchannel or spreading bandwidth of the distribution bandwidth. The deparsing process 1300 then further processes the groups of symbols for each subchannel or spreading bandwidth.

In the example of FIG. 13, a distribution bandwidth is 160 MHz, and the spreading bandwidth is 80 MHz. During operation, a receiving device receives modulated symbols for one or more dRUs of a PPDU over the entire distribution bandwidth. The receiving device provides the modulated symbols (signal) to a deparser 1302. The deparser 1302 processes the signal and deparses the modulated symbols into subsets of symbols referred to as groups of symbols. Specifically, deparser 1302 segments or splits the received symbols into a first group of symbols for a first 80 MHz subchannel and a second group of symbols for a second 80 MHz subchannel. The deparser 1302 may deparse the modulated symbols according to the tone distribution plan for the distribution bandwidth, such as for interleaving as in process 800, process 1000, or process 1300 or for upclocked mapping as in process 1200. For example, the deparser 1302 can deinterleave tones from different dRUs as generated by process 800, can deinterleave tones from a single dRU as generated by process 1000 or process 1100, and can reduce a tone spacing between tones as generated by process 1200.

The deparser 1302 may provide the first group of symbols for the first 80 MHz subchannel to a first 80 MHz FFT processor 1304 and may provide the second group of symbols for the second 80 MHz subchannel to a second 80 MHz FFT processor 1306. To illustrate, the deparser 1302 may provide combined time domain signals for even tones representing the first group of symbols to the first 80 MHz FFT processor 1304 and may provide combined time domain signals for odd tones representing the second group of symbols to the second 80 MHz FFT processor 1306.

The 80 MHz FFT processors 1304 and 1306 may further deparse the groups of modulated symbols according to the tone distribution plan for the spreading bandwidth. To illustrate, the 80 MHz FFT processors 1304 and 1306 may reverse the mapping of the tone distribution plans for the spreading bandwidth (80 MHz) used by the distributed tone mapper. Each 80 MHz FFT processor 1304, 1306 may provide its output of remapped or reorder symbols to a demodulator or other processing hardware. The output of each 80 MHz FFT processor 1304, 1306 may be reordered and correspond back to the order of the original allocated logical RU. To illustrate, the first 80 MHz FFT processor 1304 may output symbols for even tones or subcarriers in numerical order, such as 0, 2, 4, and so forth, and the second 80 MHz FFT processor 1306 may output symbols for odd tones or subcarriers in numerical order, such as 1, 3, 5, and so forth.

Although the deparser 1302 for the wider bandwidth or distribution bandwidth provides its output directly to the 80 MHz FFT processors 1304 and 1306 for narrower bandwidth or spreading bandwidth in the example of FIG. 13, in other examples, a receiving device may perform one or more other intermediary processing steps between the deparser 1302 and the 80 MHz FFT processors 1304 and 1306. As an illustrative example, the receiving device may demodulate the modulated symbols output by the deparser 1302 before providing demodulated symbols to the 80 MHz FFT processors 1304 and 1306.

Although a two-stage deparsing process 1300 is illustrated in FIG. 13, in other examples a receiving device may be configured with an integrated two-stage deparser or with a wider one-stage deparse which can handle performing deparsing, such as FFT processing over bandwidths greater than 80 MHz.

FIG. 13 also illustrates one example of the deparser 1302, illustrated as deinterleaver 1350. Deinterleaver 1350 utilizes two 4-point discrete Fourier transforms (DFTs) 1352, 1354 to perform an 8-point DFT for a decimation in frequency FFT. By utilizing the deinterleaver 1350, all even tones get separated deinterleaved to a first 80 MHz subchannel and all the odd tones get separated deinterleaved to a second 80 MHz subchannel. As an illustrative, example, deinterleaver 1350 can be used to demap dRUs mapped by an interleaving process, such the process 800 of FIG. 8, or when a round robin parser is used.

FIG. 14 shows a flowchart illustrating an example process 1400 performable at a wireless communication device that supports enhanced distributed transmission operations according to some aspects of the present disclosure. The operations of the process 1400 may be implemented by a wireless AP, a wireless STA, or components thereof, as described herein. For example, the process 1400 may be performed by a wireless communication device, such as the second wireless communication device 650 of FIG. 6 or the wireless communication device 1600 described with reference to FIG. 16, operating as or within a wireless STA or a wireless AP. In some examples, the process 1400 may be performed by a wireless STA such as one of the STAs 104 described with reference to FIG. 1 or a wireless AP such as one of the APs 102 described with reference to FIG. 1.

In some examples, in block 1402, the wireless communication device receives scheduling information for a PPDU to be transmitted by one or more wireless stations including the wireless station over a wireless channel. The scheduling information indicates one or more dRUs within the wireless channel, each dRU comprising a respective set of tones distributed across a distribution bandwidth of the wireless channel. The distribution bandwidth is larger than 80 MHz, the one or more dRUs including a first dRU allocated to the wireless station. For example, the second wireless communication device 650 receives the first data packet 628 including the scheduling information 610 as described in FIG. 6 or the STA 104 receives a trigger frame at 725 from the AP 102 as described in FIG. 7. The scheduling information 610, the trigger frame, or both may include indications for the spreading bandwidth and the distribution bandwidth for a logical RU (and corresponding dRU) indicated by the RU allocation information 612.

In some examples, in block 1404, the wireless communication device modulates a plurality of symbols for the PPDU onto the set of tones of the first dRU. For example, the second wireless communication device 650 of FIG. 6 may determine the distributed tones corresponding to the allocated tones according to a process as described in FIGS. 8-12, and then may modulate symbols over the determined distributed tones.

In some examples, in block 1406, the wireless communication device transmits the plurality of symbols via the first dRU. For example, the second wireless communication device 650 of FIG. 6 may transmit the second data packet 629 including the modulated symbols for the dRU 670 as described in FIG. 6 or the STAs 104 and 704 transmits the modulated symbols for the dRU or dRUs for the PPDU as described in FIG. 7.

FIG. 15 shows a flowchart illustrating an example process 1500 performable at a wireless STA that supports enhanced distributed transmission operations according to some aspects of the present disclosure. The operations of the process 1500 may be implemented by a wireless STA, a wireless AP, or components thereof, as described herein. For example, the process 1500 may be performed by a wireless communication device, such as the first wireless communication device 602 of FIG. 6 or the wireless communication device 1700 described with reference to FIG. 17, operating as or within a wireless AP or a wireless STA. In some examples, the process 1500 may be performed by a wireless AP such as one of the APs 102 described with reference to FIG. 1, or a wireless STA such as one of the 104 described with reference to FIG. 1.

In some examples, in block 1502, the wireless communication device transmits scheduling information for a PPDU to be transmitted by one or more wireless stations over a wireless channel. The scheduling information indicates one or more dRUs within the wireless channel, each dRU comprising a respective set of tones distributed across a distribution bandwidth of the wireless channel. The distribution bandwidth is larger than 80 MHz. For example, the first wireless communication device 602 transmits the first data packet 628 including the scheduling information 610 as described in FIG. 6 or the AP 102 transmits a trigger frame at 725 as described in FIG. 7. The scheduling information 610, the trigger frame, or both may include indications for the spreading bandwidth and the distribution bandwidth for a logical RU (and corresponding dRU) indicated by the RU allocation information 612.

In some examples, in block 1504, the wireless communication device receives a plurality of symbols for the PPDU. For example, the first wireless communication device 602 of FIG. 6 may receive a plurality of modulated symbols of the second data packet 629 from the second wireless communication device 650 as described in FIG. 6 or the AP 102 receives a plurality of modulated symbols for the dRUs from the STAs 104 and 704 for the PPDU as described in FIG. 7.

In other examples, the wireless communication device, such as an AP, may transmit the PPDU to a single station, such as for downlink single user operations. In such examples, the wireless communication device may determine distributed tones for the dRU or dRUs of the PPDU, and modulate symbols for the dRU or dRUs over the corresponding distributed tones similar to as described with reference to block 1404 and transmit the modulated symbols as described with reference to block 1406 of FIG. 14.

Figure 16:
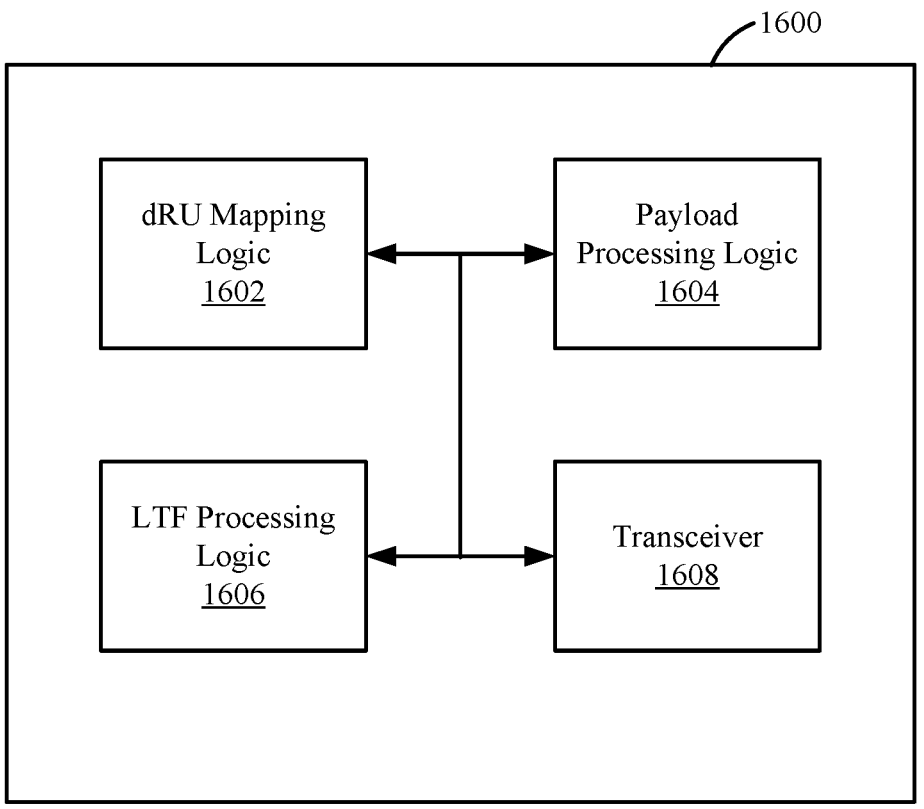
FIG. 16 shows a block diagram of an example wireless communication device that supports enhanced distributed transmission operations.

FIG. 16 shows a block diagram of an example wireless communication device 1600 that supports enhanced distributed transmission operations according to some aspects of the present disclosure. In some examples, the wireless communication device 1600 is configured or operable to perform the process 1400 described with reference to FIG. 11. In various examples, the wireless communication device 1600 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1600 can be a device for use in an AP, such as AP 102 described with reference to FIG. 1, or in a STA, such as STA 104 described with reference to FIG. 1. In some other examples, the wireless communication device 1600 can be an AP or a STA that includes such a chip, SoC, chipset, package or device as well as multiple antennas. The wireless communication device 1600 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1600 also includes or can be coupled with an application processor which may be further coupled with another memory. In some examples, the wireless communication device 1600 further includes at least one external network interface that enables communication with a core network or backhaul network to gain access to external networks including the Internet.

The wireless communication device 1600 includes dRU mapping logic 1602, payload processing logic 1604, LTF processing logic 1606, and a transceiver 1608. Portions of one or more of the components 1602, 1604, 1606, and 1608 may be implemented at least in part in hardware or firmware. For example, the transceiver 1608 may include or correspond to a transmitter, a receiver, or a combination of a transmitter and a receiver (such as a transceiver). In some examples, at least some of the components 1602, 1604, 1606, and 1608 are implemented at least in part by a processor and as software stored in a memory. For example, portions of one or more of the components 1602, 1604, or 1606 can be implemented as non-transitory instructions (or "code") executable by the processor to perform the functions or operations of the respective module.

In some examples, the processor may be a component of a processing system. A processing system may generally refer to a system or series of machines or components that receives inputs and processes the inputs to produce a set of outputs (which may be passed to other systems or components of, for example, the wireless communication device 1600). For example, a processing system of the wireless communication device 1600 may refer to a system including the various other components or subcomponents of the wireless communication device 1600, such as the processor, or the transceiver 1608, or a communications manager, or other components or combinations of components of the wireless communication device 1600. The processing system of the wireless communication device 1600 may interface with other components of the wireless communication device 1600, and may process information received from other components (such as inputs or signals) or output information to other components. For example, a chip or modem of the wireless communication device 1600 may include a processing system, a first interface to output information and a second interface to obtain information. In some examples, the first interface may refer to an interface between the processing system of the chip or modem and a transmitter, such that the wireless communication device 1600 may transmit information output from the chip or modem. In some examples, the second interface may refer to an interface between the processing system of the chip or modem and a receiver, such that the wireless communication device 1600 may obtain information or signal inputs, and the information may be passed to the processing system. A person having ordinary skill in the art will readily recognize that the first interface also may obtain information or signal inputs, and the second interface also may output information or signal outputs.

The dRU mapping logic 1602 is capable of, configured to, or operable to generate distributed, non-contiguous tones for a dRU based on a corresponding allocated logical RU. The dRU mapping logic 1602 is operable to perform distributed tone mapping according to one or more tone distribution schemes. The dRU mapping logic 1602 may be operable to carry out one or more of the processes of FIGS. 8-12, such as process 800, process 900, process 1000, process 1100, or process 1200.

The payload processing logic 1604 is capable of, configured to, or operable to generate symbols representing payload data for the distributed tones and for modulation over the distributed tones.

The LTF processing logic 1606 is capable of, configured to, or operable to generate LTF symbols representing a LTF sequence for the distributed LTF tones and for modulation over the distributed LTF tones.

Figure 17:
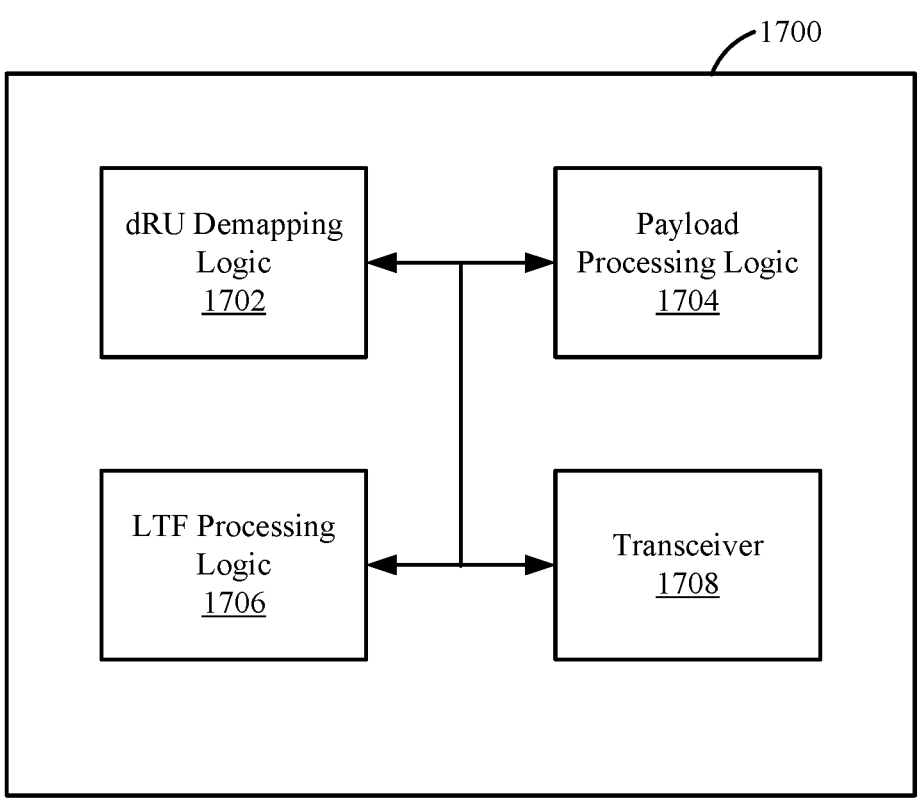
FIG. 17 shows a block diagram of an example wireless communication device that supports enhanced distributed transmission operations.

The transceiver 1608 is capable of, configured to, or operable to transmit messages or signals, receive messages or signals, or both, to enable wireless communication with one or more other wireless communication devices, such as the first wireless communication device 602 of FIG. 6 or the wireless communication device 1700 of FIG. 17. For example, the transceiver 1608 is configured to modulate the symbols for the payload and LTF sequence over the distributed tones.

FIG. 17 shows a block diagram of an example wireless communication device 1700 that supports enhanced distributed transmission operations according to some aspects of the present disclosure. In some examples, the wireless communication device 1700 is configured or operable to perform the process 1500 described with reference to FIG. 15. In various examples, the wireless communication device 1700 can be a chip, SoC, chipset, package or device that may include: one or more modems (such as, a Wi-Fi (IEEE 802.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some examples, the wireless communication device 1700 can be a device for use in a STA, such as STA 104 described with reference to FIG. 1, or in an AP, such as AP 102 described with reference to FIG. 1. In some other examples, the wireless communication device 1700 can be a STA or an AP that includes such a chip, SoC, chipset, package or device as well as multiple antennas. The wireless communication device 1700 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1700 also includes or can be coupled with an application processor which may be further coupled with another memory. In some examples, the wireless communication device 1700 further includes a user interface (UI) (such as a touchscreen or keypad) and a display, which may be integrated with the UI to form a touchscreen display. In some examples, the wireless communication device 1700 may further include one or more sensors such as, for example, one or more inertial sensors, accelerometers, temperature sensors, pressure sensors, or altitude sensors.

The wireless communication device 1700 includes dRU demapping logic 1702, payload processing logic 1704, LTF processing logic 1706, and a transceiver 1708. Portions of one or more of the components 1702, 1704, 1706, and 1708 may be implemented at least in part in hardware or firmware. For example, the transceiver 1708 may include or correspond to a transmitter, a receiver, or a combination of a transmitter and a receiver (such as a transceiver). In some examples, at least some of the components 1702, 1704, 1706, and 1708 are implemented at least in part by a processor and as software stored in a memory. For example, portions of one or more of the components 1702, 1704, or 1706 can be implemented as non-transitory instructions (or "code") executable by the processor to perform the functions or operations of the respective module.

In some examples, the processor may be a component of a processing system. A processing system may generally refer to a system or series of machines or components that receives inputs and processes the inputs to produce a set of outputs (which may be passed to other systems or components of, for example, the wireless communication device 1700). For example, a processing system of the wireless communication device 1700 may refer to a system including the various other components or subcomponents of the wireless communication device 1700, such as the processor, or the transceiver 1708, or a communications manager, or other components or combinations of components of the wireless communication device 1700. The processing system of the wireless communication device 1700 may interface with other components of the wireless communication device 1700, and may process information received from other components (such as inputs or signals) or output information to other components. For example, a chip or modem of the wireless communication device 1700 may include a processing system, a first interface to output information and a second interface to obtain information. In some examples, the first interface may refer to an interface between the processing system of the chip or modem and a transmitter, such that the wireless communication device 1700 may transmit information output from the chip or modem. In some examples, the second interface may refer to an interface between the processing system of the chip or modem and a receiver, such that the wireless communication device 1700 may obtain information or signal inputs, and the information may be passed to the processing system. A person having ordinary skill in the art will readily recognize that the first interface also may obtain information or signal inputs, and the second interface also may output information or signal outputs.

The dRU demapping logic 1702 is capable of, configured to, or operable to demap distributed, non-contiguous tones for a dRU based on a corresponding allocated logical RU. The dRU demapping logic 1702 is operable to perform distributed tone demapping according to one or more tone demapping schemes. The dRU demapping logic 1702 may be operable to carry out demapping for one or more of the mapping processes of FIGS. 8-12, such as process 800, process 900, process 1000, process 1100, or process 1200 or perform the deparsing process 1300 of FIG. 1300.

The payload processing logic 1704 is capable of, configured to, or operable to process, based on the demapping, received modulated symbols payload data. For example, the payload processing logic 1704 may be configured to demodulate received modulated symbols (data symbols) received from the dRU demapping logic 1702.

The LTF processing logic 1706 is capable of, configured to, or operable to process, based on the demapping, received modulated LTF symbols representing LTF sequence data. For example, the LTF processing logic 1706 may be configured to demodulate received modulated LTF symbols received from the dRU demapping logic 1702.

The transceiver 1708 is capable of, configured to, or operable to transmit messages or signals, receive messages or signals, or both, to enable wireless communication with one or more other wireless communication devices, such as the second wireless communication device 650 of FIG. 6 or the wireless communication device 1600 of FIG. 16. For example, the transceiver 1708 is configured to receive modulated symbols over distributed tones corresponding to a dRU of a PPDU.

Referring to FIG. 18, FIG. 18 illustrates an example process 1800 performable at a wireless communication device that is capable of or configured for enhanced distributed transmission tone mapping operations according to some aspects of the present disclosure. Process 1800 is a two-step tone mapping operation, similar to process 1000 of FIG. 10 and process 1100 of FIG. 11, where a device first segments its allocated tones to available subchannels of the distribution bandwidth before distribution across the segments or subchannels to distribute the total allocated tones over the distribution bandwidth. A bandwidth or size of the subchannels may correspond to the spreading bandwidth. However, as compared to process 1100 of FIG. 11 which first quantizes an amount of allocated tones to utilize existing or pre-stored tone distribution plans for the tone distribution within the subchannels of the distribution bandwidth and then segments that quantized tones, the process 1800 of FIG. 18 first segments the allocated tones to available subchannels and then quantizes the segmented tones for subsequent tone distribution or mapping. For example, a device may reduce an amount of allocated tones after segmenting the tones to ensure that each subchannel has an amount of tones which corresponds to an existing or pre-stored tone distribution plans after segmentation. To illustrate, for the same 106 tone allocation of FIG. 10, the device may quantize the tones by adjusting, such as reducing, the 106 tones to 104 tones, similar to FIG. 11. The device may then follow the same operations as described in FIG. 10 and FIG. 11.

For example, the device may segment the total amount of tones (106) to the two subchannels to create two logical 53-tone dRUs, such as intermediary logical dRUs. The device may then quantize the amount of tones of the two logical 53-tone dRUs based on or in accordance with pre-stored or existing tone distribution plans (patterns). To illustrate, because the device has a pre-stored or existing tone distribution plan (pattern) for mapping 52 tones over 80 MHz, the device may quantize the two logical 53-tone dRUs to generate two logical 52-tone dRUs. Accordingly, the device may utilize existing tone distribution plans (such as an RU size currently defined in for an OFDMA tone plan, which some examples are 26, 52, 78, 106, 132, 242, 484, 968, and 996 tones) and may not have to obtain or determine new tone distribution patterns for the subchannels. In addition to any change in the amount of data or pilot (LTF) symbols for the process 1000 of FIG. 10, the process 1800 of FIG. 18 also imparts a small data or pilot (LTF) symbol adjustment when the amount of the tones is reduced during quantization.

Alternatively, in other examples the quantizer may increase an amount of tones to a nearest existing stored tone distribution plan and pad the added tones, that is send symbols representing padded data or send additional pilot (LTF) symbols over the additional tones. For example, for a total amount of tones of 100, the device may generate two logical 52-tone dRUs for 104 total tones. Additionally or alternatively, in other examples after the initial distribution of the quantized amount of tones in each 80 MHz using the existing tone distribution plans, the tone mapper further pads some extra tones so that the amount of tones in each 80 MHz is the same as the amount of the segmented tones before quantization, that is send symbols representing padded data or send additional pilot (LTF) symbols over the additional tones.

In the example of FIG. 1800 a device, such as AP 102, schedules a PPDU (such as a distributed transmission or hybrid transmission) including a logical RU 1802. The logical RU 1802 may be allocated to a device (STA).

During operation, the device, such as a STA 104, performs tone distribution operations to distribute the allocated contiguous tones of logical RU 1802 over the distribution or spreading bandwidth, which in the example of FIG. 18 is 160 MHz. The device determines a number of subchannels to segment the allocated contiguous tones of logical RU 1802 into, as described with reference to FIG. 10 and FIG. 11.

In the example of FIG. 18, the device determines that two subchannels are available for an indicated distribution bandwidth of 160 MHz, such as based on the spreading bandwidth of 80 MHz. The device segments the allocated tones (that is a total amount of the allocated tones) into two groups or subsets of tones, one for each subchannel, similar to as described with reference to FIG. 10 and FIG. 11. For example, the device may segment the allocated tones using a proportional parser, such as a round robin parser. After the allocated tones are split and segmented or distributed to the respective subchannels, referred to as tone segmentation, the device may perform tone quantization, such as tone quantization of or for segmented tones (such as a segmented amount of tones).

To illustrate, the device may segment the allocated tones of the logical RU 1802 by segmenting or dividing the tones to each subchannel and generating segmented logical dRUs. For example, the device may segment or distribute the tones of the logical RU 1802 to a first logical dRU 1804 (such as a local dRU or segmented dRU) for a first subchannel and a second logical dRU 1806 for a second subchannel. The first logical dRU 1804 and the second logical dRU 1806 may include or correspond to unquantized logical dRUs or intermediary logical dRUs. That is, the device may perform quantization operations on the first logical dRU 1804 and the second logical dRU 1806 to generate quantized or final logical dRUs.

After segmentation, the device further device determines to quantize or adjust the amount of segmented tones such that the amount of segmented tones for each logical dRU matches an amount of tones of an existing tone distribution plan for the subchannel bandwidth or the spreading bandwidth. For example, the device may determine an amount of segmented tones of the segmented logical dRUs (such as logical dRUs 1804 and 1806) for a subchannel size does not match an amount of tones of stored patterns for the sub-channel size. To illustrate, the device may not have an existing tone distribution plan for 53 tones over 80 MHz, and the device may determine to quantize the segmented tones or segmented logical dRUs based on a determination that the amount of segmented tones (such as 53 tones) does not match an amount of tones (such as 52 tones, 106 tone, etc.) of stored sets of tones. The device may then quantize the amount of segmented tones based on the stored sets of tones. For example, the device have an existing tone distri-bution plan for 52 tones over 80 MHz, and the device quantizes (reduces) the 53-tone logical dRUs for each seg-ment by one tone to generate a quantized amount of tones (also referred to as quantized tones) of 52 tones.

In the example of FIG. 18, the device generates a first quantized logical dRU 1814 (such as a first segmented and quantized logical dRU) for the first subchannel having 52 tones based on the first logical dRU 1804 of 53 tones. The device generates a second quantized logical dRU 1816 for the second subchannel having 52 tones based on the second logical dRU 1806 of 53 tones. The first quantized logical dRU 1814 and the second quantized logical dRU 1816 may include or correspond to quantized and segmented logical dRUs or final logical dRUs.

After segmentation and subsequent quantization, the device may perform tone mapping operations to distribute the segmented and quantized tones of each subchannel. Distributing the segmented and quantized tones of each subchannel within each subchannel effectively distributes a quantized amount of tones of the original allocated tones of logical RU 1802 over the entire distribution bandwidth and according to tone mapping distribution patterns for each subchannel/spreading bandwidth.

To illustrate, the device may distribute (fully distribute) the quantized tones of the logical RU 1802 over the distri-bution bandwidth by performing tone distribution in each subchannel (such as for each spreading bandwidth). For example, the device may distribute the tones of the first quantized logical dRU 1814 (such as a local dRU or seg-mented and quantized dRU) across the first subchannel according to a tone distribution plan for the bandwidth of the subchannel, which may be equal to the spreading bandwidth when indicated by the AP or to a maximum or pre-set local spreading amount, such as due to network setting or hard-ware constraints.

The device also performs tone distribution operations for the second subchannel. For example, the device may dis-tribute the tones of the second quantized logical dRU 1816 (such as a local dRU or segmented dRU) across the second subchannel according to the tone distribution plan for the bandwidth of the subchannel.

The distribution in the first subchannel generates distrib-uted, non-contiguous tones of the first quantized logical dRU 1814 and the distribution in the second subchannel generates distributed, non-contiguous tones of the second quantized logical dRU 1816. The distributed, non-contigu-ous tones of the first quantized logical dRU 1814 and the distributed, non-contiguous tones of the second quantized logical dRU 1816 make up the distributed, non-contiguous tones of the dRU 1818, which corresponds to the logical RU 1802. The device then modulates symbols associated with the logical RU 1802 of the PPDU over the distributed, non-contiguous tones of the dRU 1818 to transmit its portion of the PPDU. To illustrate, the device may modulate symbols associated with the first quantized logical dRU 1814, the second quantized logical dRU 1816, and optionally other quantized logical dRUs, of the PPDU over the distributed, non-contiguous tones of the dRU 1818 to transmit its portion of the PPDU. When modulating the symbols associated with the logical RU 1802, the device may modulate a quantized amount of symbols over the quantized tones to account for the change in the number of tones from the amount of allocated tones. As compared to the process 1000 of FIG. 10, the process 1800 of FIG. 18 does not create additional tone distribution mappings, but rather utilizes or leverages exist-ing tone distribution mappings. As compared to the process 1100 of FIG. 11, the process 1800 of FIG. 18 segments the total allocation tones into subchannels/according to spread-ing bandwidth before quantization of tones. However, both process 1100 of FIG. 11 and process 18 of Figure utilize or leverage existing tone distribution mappings.

Although, the distributed tones of dRU 1818 are distrib-uted across a distribution bandwidth which spans or occu-pies the entire bandwidth of the wireless channel or the PPDU in the example illustrated in FIG. 18, in other examples, the distributed tones of dRU 1818 may be dis-tributed across the distribution bandwidth that is less than the entire bandwidth of the channel or the PPDU. To illustrate, the distributed tones of dRU 1818 may be distrib-uted over a distribution bandwidth of 160 MHz of a 240 or 320 MHz channel. In some such examples, the other portion of the wireless channel (such as the other 80 MHz or a second 160 MHz of the wireless channel) may be punctured or may be dedicated to one or more rRUs, such as when the PPDU is a hybrid transmission of dRUs and rRUs.

Although, a single logical RU is allocated in the example of FIG. 18, one or more other RUs may be allocated in other examples. For example, an additional RU may be allocated to one or more other devices (such as a second device), an additional RU may be allocated to the first device, or a combination thereof.

Although the example of FIG. 18 involves a 106-tone RU, other size tone allocations may be quantized. For example, as illustrative, non-limiting examples of other quantization options, a 242-tone RU may be quantized and segmented into two 80 MHz 106-tone dRUs over 160 MHz or four 80 MHz 52-tone dRUs over 160 MHz; a 484-tone RU may be quantized and segmented into two 80 MHz 242-tone dRUs over 160 MHz or four 80 MHz 106-tone dRUs over 320 MHz; a 996-tone RU may be quantized and segmented into two 80 MHz 484-tone dRUs over 160 MHz or four 80 MHz 242-tone dRUs over 320 MHz; and two 996-tone RU may be quantized and segmented into four 80 MHz 484-tone dRUs over 320 MHz.

Although the example of FIG. 1800 illustrates a wireless channel without puncturing, in other examples the wireless channel containing the PPDU may be punctured and have a portion of its bandwidth reserved and not available to the PPDU. In such punctured examples, the devices may seg-ment the quantized tones into the unpunctured portions proportionally. Thus, for puncturing with quantized segmen-tation, the quantization may depend on the puncturing and the size of the unpunctured portions or usable subchannels, such that each subchannel is allocated tones proportionally or evenly and receives an amount of tones for which the device has an existing tone plan.

As described with reference to FIGS. 10 and 11, a device may distribute LTF tones or determine distributed LTF tone values of the allocated tones similar to the two-step seg-mentation and distribution operations for the tones for the payload data of the allocated tones. For example, the device may distribute the LTF tones or determine the distributed LTF tone values based on the tone plan for the payload data in some examples. To illustrate, the device may first segment the allocated LTF tones in subsets or groups of LTF tones for each subchannel, and then for each subchannel map the corresponding group of LTF tone values based on an existing 80 MHz dRU LTF tone plan and tone values which are associated with the dRU tone plan. In such examples, the LTF tone plan and value of LTF symbols may correspond to an allocated amount of LTF symbols for the distribution bandwidth.

Alternatively, the device may quantize, such as increase, the amount of LTF such that the amount of LTF symbols may correspond to an allocated amount of LTF symbols for each subchannel for the spreading bandwidth. In such examples, the device segments the quantized LTF tones in subsets or groups of LTF tones for each subchannel, and then for each subchannel map the corresponding group of quantized LTF tones and tone values based on an existing 80 MHz dRU LTF tone plan and tone values which are associated with the dRU tone plan. The device may then modulate LTF symbols (or a quantized amount of LTF symbols) over the determined distributed LTF tones, which were distributed in each subchannel according to a dRU LTF tone plan associated with the subchannel or spreading bandwidth.

Additionally, or alternatively, and as described with reference to FIGS. 10 and 11, a device may perform other processing on a per subchannel (such as per 80 MHz) basis to differentiate the symbols on the tones of subchannels and reduce a PAPR. For example, a device may perform phase rotation on a per subchannel (such as per 80 MHz) basis to differentiate the symbols on the tones of subchannels and reduce PAPR. To illustrate, the device may perform 90-degree phase rotation on the LTF sequence, the STF sequence or both, of one or more subchannels because with such phase rotation the device may have the same LTF or STF sequence repeated on each subchannel. As another example, a device may assign a different RU index to each subchannel to differentiate the symbols on the tones of subchannels and reduce a PAPR. By assigning a different RU index the LTF and STF sequences generated by the device may differ per subchannel.

Figures 19A, 19B:
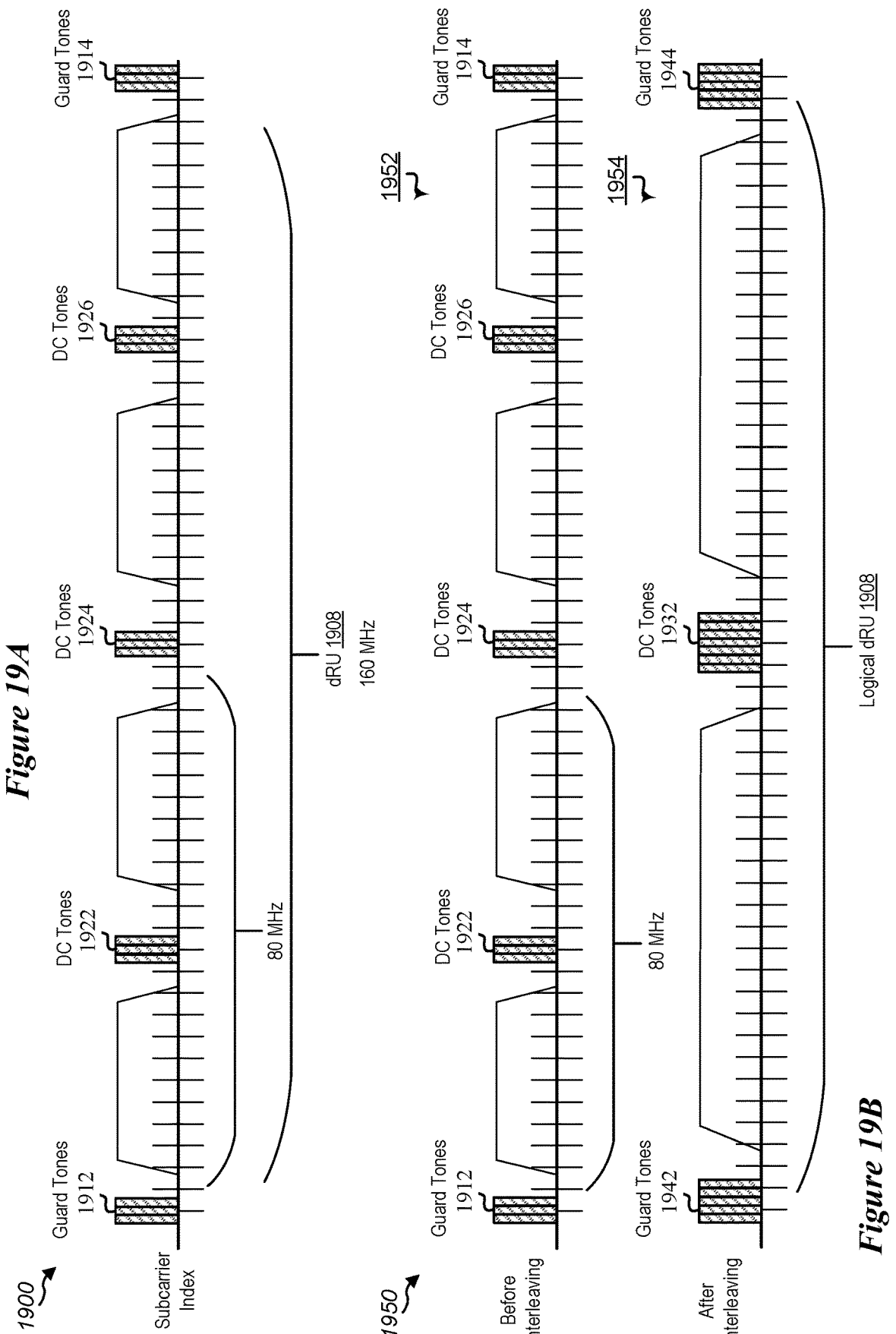
FIGS. 19A and 19B each show an example of tone interleaving that supports enhanced distributed transmission operations.

FIGS. 19A and 19B each illustrate an example of tone interleaving according to some aspects. For example, each of FIG. 19A and FIG. 19B illustrate a tone interleaving example using different sets of available tones of a channel and different sets of reserved tones. That is, FIGS. 19A and 19B utilize different available tones for data and pilot tones and have different reserved tones where data and pilot tones may not be used. The reserved tones may include or correspond to direct conversion (DC) tones, edge tones (such as guard tones), etc. Additionally, other tones, such a subset of tones of the available and non-reserved tones, may go unused in some examples, such as Null tones or null subcarriers.

Referring to FIG. 19A, FIG. 19A illustrates a tone interleaving example 1900 where DC tones and edge tones of legacy tone mapping schemes are reserved and not used for distributed tone mappings, such as the distributed tone interleaving operations of FIG. 8.

In the example of FIG. 19A, a device may distribute tones of logical dRUs across a distribution bandwidth by interleaving tones from different logical RUs or by interleaving tones from a single RU with one or more other RUs by only utilizing tones which are available in legacy RU or dRU operations. To illustrate, the tone interleaving option in FIG. 19A reserves the same DC and edge tones as legacy dRU operations.

As illustrated in FIG. 19A, guard tones 1912 and 1914, DC tones 1922, 1924, and 1926 are reserved, similar to legacy operation, and not available for tone mapping during dRU tone interleaving, and the tones of the dRUs are interleaved to tones outside of the above reserved tones. After interleaving, the tones of the dRUs may be split into four 40 MHz segments that are each separated by DC tones, and bounded by guard tones. Each dRU of the dRUs may include tones in each segment. As an illustrative example, the guard tones 1912 may have 12 tones, the guard tones 1914 have 11 tones, the DC tones 1922 and 1926 may each have 5 tones, and the DC tones 1924 may have 23 tones (such as 11 tones for first 80 MHz plus 12 tones for second 80 MHz).

During operation, one or more devices, such as stations, may be allocated one or more dRUs by another device, such as an AP, and each device may determine distributed tones for each allocated dRU by interleaving, such as described with reference to FIG. 8, and as using the available tones illustrated in FIG. 19A. To illustrate, the devices may utilize the tones of the four segments illustrated in FIG. 19A for distributing tones of the allocated dRUs and may not utilize the reserved tones of the guard tones 1912 and 1914 and the DC tones 1922, 1924, and 1926.

In the example of FIG. 19A, a first device is allocated a logical RU and interleaves the tones of the logical RU across a distribution and channel bandwidth of 160 MHz to interleave the tone of the logical RU and generate dRU 1908, that is the distributed tones thereof. As described with reference to FIG. 8, the device may first generate a logical dRU corresponding to the logical RU by distributing the tones of the logical RU across an 80 MHz spreading bandwidth according to an RU tone allocation plan to generate partially distributed tones. The partially distributed tones may then be interleaved with tones from other subchannels across the distribution bandwidth.

Referring to FIG. 19B, FIG. 19B illustrates another tone interleaving example 1950 where DC tones and edge tones of legacy tone mapping schemes are not reserved and all available FFT tones may be used for distributed tone mappings, such as for the distributed tone interleaving operations of FIG. 8.

As compared to the tone interleaving example 1900 in FIG. 19A, the tone interleaving example 1950 in FIG. 19B removes middle or inter-80 MHz DC tones and generates a tone mapping with increased edge tones and reduce intra-80 MHz (or inter-160 MHz) DC tones, such as two 80 MHz segments.

As illustrated in FIG. 19B, prior to tone interleaving 1952, the dRUs may be mapped to tones which do not include inter-subchannel DC tones (such as DC tones 1922 and 1926), similar to the example of FIG. 19A. In some such examples, the dRUs may be first mapped to any tones outside of the reserved tones of the guard tones 1912 and 1914 and the DC tones 1922, 1924, and 1926. In particular examples, a dRU may be mapped to a particular subchannel or spreading bandwidth, such as 80 MHz. After tone interleaving 1954, the mapped tones may be interleaved across the full distribution bandwidth and the dRUs include or are mapped to tones which include the previous DC tones 1922 and 1926 and have no inter-80 MHz DC tones. In some such examples, the dRUs may adjust an amount of guard tones, an amount of DC tones or both to keep a total amount of tones used for data and pilot symbols the same. For example, the dRUs may utilize additional tones near the original inter-160 MHz DC tones 1924 in some examples. As another example, the dRUs may not utilize additional tones near the original inter-160 MHz DC tones 1924. Thus, after interleaving the dRUs may have adjust the amount of DC tones 1932 in between each 80 MHz segment.

Additionally, or alternatively, the dRUs may adjust an amount of guard tones near the edge of the channel and may utilize or not utilize tones near the original guard tones of 1912 and/or 1914. To illustrate, the dRUs may not utilize additional tones near the original guard tones of 1912 and/or 1914 to provide additional channel edge spacing and center the tones dRUs. For example, the guard tones may be increased as shown in the example of FIG. 19B, guard tones 1942 and 1944, after interleaving as compared to before interleaving and as compared to the guard tones 1912 and 1914 of FIG. 19A.

As an illustrative example, the guard tones 1912 may be increased from 12 tones (before interleaving) to 24 tones for the guard tones 1942 (after interleaving), the guard tones 1914 may be increased from 11 tones to 22 tones for the guard tones 1944, and the DC tones 1924 may be reduced from 23 tones to 10 tones.

During operation, one or more devices, such as stations, may be allocated one or more dRUs by another device, such as an AP, and each device may determine distributed tones for each allocated dRU by interleaving, such as described with reference to FIG. 8, and as using the available tones illustrated in FIG. 19B. To illustrate, the devices may utilize the tones of the two segments illustrated for distributing tones of the allocated dRUs and may not utilize the reserved tones of the guard tones 1942 and 1944 and the DC tones 1932.

In the example of FIG. 19B, a first device is allocated a logical RU and interleaves the tones of the logical RU across a distribution and channel bandwidth of 160 MHz to interleave the tone of the logical RU and generate dRU 1908, that is the distributed tones thereof. As described with reference to FIG. 8, the device may first generate a logical dRU corresponding to the logical RU by distributing the tones of the logical RU across an 80 MHz spreading bandwidth according to an RU tone allocation plan to generate partially distributed tones. As illustrated in FIG. 19B, this mapping may utilize similar tones to the example of FIG. 19A. The partially distributed tones may then be interleaved with tones from other subchannels across the distribution bandwidth and using tones that previously corresponded to DC tones 1922 and 1926.

As compared to the operations in FIG. 19A, the operations in FIG. 19B enable increased spacing between channel edges and more tones located towards a center of the channel which may reduce spectral leakage and enable increased transmission power. Accordingly, SNR may be increased, and throughput and transmission range may be increased due to increased SNR.

However, the operations in FIG. 19A may be enabled with fewer changes to operations of standards compliant devices. For example, new tone indices or tone plans are not needed for tone interleaving.

FIGS. 20A and 20B each illustrate a dRU tone mapping index table according to some aspects. A dRU tone mapping index table identifies the tone indices (or subcarriers) of distributed tones of all dRUs for a given dRU size allocation and may be used by a device to determine which tones to use for transmission or reception for a particular allocated RU or RUs. Referring to FIG. 20A, FIG. 20A illustrates a dRU tone mapping index table according to some examples, such a tone interleaving examples as described with reference to FIG. 8. For example, the dRU tone mapping index table of FIG. 20A may correspond to a dRU tone mapping index for the tone mapping schemes where DC tones and edge tones of legacy tone mapping schemes are reserved and not used for tone interleaving as in FIG. 19A.

In the example of FIG. 20A, a dRU tone mapping index table 2000 for a 160 MHz bandwidth channel is illustrated. The dRU tone mapping index table 2000 provides tone locations for data and pilot subcarrier indices for dRUs in a 160 MHz PPDU or a 160 MHz channel bandwidth. In the dRU tone mapping index table 2000 of FIG. 20A, half of the dRUs are just one tone shift away from the other half of the dRUs. To illustrate, for a 160 MHz PPDU with sixteen 106-tone dRUs, a ninth dRU (dRU 9) has a set of distributed tones that are one tone shift away from the set of the distributed tones a first dRU (dRU1). For example, dRU9 is comprised of a set of tones where each tone index value of the tones of dRU1 is increased by one. Similarly, distributed tones for the tenth through sixteenth dRUs (dRU10-dRU16) are one tone shift away from the corresponding distributed tones of the second through eighth dRUs (dRU2-dRU8). As an illustrative example, a first tone of the first dRU (dRU1) has an index value of −1002, and a first tone of the ninth dRU (dRU1) has an index value of −1001, That is −1002 plus 1.

As another example, for a 160 MHz PPDU with eight 242-tone dRUs, multiple dRUs may be different tone shifts away from a single dRU. To illustrate, the second, third, and fifth dRUs all include sets of tones that are shifted from the tones of the first dRU by a set amount. For the 242-tone dRU example, the second dRU (dRU2) includes a set of distributed tones that are four tone shifts away (such as four tones away) from the distributed tones of the first dRU (dRU1), the third dRU (dRU3) includes a set of distributed tones that are two tone shifts away from the distributed tones of the first dRU (dRU1), and the fifth dRU (dRU5) includes a set of distributed tones that are one tone shift away from the distributed tones of the first dRU (dRU1). The sixth and seventh dRUs can also be determined based on tone shifts from dRUs which are determined based on tone shifts from the first dRU. To illustrate, the sixth dRU (dRU6) includes a set of distributed tones that are one tone shift away from the distributed tones of the second dRU (dRU2), which was determined based on a shift in tones from the first dRU. Also, the seventh dRU (dRU7) includes a set of distributed tones that are one tone shift away from the distributed tones of the third dRU (dRU3), which was determined based on a shift in tones from the first dRU. Thus, as illustrated in FIG. 19A a device may only need to store tone indices for one half of the table, or less, to determine tones for all of the possible dRUs. Accordingly, a table size of dRU tone mapping index tables may be reduced, and the memory used to store dRU tone mapping index tables may be reduced. Reducing the memory used may enable reduced size memories and devices and reduced power consumption.

Additionally, or alternatively, a device may use a formula to derive the tone indices of a dRU. For example, the device may utilize the following formula to determine tone indices in a 160 MHz channel, dRU_160=2*(dRU_80+513−1)+ Idx_80−1025. In the previous formula, dRU_160 represents dRU tone index values in 160 MHz and dRU 80 represents dRU tone index values in 80 MHz (which may be stored in a legacy table or computed with a legacy formula). Idx_80 represents a value for a particular 80 MHz segment, such as Idx_80 is equal to a value of 1 for a first 80 MHz segment, a value of 2 for a second 80 MHz segment, etc.

As a non-limiting illustration of the above example formula for tone mapping dRUs in 160 MHz, a first dRU of 106-tones in a first 80 MHz is mapped a first dRU (dRU106) in 160 MHz. The tone indices for a first dRU of 106-tones in a first 80 MHz, dRU106_1_80, may correspond to the following tone indices values of [−483:36:−51, 17:36:449], [−467:36:−35, 33:36:465], [−475:36:−43, 25:36:457], [−459:36:−27, 41:36:473], [−495, 485]. The tones of the dRU may have a relative difference or space between tones as illustrated by the following set of values [12, 8, 8, 8, 12, 8, 8, 8, . . . ]. The relative tone indices of the dRU in 80 MHz may be [18, 30, 38, 46, 54, 66, 74, 82, 90, . . . ]. For the particular index of the first dRU, Idx_80 is equal to 1, the relative tone indices of the dRU in 160 MHz may be [35 59 75 91 107 131 147 163 179 . . . ]. Accordingly, the distributed tones for dRU106_1_160 correspond to the following tone indices values of [−990:72:−54,82:72:946,−966:72:−102, 34:72:970,−950:72:−86, 50:72:914,−934:72:−70, 66:72:930]. The distributed tones for dRU106 have a double the relative tone difference or tone spacing in between tones as illustrated by following the set of values [24, 16, 16, 16, 24, 16, 16, 16, . . . ] as compared to 80 MHz.

As another example, the device may utilize the following formula to determine tone indices in a 320 MHz channel, dRU_320=2*(dRU_80+513−1)+Idx_80−2049. In the previous formula, dRU_320 represents dRU tone index values in 320 MHz and dRU_80 represents dRU tone index values in 80 MHz (which may be stored in a legacy table or computed with a legacy formula). Idx_80 represents an index value for a particular 80 MHz segment. For example, the index value, Idx_80, is equal to a value of 1 for a first 80 MHz segment, a value of 2 for a second 80 MHz segment, etc. Thus, a device may utilize existing legacy tone mapping index tables or a legacy formula in combination with a formula for dRUs tone indices to derive the indices of allocated dRUs, instead of storing additional dRU tables. Accordingly, a device may support distributed tone operations without utilizing additional memory to store a dRU tone mapping index table or additional dRU tone mapping index tables.

Referring to FIG. 20B, FIG. 20B illustrates another dRU tone mapping index table according to some examples, such a tone interleaving examples as described with reference to FIG. 8. For example, the dRU tone mapping index table of FIG. 20B may correspond to a dRU tone mapping index for the tone mapping schemes where DC tones and edge tones of legacy tone mapping schemes are not reserved and all FFT tones are used for tone interleaving as in FIG. 19B.

In the example of FIG. 20B, a dRU tone mapping index table 2002 for a 160 MHz bandwidth channel is illustrated. The dRU tone mapping index table 2002 provides tone locations for data and pilot subcarrier indices for dRUs in a 160 MHz PPDU. In the dRU tone mapping index table 2002 of FIG. 20A, dRU tone indices of each dRU are equal to the tone indices of a first dRU having same size plus a tone shift. To illustrate, for a 160 MHz PPDU with 16 106-tone dRUs, each other dRU other than the first dRU, that is dRUs 2-16, has a set of distributed tones that are one or more tone shifts away from the set of the distributed tones the first dRU (dRU1). For example, a second dRU (dRU2) is comprised of a set of tones where each tone index value of dRU1 is increased by eight. As another example, a third dRU (dRU3) is comprised of a set of tones where each tone index value of dRU1 is increased by twelve. Thus, as illustrated in FIG. 19B a device may only need to store tone indices for one a single dRU of each tone size (such as 106-tone, 242-tone, etc.) and corresponding tone shift values for the other dRUs to determine distributed tones for all of the possible dRUs.

Accordingly, a device may have reduced memory size and support reduced memory size requirements.

Although the examples of FIGS. 19 and 20 are illustrated for 160 MHz distribution bandwidths and 80 MHz spreading bandwidths, in other examples other size distribution bandwidths, spreading bandwidths, or both may be used. For example, 240 or 320 MHz distribution bandwidths may be used with 80 or 160 MHz spreading bandwidths. Additionally, a total channel bandwidth may be the same size as the distribution bandwidth in some examples or larger than the distribution bandwidth in other examples.

FIG. 21 shows a flowchart illustrating an example process 2100 performable at a wireless communication device that supports enhanced distributed transmission operations according to some aspects of the present disclosure. The operations of the process 2100 may be implemented by a wireless AP, a wireless STA, or components thereof, as described herein. For example, the process 2100 may be performed by a wireless communication device, such as the second wireless communication device 650 of FIG. 6 or the wireless communication device 1600 described with reference to FIG. 16, operating as or within a wireless STA or a wireless AP. In some examples, the process 2100 may be performed by a wireless STA such as one of the STAs 104 described with reference to FIG. 1 or a wireless AP such as one of the APs 102 described with reference to FIG. 1.

In some examples, in block 2102, the wireless communication device receives scheduling information for a PPDU to be transmitted by one or more wireless stations including the wireless station over a wireless channel. The scheduling information indicates one or more dRUs within the wireless channel, each dRU comprising a respective set of tones distributed across a distribution bandwidth of the wireless channel. The distribution bandwidth is larger than 80 MHz, the one or more dRUs including a first dRU allocated to the wireless station. For example, the second wireless communication device 650 receives the first data packet 628 including the scheduling information 610 as described in FIG. 6 or the STA 104 receives a trigger frame at 725 from the AP 102 as described in FIG. 7. The scheduling information 610, the trigger frame, or both may include indications for the spreading bandwidth and the distribution bandwidth for a logical RU (and corresponding dRU) indicated by the RU allocation information 612.

In some examples, in block 2104, the wireless communication device modulates a plurality of symbols for the PPDU onto the set of tones of the first dRU over the distribution bandwidth in accordance with a RU tone plan associated with a spreading bandwidth, where the spreading bandwidth is less than the distribution bandwidth. For example, the second wireless communication device 650 of FIG. 6 may determine the distributed tones corresponding to the allocated tones according to a process as described in FIGS. 8-12, and then may modulate symbols over the determined distributed tones.

In some examples, in block 2106, the wireless communication device transmits the plurality of symbols via the first dRU. For example, the second wireless communication device 650 of FIG. 6 may transmit the second data packet 629 including the modulated symbols for the dRU 670 as described in FIG. 6 or the STAs 104 and 704 transmits the modulated symbols for the dRU or dRUs for the PPDU as described in FIG. 7. In the example of FIG. 21, the device may transmit on distributed tones, where the spreading bandwidth is less than the distribution bandwidth, as described with reference to any of FIG. 8, 10, 11, 12, 18, 19A, or 19B. Tone indices for these distributed tones may correspond to the tone indices generated by any of the formulas provided herein and/or any of the tone index tables provided herein, such as the dRU tone index tables of FIGS. 20A and 20B.

FIG. 22 shows a flowchart illustrating an example process 2200 performable at a wireless STA that supports enhanced distributed transmission operations according to some aspects of the present disclosure. The operations of the process 2200 may be implemented by a wireless STA, a wireless AP, or components thereof, as described herein. For example, the process 2200 may be performed by a wireless communication device, such as the first wireless communication device 602 of FIG. 6 or the wireless communication device 1700 described with reference to FIG. 17, operating as or within a wireless AP or a wireless STA. In some examples, the process 2200 may be performed by a wireless AP such as one of the APs 102 described with reference to FIG. 1, or a wireless STA such as one of the 104 described with reference to FIG. 1.

In some examples, in block 2202, the wireless communication device transmits scheduling information for a PPDU to be transmitted by one or more wireless stations over a wireless channel. The scheduling information indicates one or more dRUs within the wireless channel, each dRU comprising a respective set of tones distributed across a distribution bandwidth of the wireless channel. The distribution bandwidth is larger than 80 MHz. For example, the first wireless communication device 602 transmits the first data packet 628 including the scheduling information 610 as described in FIG. 6 or the AP 102 transmits a trigger frame at 725 as described in FIG. 7. The scheduling information 610, the trigger frame, or both may include indications for the spreading bandwidth and the distribution bandwidth for a logical RU (and corresponding dRU) indicated by the RU allocation information 612.

In some examples, in block 2204, the wireless communication device receives a plurality of symbols for the PPDU in accordance with a tone mapping of a RU tone plan associated with a spreading bandwidth, where the spreading bandwidth is less than the distribution bandwidth. For example, the first wireless communication device 602 of FIG. 6 may receive a plurality of modulated symbols of the second data packet 629 from the second wireless communication device 650 as described in FIG. 6 or the AP 102 receives a plurality of modulated symbols for the dRUs from the STAs 104 and 704 for the PPDU as described in FIG. 7. In the example of FIG. 21, the device may receive modulated symbols for each dRU, of one or more dRUs, on distributed tones, where the spreading bandwidth is less than the distribution bandwidth, as described with reference to any of FIG. 8, 10, 11, 12, 18, 19A, or 19B. Tone indices for these distributed tones may correspond to the tone indices generated by any of the formulas provided herein and/or any of the tone index tables provided herein, such as the dRU tone index tables of FIGS. 20A and 20B.

In other examples, the wireless communication device, such as an AP, may transmit the PPDU to a single station, such as for downlink single user operations. In such examples, the wireless communication device may determine distributed tones for the dRU or dRUs of the PPDU, and modulate symbols for the dRU or dRUs over the corresponding distributed tones similar to as described with reference to block 2104 and transmit the modulated symbols as described with reference to block 2106 of FIG. 21.

Figure 23:
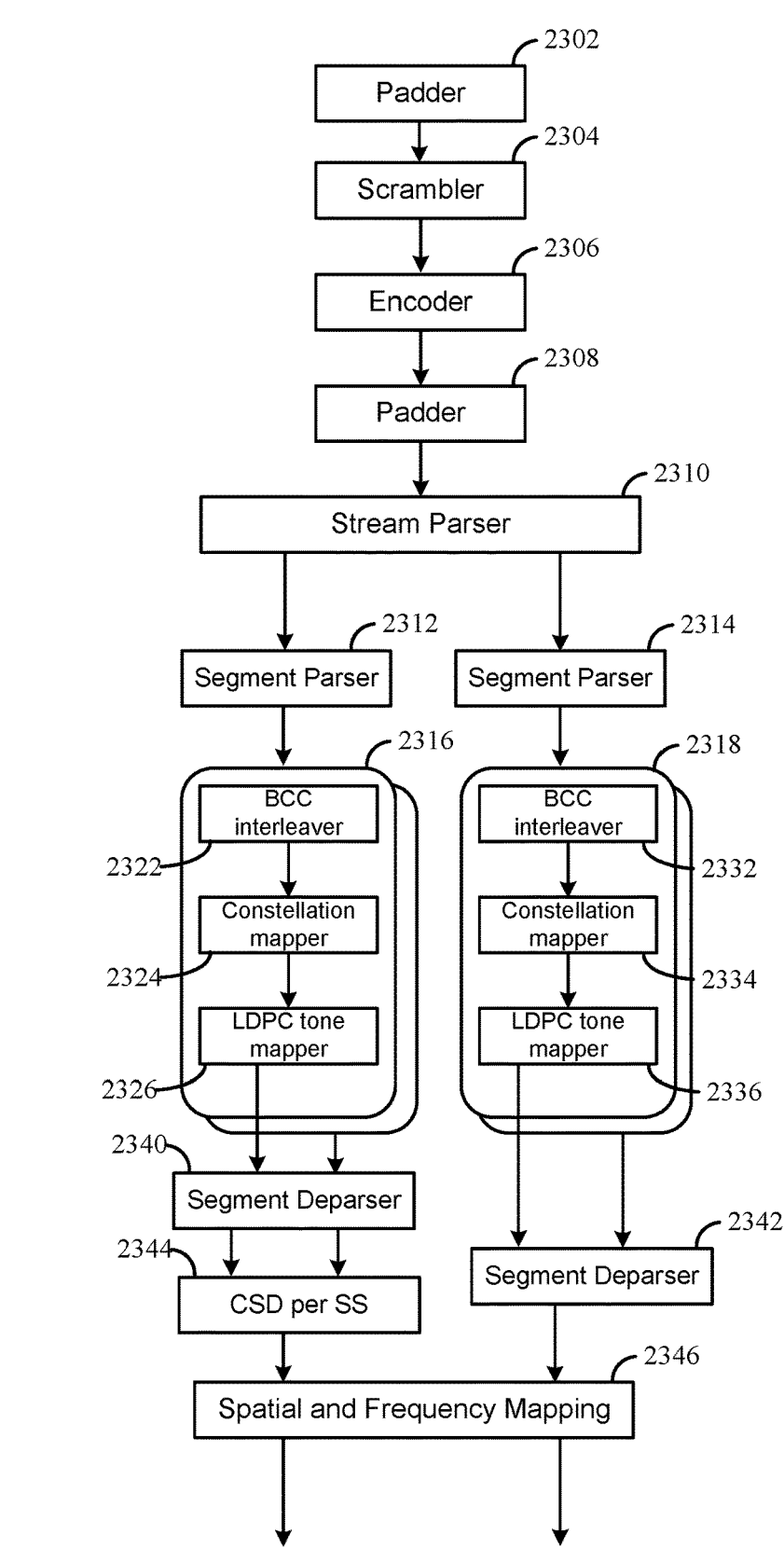
FIG. 23 shows a block diagram of an example of a distributed transmission process and distributed transmission architecture that is configured to perform distributed transmission for distribution bandwidths larger than 80 MHz.

Referring to FIG. 23, FIG. 23 illustrates an example distributed transmission process 2300 performable at a wireless communication device that is capable of or configured for enhanced distributed transmission tone mapping operations according to some aspects of the present disclosure. Distributed tone mapping process 2300 may be utilized by a device transmitting a PPDU with a distribution bandwidth greater than 80 MHz or a dRU size of 996 tones or more. For example, a distributed tone mapping architecture at a transmitting device (such as AP 102 or STA 104) is operable to perform distributed tone mapping. A receiving device can then recover the information carried (or modulated) on the distributed tones of the dRU for the corresponding allocated logical RU by performing a similar distributed tone damping process.

The distributed transmission process 2300 example illustrated in FIG. 23 is for a one-stage or a two-stage distributed tone mapping process. That is, the distributed transmission process may first map a signal to be transmitted over the distribution bandwidth to generate multiple partially mapped portions of the signal, and then individually processes the multiple partially mapped portions to further or fully map the OFDM symbols of the signal to tones. For example, the distributed transmission process 2300 maps allocated symbols to tones across the entire distribution bandwidth. In some examples, the distributed transmission first maps the symbols into groups or sets of symbols for each subchannel or spreading bandwidth of the distribution bandwidth. The distributed transmission process 2300 then further processes the groups of symbols for each subchannel or spreading bandwidth.

In FIG. 23, the distributed transmission architecture includes a padder 2302, a scrambler 2304, an encoder 2306, a padder 2308, a stream parser 2310, one or more segment parsers (first segment parser 2312 and second segment parser 2314), one or more segment processing sections, one or more segment deparsers (first segment deparser 2340 and second segment deparser 2342), a CSD 2344, and a spatial and frequency mapper 2346. In the example of FIG. 23, two segment processing sections are illustrated, a first segment processing section 2316, and a second segment processing section 2318. Each segment processing section, 2316 and 2318, may include one or more component per stream. To illustrate, each segment processing section includes an interleaver, a constellation mapper (such as symbol mapper or bit-to-symbol mapping)) and a tone mapper (such as symbol-to-tone mapping). As illustrated in FIG. 23, the first segment processing section 2316 includes a binary convolution coding (BCC) interleaver 2322, a constellation mapper 2324, and a low density parity check (LDPC) tone mapper 2326, and the second segment processing section 2318 includes a BCC interleaver 2332, a constellation mapper 2334, and a LDPC tone mapper 2336.

The padder 2302 and 2308 may be configured to add data, padded data, to received data (such as a data stream) to be transmitted. The padder 2302 (such as first padder or pre-encoding padder) may pad or add data, such as bits with a particular value (zero or one), prior to forward error correction (FEC) encoding, and the padder 2308 (such as second padder or post-encoding padder) may pad or add data, such as bits with a particular value (zero or one), after to FEC encoding.

The scrambler 2304 is configured to receive a padded data stream from the padder 2302 and scrambles the padded data stream. The encoder 2306 receives the scrambled stream and encodes the scrambled stream, such as by performing FEC encoding. The encoded data stream is provided to the padder 2308 for padding.

The stream parser 2310 is configured to parse encoded and padded data received from the padder 2308 to generate one or more streams (such as encoded streams). For example, the stream parser 2310 may generate one or more spatial streams based on the encoded and padded data. To illustrate, the stream parser 2310 may divide, partition, or segment the received data into multiple spatial streams.

The segment parsers 2312 and 2314 are each configured to receive a data stream, such as a spatial stream, from the stream parser 2310 and segment the data stream into one or data segments for processing by the segment processing sections.

The segment processing sections may include multiple processing sections for each path or spatial stream. Each segment processing section may be configured to process its encoded portion of the data to determine symbols to represent the encoded data and which tones or subcarriers on which to transmit the symbols. The BCC interleaver is configured to perform BCC interleaving. The BCC interleaver may not perform BCC interleaving in certain operational modes, such as in LDPC encoding modes. The constellation mapper may be configured to map a plurality of bits of a segment to a particular symbol of a symbol mapping constellation, referred to as a constellation symbol. The LDPC tone mapper may be configured to perform tone mapping for LDPC encoding and may map the identified symbols to particular tones or subcarriers of a segment or subchannel, such as the spreading bandwidth. Each LDPC tone mapper may map the constellation symbols to partially distribute tones over a corresponding segment or subchannel of the channel bandwidth or of the distribution bandwidth. The LDPC tone mapper may not perform LDPC tone mapping in certain operational modes, such as in BCC encoding modes.

The first segment deparser 2340 and the second segment deparser 2342 are each configured to deparse one or more processed data segments from the segment processing sections. For example, the segment deparsers may combine symbols from multiple segments by distributing or mapping (such as interleaving) the symbols from different segments together.

The CSD 2344 is configured to apply to cyclic shift delay to a received deparsed stream. As illustrated in the example of FIG. 23, each stream path may not have a CSD. For example, a first stream may not have a CSD, and each other stream may have a CSD.

The spatial and frequency mapper 2346 is configured to modulate received symbol data for one or more streams from each stream processing path across distributed tones of an entire distribution bandwidth. As compared to conventional architectures which may only have a spatial mapper, the spatial and frequency mapper 2346 may be configured to map symbols for multiple spatial streams and to perform a second stage of the distributed tone mapping process, such as first distributing partially distribute tones or interleaving partially distributed tones from a subchannel/spreading bandwidth over a distribution bandwidth, in some examples.

In the example of FIG. 23, a distribution bandwidth is 160 MHz, and the spreading bandwidth is 80 MHz. During operation, a transmitting device receives an allocation for one or more dRUs of a PPDU over the entire distribution bandwidth. The transmitting device determines data to be transmitted for the allocation and provide the data to the padder 2302. The padder 2302 adds one or more bits to the data to generate padded data and provides the padded data to the scrambler 2304. For example, the padder 2302 may add one or more bits with a value of zero, one, or a combination thereof to satisfy an amount of data of the allocation and/or to satisfy error checking.

The scrambler 2304 receives the padded data stream from the padder 2302 and scrambles the data. The scrambler 2304 provides the scrambled data to the encoder 2306. The encoder 2306 receives the scrambled padded data and performs FEC encoding on the scrambled padded data to generate encoded data, which is provided to the padder 2308. The padder 2308 optionally adds one or more bits to the encoded data to satisfy the data amount of the allocation or the error checking. The padded encoded data is provided the stream parser 2310.

The stream parser 2310 parses the encoded and padded data to generate one or more streams (such as encoded streams). For example, the stream parser 2310 may generate two spatial streams based on the encoded and padded data. To illustrate, the stream parser 2310 may divide, partition, or segment the received data into two streams and provide a first stream to the first segment parser 2312 and a second stream to the second segment parser 2314 streams.

The first segment parser 2312 parses the first stream to generate one or more first segments and the second segment parser 2314 parses the second stream to generate one or more second segments. For example, the segment parsers may be configured to perform proportional round robin segment parsing as described herein to generate the segments.

The first segments are provided to first segment processing sections and the second segments are provided to second segment processing sections. Each segment processing section processes its encoded portion of the data to determine symbols to represent the encoded data and to determine which tones or subcarriers on which to modulate the symbols on for transmission. The LDPC tone mapping may map the constellation symbols to the distributed tones according to a first portion of the distributed tone mapping for each section or segment.

The first segment deparser 2340 and the second segment deparser 2342 each receive a corresponding set of one or more processed data segments from a corresponding segment processing sections. For example, the first segment deparser 2340 receives a first set of processed data segments and combines the processed data segments to generate a first processed spatial stream. The second segment deparser 2342 receives a second set of processed data segments and combines the processed data segments to generate a second processed data stream or partially distributed data stream.

The CSD 2344 applies a cyclic shift delay to the second deparsed stream received from the second deparser and provides the adjusted second deparsed stream to the spatial and frequency mapper 2346.

The spatial and frequency mapper 2346 uses distributed tones for the entire distribution bandwidth for frequency mapping of received deparsed spatial streams. For example, the spatial and frequency mapper 2346 may use the interleaved tones for a distribution bandwidth that were generated based on interleaving tones from different segments/spreading bandwidths for frequency mapping. As another example, the spatial and frequency mapper 2346 may use the distributed tones from an upclocked tone plan for frequency mapping may use the distributed tones from a single spreading bandwidth and segment for frequency mapping as described herein.

Implementation examples are described in the following numbered clauses:

Clause 1. A wireless station, including one or more memories storing processor-readable code and one or more processors coupled with the one or more memories and individually or collectively operable to: receive, from an access point (AP), scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station; modulate a plurality of symbols for the PPDU onto the set of tones of the first dRU over the distribution bandwidth in accordance with a resource unit (RU) tone plan associated with a spreading bandwidth, where the spreading bandwidth is less than the distribution bandwidth; and transmit the plurality of symbols via the first dRU.

Clause 2. The wireless station of claim 1, where to modulate the plurality of symbols onto the set of tones of the first dRU the one or more processors are further operable to: map the plurality of symbols from a first logical RU across a spreading bandwidth in accordance with a dRU tone plan associated with the spreading bandwidth.

Clause 3. The wireless station of any of claim 1 or 2, where to map the plurality of symbols from the first logical RU across the spreading bandwidth in accordance with the dRU tone plan associated with the spreading bandwidth the one or more processors are further operable to: map data symbols of the plurality of symbols across the spreading bandwidth in accordance with the dRU tone plan associated with the spreading bandwidth; and map LTF symbols of the plurality of symbols across the spreading bandwidth in accordance with a dRU LTF tone plan associated with the spreading bandwidth.

Clause 4: The wireless station of any of claim 1 or 2, where to modulate the plurality of symbols onto the set of tones of the first dRU the one or more processors are further operable to: map a plurality of LTF symbols associated with the first logical RU across the spreading bandwidth in accordance with a dRU LTF tone plan associated with the spreading bandwidth.

Clause 5: The wireless station of any of claims 1-4, where the distribution bandwidth is less than the entirety of the wireless channel, and where the wireless channel has a bandwidth of 240 MHz or 320 MHz.

Clause 6: The wireless station of any of claims 1-4, where the spreading bandwidth is 80 MHz, and the distribution bandwidth is 160 MHz, 240 MHz, or 320 MHz.

Clause 7: The wireless station of any of claims 1-4, where the spreading bandwidth is 80 MHz and covers a first 80 MHz subchannel of the wireless channel, and where the one or more processors are further operable to: distribute the mapped plurality of symbols from the first 80 MHz subchannel across the distribution bandwidth of the wireless channel in accordance with an amount of dRUs of the one or more dRUs and an amount of 80 MHz subchannels of the wireless channel.

Clause 8: The wireless station of claim 7, where the plurality of symbols include data symbols and LTF symbols, where the LTF symbols are mapped over the spreading bandwidth in accordance with a dRU LTF tone plan associated with the spreading bandwidth and the dRU tone plan, and where the mapped LTF symbols are distributed across the distribution bandwidth of the wireless channel in accordance with the amount of dRUs of the one or more dRUs and the amount of 80 MHz subchannels of the wireless channel.

Clause 9: The wireless station of claim 8, where the LTF symbols correspond to a LTF sequence for the distribution bandwidth.

Clause 10: The wireless station of any of claim 1 or 2, where the spreading bandwidth is 80 MHz, where the distribution bandwidth is 160 MHz, 240 MHz, or 320 MHz, where to map the plurality of symbols across the spreading bandwidth the one or more processors are further operable to: segment the plurality of symbols associated with a first logical RU into corresponding 80 MHz subchannels of multiple 80 MHz subchannels of the wireless channel; and map the segmented symbols of each 80 MHz subchannels of the wireless channel across the spreading bandwidth in the respective subchannel in accordance with a dRU tone plan associated with the spreading bandwidth.

Clause 11: The wireless station of claim 10, where the distribution bandwidth of the PPDU spans the entire wireless channel and is continuous.

Clause 12: The wireless station of claim 10, where the wireless channel further includes one or more punctured portions of bandwidth which are not allocated to the PPDU and the plurality of symbols of the PPDU are not spread over the one or more punctured portions of bandwidth.

Clause 13: The wireless station of claim 10, where the modulated symbols include data symbols and LTF symbols, and where the LTF symbols are mapped in accordance with a dRU LTF tone plan associated with the spreading bandwidth and the dRU tone plan.

Clause 14: The wireless station of any of claim 1 or 2, where to modulate the plurality of symbols onto the set of tones of the first dRU the one or more processors are further operable to: divide tones associated with a first logical RU between 80 MHz subchannels of the distribution bandwidth according to a PRR parser to generate first tones for a first 80 MHz subchannel of the distribution bandwidth and second tones for a second 80 MHz subchannel of the distribution bandwidth; map first symbols of the plurality of symbols over the first tones of the first 80 MHz subchannel of the distribution bandwidth in accordance with a dRU tone plan associated with a spreading bandwidth; and map second symbols of the plurality of symbols over the second tones of the second 80 MHz subchannel of the distribution bandwidth in accordance with the dRU tone plan associated with the spreading bandwidth.

Clause 15: The wireless station of any of claim 1 or 2, where to modulate the plurality of symbols onto the set of tones of the first dRU the one or more processors are further operable to: reduce an amount of tones indicated by a first logical RU to generate quantized tones, where the amount of tones of the first logical RU is greater than an amount of tones of quantized tones; divide the quantized tones between 80 MHz subchannels of the distribution bandwidth according to a PRR parser to generate first tones for a first 80 MHz subchannel of the distribution bandwidth and second tones for a second 80 MHz subchannel of the distribution bandwidth; map first symbols of the plurality of symbols over the first tones of the first 80 MHz subchannel of the distribution bandwidth in accordance with a dRU tone plan associated with a spreading bandwidth; and map second symbols of the plurality of symbols over the second tones of the second 80 MHz subchannel of the distribution bandwidth in accordance with the dRU tone plan associated with the spreading bandwidth.

Clause 16: The wireless station of any of claim 1 or 2, where to modulate the plurality of symbols onto the set of tones of the first dRU the one or more processors are further operable to: divide tones associated with a first logical RU between 80 MHz subchannels of the distribution bandwidth according to a round robin parser to generate first tones for a first 80 MHz subchannel of the distribution bandwidth and second tones for a second 80 MHz subchannel of the distribution bandwidth; reduce an amount of tones of the first tones and an amount of tones the second tones in to generate first quantized tones and second quantized tones, where an amount of tones of the first quantized tones and an amount of tones the second quantized tones correspond to an amount of tones of a dRU tone plan associated with a spreading bandwidth; map first symbols of the plurality of symbols over the first quantized tones of the first 80 MHz subchannel of the distribution bandwidth in accordance with the dRU tone plan associated with the spreading bandwidth; and map second symbols of the plurality of symbols over the second quantized tones of the second 80 MHz subchannel of the distribution bandwidth in accordance with the dRU tone plan associated with the spreading bandwidth.

Clause 17: The wireless station of any of claim 1 or 2, where the distribution bandwidth is greater than the spreading bandwidth, where the spreading bandwidth is 80 MHz, and where to modulate the plurality of symbols onto the set of tones of the first dRU the one or more processors are further operable to: distribute the mapped symbols associated with the spreading bandwidth across the distribution bandwidth of the wireless channel according to an upclocked version of the dRU tone plan associated with the spreading bandwidth.

Clause 18: The wireless station of claim 17, where the plurality of symbols include data symbols and LTF symbols, where the LTF symbols are mapped over the spreading bandwidth in accordance with a dRU LTF tone plan associated with the spreading bandwidth and the dRU tone plan, and where the mapped LTF symbols are distributed across the distribution bandwidth of the wireless channel according to an upclocked version of the dRU tone plan associated with the spreading bandwidth.

Clause 19: The wireless station of claim 1, where the distribution bandwidth is greater than a spreading bandwidth, where the spreading bandwidth is 80 MHz, and where to modulate the plurality of symbols onto the set of tones of the first dRU the one or more processors are further operable to: map the plurality of symbols from a first logical RU across the distribution bandwidth in accordance with an upclocked version of a dRU tone plan associated with the spreading bandwidth.

Clause 20: The wireless station of claim 19, where the plurality of symbols includes data symbols and LTF symbols, and where the LTF symbols are mapped over the distribution bandwidth in accordance with an upclocked version of a dRU tone plan associated with the spreading bandwidth and the dRU tone plan.

Clause 21: The wireless station of any of claims 1-4, where the PPDU further includes one or more regular non-distributed resource units.

Clause 22: The wireless station of any of claims 1-4, where the scheduling information includes RU allocation information, and where the RU allocation information indicates a first logical RU allocated to the wireless station and corresponding to the first dRU.

Clause 23: The wireless station of claim 22, where, to receive the scheduling information and the RU allocation, the one or more processors are further operable to: receive a trigger frame including the scheduling information, the RU allocation information, and one or more of: dRU indication information that indicates that one or more of the allocated logical RUs comprise dRUs; distribution bandwidth information that indicates a distribution bandwidth associated with the one or more dRUs; spreading bandwidth information that indicates a spreading bandwidth associated with the one or more dRUs; dRU CSD start index information that identifies a starting CSD value for the one or more dRUs; or a combination thereof.

Clause 24: The wireless station of claim 23, where the one or more processors are further operable to: apply a CSD to a short training field (STF) associated with the PPDU in association with the dRU CSD start index information and a dRU tone plan associated with the distribution bandwidth.

Clause 25: The wireless station of claim 23, where the one or more processors are further operable to: receive the distribution bandwidth information, where the distribution bandwidth information is indicated by more than two bits, and where the dRU indication information is indicated on a per 80 MHz basis.

Clause 26: The wireless station of any of claim 1 or 2, where tone indices for dRUs in the distribution bandwidth of 160 MHz, including the first dRU, are derived from the following formula: $2*(dRU\_80+513-1)+Idx\_80-1025$, where $dRU\_80$ is a set of dRU tone indices in for a particular dRU size in 80 MHz and $Idx\_80$ is an index value of a particular 80 MHz segment.

Clause 27: The wireless station of any of claim 1 or 2, where tone indices for dRUs in the distribution bandwidth of 320 MHz, including the first dRU, are derived from the following formula: $2*(dRU\_80+513-1)+Idx\_80-2049$, where $dRU\_80$ is a set of dRU tone indices in for a particular dRU size in 80 MHz and $Idx\_80$ is an index value of a particular 80 MHz segment.

Clause 28: The wireless station of any of claim 1 or 2, where tone indices for a second dRU in the distribution bandwidth of 160 MHz, are equal to tone indices of a first dRU plus a tone shift.

Clause 29: The wireless station of any of claims 1-4, where only data and pilot tones of dRUs in 80 MHz are used for tone interleaving data tones, pilot tones, or both, across the distribution bandwidth.

Clause 30: The wireless station of any of claims 1-4, where one or more direct conversion (DC) tones of dRUs in 80 MHz are used for tone interleaving data tones, pilot tones, or both, across the distribution bandwidth.

Clause 31: The wireless station of any of claims 1-4, where to modulate the plurality of symbols onto the set of tones of the first dRU the one or more processors are further operable to: map the plurality of symbols from a first logical RU across the spreading bandwidth in accordance with a dRU tone plan associated with the spreading bandwidth where direct conversion (DC) tones and edge tones are reserved.

Clause 32: An AP, one or more memories storing processor-readable code and one or more processors coupled with the one or more memories and individually or collectively operable to: transmit, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and receive a plurality of symbols for the PPDU in accordance with a resource unit (RU) tone plan associated with a spreading bandwidth, where the spreading bandwidth is less than the distribution bandwidth.

Clause 33: The AP of claim 32, where the distribution bandwidth is equal to a spreading bandwidth, and where the wireless channel has a bandwidth of 160 MHz, 240 MHz, or 320 MHz, and where the one or more processors are further operable to: demap the plurality of symbols of the PPDU into sets of symbols in accordance with a dRU tone plan associated with the spreading bandwidth, each set of symbols corresponding to a respective dRU of the one or more dRUs; and demodulate the sets of symbols of the one or more dRUs to process the PPDU.

Clause 34: The AP of claim 33, where to demap the plurality of symbols the one or more processors are further operable to: demap a plurality of LTF symbols of the plurality of symbols in accordance with a dRU LTF tone plan associated with the spreading bandwidth.

Clause 35: The AP of claim 32, where a spreading bandwidth is 80 MHz and the distribution bandwidth is 160 MHz, 240 MHz, or 320 MHz, and where the one or more processors are further operable to: demap the plurality of symbols of the PPDU into sets of symbols in accordance with a dRU tone plan associated with the spreading bandwidth, each set of symbols corresponding to a respective dRU of the one or more dRUs; and demodulate the sets of symbols of the one or more dRUs to process the PPDU.

Clause 36: The AP of claim 35, where to demap the plurality of symbols into the sets of symbols the one or more processors are further operable to: deinterleave the plurality of symbols of the PPDU to respective dRUs of the one or more dRUs to segment the plurality of symbols into the sets of symbols in accordance with the dRU tone plan associated with the spreading bandwidth, an amount of dRUs of the one or more dRUs, and the distribution bandwidth; and demap the sets of symbols for each dRU of the one or more dRUs in accordance with the dRU tone plan associated with the spreading bandwidth.

Clause 37: The AP of claim 36, where to deinterleave the plurality of symbols the one or more processors are further operable to: perform fast Fourier transform (FFT) operations with decimation in frequency in a time domain across the distribution bandwidth of the wireless channel.

Clause 38: The AP of claim 32, where a spreading bandwidth is 80 MHz and the distribution bandwidth is 160 MHz, 240 MHz, or 320 MHz, and where the one or more processors are further operable to: determine sets of symbols of the plurality of symbols based on subchannels of the distribution bandwidth, each set of symbols corresponding to a respective subchannel of the subchannels of the distribution bandwidth; demap the sets of symbols of the plurality of symbols in each subchannel of the subchannels in accordance with a dRU tone plan associated with the spreading bandwidth; deinterleave the demapped symbols from the sets of symbols in accordance with an amount of subchannels of the distribution bandwidth; and demodulate the deinterleaved symbols to process the PPDU.

Clause 39: The AP of claim 38, where a first set of symbols of the plurality of symbols for a first dRU of the one or more dRUs are received on amount of tones that is less than an amount of tones allocated for a first logical RU of the PPDU which corresponds to the first dRU.

Clause 40: The AP of claim 32, where a spreading bandwidth is 80 MHz and the distribution bandwidth is 160 MHz, 240 MHz, or 320 MHz, and where the one or more processors are further operable to: demap the plurality of symbols of the PPDU into sets of symbols in accordance with an upclocked version of a dRU tone plan associated with the spreading bandwidth, each set of symbols corresponding to a respective dRU of the one or more dRUs; and demodulate the sets of symbols of the one or more dRUs to process the PPDU.

Clause 41: The AP of any of claim 32 or 33, where the one or more dRUs includes multiple dRUs, where the one or more stations includes a plurality of stations, and where the multiple dRU are received from the plurality of stations.

Clause 42: The AP of claim 36, where each station of the plurality of stations has a different CSD value, and where the one or more processors are further operable to: determine which dRUs of the one or more dRUs correspond to each station in association with the CSD values of the PPDU.

Clause 43: The AP of any of claim 32 or 33, where the PPDU further includes at least one non-distributed resource unit (rRU).

Clause 44: The AP of any of claim 32 or 33, where tone indices for the one or more dRUs in the distribution bandwidth of 160 MHz are derived from the following formula: $2*(dRU\_80+513-1)+Idx\_80-1025$, where dRU_80 is a set of dRU tone indices in for a particular dRU size in 80 MHz and Idx_80 is an index value of a particular 80 MHz segment.

Clause 45: The AP of any of claim 32 or 33, where tone indices for dRUs in the distribution bandwidth of 320 MHz, including the first dRU, are derived from the following formula: $2*(dRU\_80+513-1)+Idx\_80-2049$, where dRU_80 is a set of dRU tone indices in for a particular dRU size in 80 MHz and Idx_80 is an index value of a particular 80 MHz segment.

Clause 46: The AP of any of claim 32 or 33, where tone indices for a second dRU in the distribution bandwidth of 160 MHz, are equal to tone indices of a first dRU plus a tone shift.

Clause 47: The AP of any of claim 32 or 33, where only data and pilot tones of dRUs in 80 MHz are used for tone interleaving data tones, pilot tones, or both, across the distribution bandwidth.

Clause 48: The AP of any of claim 32 or 33, where one or more direct conversion (DC) tones of dRUs in 80 MHz are used for tone interleaving data tones, pilot tones, or both, across the distribution bandwidth.

Clause 49: The AP of any of claim 32 or 33, where to demap the symbols the one or more processors are further operable to: demap the plurality of symbols from a first logical RU across the spreading bandwidth in accordance with a dRU tone plan associated with the spreading bandwidth where direct conversion (DC) tones and edge tones are reserved.

Clause 50: The AP of any of claim 32 or 33, where to demap the symbols the one or more processors are further operable to: demap the plurality of symbols from a first logical RU across the spreading bandwidth in accordance with a dRU tone plan associated with the spreading bandwidth and utilizing direct conversion (DC) tones.

Clause 51: A wireless station, including one or more memories storing processor-readable code and one or more processors coupled with the one or more memories and individually or collectively operable to: receive, from an access point (AP), scheduling information for a PPDU to be transmitted by the AP over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU for the wireless station; and receive a plurality of symbols for the PPDU in accordance with a resource unit (RU) tone plan associated with a spreading bandwidth, where the spreading bandwidth is less than the distribution bandwidth.

Clause 52: An AP, including one or more memories storing processor-readable code and one or more processors coupled with the one or more memories and individually or collectively operable to: transmit, to a wireless station, scheduling information for a PPDU for the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU from the AP to the wireless station; and modulate a plurality of symbols for the PPDU onto the set of tones of the first dRU over the distribution bandwidth in accordance with a resource unit (RU) tone plan associated with a spreading bandwidth, where the spreading bandwidth is less than the distribution bandwidth; and transmit the plurality of symbols via the first dRU.

Clause 53: A method for wireless communication performed by a wireless STA, the method including: receiving, from an AP, scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station; modulating a plurality of symbols for the PPDU onto the set of tones of the first dRU; and transmitting the plurality of symbols via the first dRU.

Clause 54: An apparatus configured for wireless communication, the apparatus including: means for receiving, from an AP, scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station; means for modulating a plurality of symbols for the PPDU onto the set of tones of the first dRU; and means for transmitting the plurality of symbols via the first dRU.

Clause 55: A non-transitory computer-readable medium storing instructions that, when executed by a processor, cause the processor to perform operations including: receiving, from an AP, scheduling information for a PPDU to be transmitted by one or more wireless stations including the wireless station over a wireless channel, the scheduling information indicating one or more dRUs within the wireless channel, each dRU comprising a respective set of tones distributed across a distribution bandwidth of the wireless channel, the distribution bandwidth being larger than 80 MHz, the one or more dRUs including a first dRU allocated to the wireless station; modulating a plurality of symbols for the PPDU onto the set of tones of the first dRU; and transmitting the plurality of symbols via the first dRU.

Clause 56: A method for wireless communication performed by an AP, the method including: transmitting, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and receiving a plurality of symbols for the PPDU.

Clause 57: An apparatus configured for wireless communication, the apparatus including: means for transmitting, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and means for receiving a plurality of symbols for the PPDU.

Clause 58: A non-transitory computer-readable medium storing instructions that, when executed by a processor, cause the processor to perform operations including: transmitting, to one or more wireless stations, scheduling information for a PPDU to be transmitted by the one or more wireless stations over a wireless channel, the scheduling information indicating one or more dRUs within the wireless channel, each dRU comprising a respective set of tones distributed across a distribution bandwidth of the wireless channel, the distribution bandwidth being larger than 80 MHz; and receiving a plurality of symbols for the PPDU.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless station, comprising:
one or more memories storing processor-readable code; and
one or more processors coupled with the one or more memories and individually or collectively operable to:
receive, from an access point (AP), scheduling information for a physical layer (PHY) protocol data unit (PDU) (PPDU) to be transmitted by one or more wireless stations including the wireless station over a wireless channel, the scheduling information indicating one or more distributed resource units (dRUs) within the wireless channel, each dRU comprising a respective set of tones distributed across a distribution bandwidth of the wireless channel, the distribution bandwidth being larger than 80 MHz, the one or more dRUs including a first dRU allocated to the wireless station;
modulate a plurality of symbols for the PPDU onto the set of tones of the first dRU over the distribution bandwidth in accordance with a resource unit (RU) tone plan associated with a spreading bandwidth, wherein the spreading bandwidth is less than the distribution bandwidth; and
transmit the plurality of symbols via the first dRU.

2. The wireless station of claim 1, wherein to modulate the plurality of symbols onto the set of tones of the first dRU the one or more processors are further operable to:
map the plurality of symbols from a first logical RU across the spreading bandwidth in accordance with a dRU tone plan associated with the spreading bandwidth.

3. The wireless station of claim 2, wherein to map the plurality of symbols from the first logical RU across the spreading bandwidth in accordance with the dRU tone plan associated with the spreading bandwidth the one or more processors are further operable to:
map data symbols of the plurality of symbols across the spreading bandwidth in accordance with the dRU tone plan associated with the spreading bandwidth; and
map long training field (LTF) symbols of the plurality of symbols across the spreading bandwidth in accordance with a dRU LTF tone plan associated with the spreading bandwidth.

4. The wireless station of claim 2, wherein to modulate the plurality of symbols onto the set of tones of the first dRU the one or more processors are further operable to:
map a plurality of long training field (LTF) symbols associated with the first logical RU across the spreading bandwidth in accordance with a different dRU LTF tone plan associated with the spreading bandwidth.

5. The wireless station of claim 2, wherein the distribution bandwidth is less than the entirety of the wireless channel, and wherein the wireless channel has a bandwidth of 240 MHz or 320 MHz.

6. The wireless station of claim 2, wherein the spreading bandwidth is 80 MHz and the distribution bandwidth is 160 MHz, 240 MHz, or 320 MHz.

7. The wireless station of claim 2, wherein the spreading bandwidth is 80 MHz and covers a first 80 MHz subchannel of the wireless channel, and wherein the one or more processors are further operable to:
distribute the mapped plurality of symbols from the first 80 MHz subchannel across the distribution bandwidth of the wireless channel in accordance with an amount of dRUs of the one or more dRUs and an amount of 80 MHz subchannels of the wireless channel.

8. The wireless station of claim 7, wherein the plurality of symbols include data symbols and long training field (LTF) symbols, wherein the LTF symbols are mapped over the spreading bandwidth in accordance with a dRU LTF tone plan associated with the spreading bandwidth and the dRU tone plan, and wherein the mapped LTF symbols are distributed across the distribution bandwidth of the wireless channel in accordance with the amount of dRUs of the one or more dRUs and the amount of 80 MHz subchannels of the wireless channel.

9. The wireless station of claim 8, wherein the LTF symbols correspond to a LTF sequence for the distribution bandwidth.

10. The wireless station of claim 2, wherein the spreading bandwidth is 80 MHz, wherein the distribution bandwidth is 160 MHz, 240 MHz, or 320 MHz, wherein to map the plurality of symbols across the spreading bandwidth the one or more processors are further operable to:
segment the plurality of symbols associated with a first logical RU into corresponding 80 MHz subchannels of multiple 80 MHz subchannels of the wireless channel; and
map the segmented symbols of each 80 MHz subchannels of the wireless channel across the spreading bandwidth in the respective subchannel in accordance with a dRU tone plan associated with the spreading bandwidth.

11. The wireless station of claim 10, wherein the distribution bandwidth of the PPDU spans all of the tones of the entire wireless channel.

12. The wireless station of claim 10, wherein the wireless channel further includes one or more punctured subchannels that are not allocated to the one or more wireless stations and wherein the plurality of symbols of the PPDU are not spread over the one or more punctured subchannels.

13. The wireless station of claim 10, wherein the modulated symbols include data symbols and long training field (LTF) symbols, and wherein the LTF symbols are mapped in accordance with a dRU LTF tone plan associated with the spreading bandwidth and the dRU tone plan.

14. The wireless station of claim 1, wherein to modulate the plurality of symbols onto the set of tones of the first dRU the one or more processors are further operable to:

divide tones associated with a first logical RU between 80 MHz subchannels of the distribution bandwidth according to a proportional round robin (PRR) parser to generate first tones for a first 80 MHz subchannel of the distribution bandwidth and second tones for a second 80 MHz subchannel of the distribution bandwidth;

map first symbols of the plurality of symbols over the first tones of the first 80 MHz subchannel of the distribution bandwidth in accordance with a dRU tone plan associated with a spreading bandwidth; and map second symbols of the plurality of symbols over the second tones of the second 80 MHz subchannel of the distribution bandwidth in accordance with the dRU tone plan associated with the spreading bandwidth.

15. The wireless station of claim 1, wherein to modulate the plurality of symbols onto the set of tones of the first dRU the one or more processors are further operable to:

reduce an amount of tones indicated by a first logical RU to generate quantized tones, wherein the amount of tones of the first logical RU is greater than an amount of tones of quantized tones;

divide the quantized tones between 80 MHz subchannels of the distribution bandwidth according to a proportional round robin (PRR) parser to generate first tones for a first 80 MHz subchannel of the distribution bandwidth and second tones for a second 80 MHz subchannel of the distribution bandwidth;

map first symbols of the plurality of symbols over the first tones of the first 80 MHz subchannel of the distribution bandwidth in accordance with a dRU tone plan associated with a spreading bandwidth; and map second symbols of the plurality of symbols over the second tones of the second 80 MHz subchannel of the distribution bandwidth in accordance with the dRU tone plan associated with the spreading bandwidth.

16. The wireless station of claim 1, wherein to modulate the plurality of symbols onto the set of tones of the first dRU the one or more processors are further operable to:

divide tones associated with a first logical RU between 80 MHz subchannels of the distribution bandwidth according to a round robin parser to generate first tones for a first 80 MHz subchannel of the distribution bandwidth and second tones for a second 80 MHz subchannel of the distribution bandwidth;

reduce an amount of tones of the first tones and an amount of tones the second tones in to generate first quantized tones and second quantized tones, wherein an amount of tones of the first quantized tones and an amount of tones the second quantized tones correspond to an amount of tones of a dRU tone plan associated with a spreading bandwidth;

map first symbols of the plurality of symbols over the first quantized tones of the first 80 MHz subchannel of the distribution bandwidth in accordance with the dRU tone plan associated with the spreading bandwidth; and map second symbols of the plurality of symbols over the second quantized tones of the second 80 MHz subchannel of the distribution bandwidth in accordance with the dRU tone plan associated with the spreading bandwidth.

17. The wireless station of claim 2, wherein the distribution bandwidth is greater than the spreading bandwidth, wherein the spreading bandwidth is 80 MHz, and wherein to modulate the plurality of symbols onto the set of tones of the first dRU the one or more processors are further operable to:

distribute the mapped symbols associated with the spreading bandwidth across the distribution bandwidth of the wireless channel according to an upclocked version of the dRU tone plan associated with the spreading bandwidth.

18. The wireless station of claim 17, wherein the plurality of symbols include data symbols and long training field (LTF) symbols, wherein the LTF symbols are mapped over the spreading bandwidth in accordance with a dRU LTF tone plan associated with the spreading bandwidth and the dRU tone plan, and wherein the mapped LTF symbols are distributed across the distribution bandwidth of the wireless channel according to an upclocked version of the dRU tone plan associated with the spreading bandwidth.

19. The wireless station of claim 1, wherein the distribution bandwidth is greater than the spreading bandwidth, wherein the spreading bandwidth is 80 MHz, and wherein to modulate the plurality of symbols onto the set of tones of the first dRU the one or more processors are further operable to:

map the plurality of symbols from a first logical RU across the distribution bandwidth in accordance with an upclocked version of a dRU tone plan associated with the spreading bandwidth.

20. The wireless station of claim 19, wherein the plurality of symbols includes data symbols and long training field (LTF) symbols, and wherein the LTF symbols are mapped over the distribution bandwidth in accordance with an upclocked version of a dRU tone plan associated with the spreading bandwidth and the dRU tone plan.

21. The wireless station of claim 1, wherein the PPDU further includes one or more regular non-distributed resource units.

22. The wireless station of claim 1, wherein the scheduling information includes RU allocation information, and wherein the RU allocation information indicates a first logical RU allocated to the wireless station and corresponding to the first dRU.

23. The wireless station of claim 22, wherein, to receive the scheduling information and the RU allocation, the one or more processors are further operable to:

receive a trigger frame including the scheduling information, the RU allocation information, and one or more of:

dRU indication information that indicates that one or more of the allocated logical RUs comprise dRUs;

distribution bandwidth information that indicates a distribution bandwidth associated with the one or more dRUs;

spreading bandwidth information that indicates a spreading bandwidth associated with the one or more dRUs;

dRU cyclic shift delay (CSD) start index information that identifies a starting CSD value for the one or more dRUs; or a combination thereof.

24. The wireless station of claim 23, wherein the one or more processors are further operable to:

apply a CSD to a short training field (STF) associated with the PPDU in association with the dRU CSD start index information and a dRU tone plan associated with the distribution bandwidth.

25. The wireless station of claim 23, wherein the one or more processors are further operable to:

receive the distribution bandwidth information, wherein the distribution bandwidth information is indicated by more than two bits, and wherein the dRU indication information is indicated on a per 80 MHz basis.

26. The wireless station of claim 1, wherein tone indices for dRUs in the distribution bandwidth of 160 MHz, including the first dRU, are derived from the following formula: 2*(dRU_80+513−1)+Idx_80−1025, where dRU_80 is a set of dRU tone indices in for a particular dRU size in 80 MHz and Idx_80 is an index value of a particular 80 MHz segment.

27. The wireless station of claim 1, wherein tone indices for dRUs in the distribution bandwidth of 320 MHz, including the first dRU, are derived from the following formula: 2*(dRU_80+513−1)+Idx_80−2049, where dRU_80 is a set of dRU tone indices in for a particular dRU size in 80 MHz and Idx_80 is an index value of a particular 80 MHz segment.

28. The wireless station of claim 1, wherein tone indices for a second dRU in the distribution bandwidth of 160 MHz, are equal to tone indices of a first dRU plus a tone shift.

29. The wireless station of claim 1, wherein only data and pilot tones of dRUs in 80 MHz are used for tone interleaving data tones, pilot tones, or both, across the distribution bandwidth.

30. The wireless station of claim 1, wherein one or more direct conversion (DC) tones of dRUs in 80 MHz are used for tone interleaving data tones, pilot tones, or both, across the distribution bandwidth.

31. The wireless station of claim 1, wherein to modulate the plurality of symbols onto the set of tones of the first dRU the one or more processors are further operable to:

map the plurality of symbols from a first logical RU across the spreading bandwidth in accordance with a dRU tone plan associated with the spreading bandwidth where direct conversion (DC) tones and edge tones are reserved.

32. An access point (AP), comprising:

one or more memories storing processor-readable code; and one or more processors coupled with the one or more memories and individually or collectively operable to:

transmit, to one or more wireless stations, scheduling information for a physical layer (PHY) protocol data unit (PDU) (PPDU) to be transmitted by the one or more wireless stations over a wireless channel, the scheduling information indicating one or more distributed resource units (dRUs) within the wireless channel, each dRU comprising a respective set of tones distributed across a distribution bandwidth of the wireless channel, the distribution bandwidth being larger than 80 MHz; and receive a plurality of symbols for the PPDU in accordance with a resource unit (RU) tone plan associated with a spreading bandwidth, wherein the spreading bandwidth is less than the distribution bandwidth.

33. The AP of claim 32, wherein the wireless channel has a bandwidth of 160 MHz, 240 MHz, or 320 MHz, and wherein the one or more processors are further operable to:

demap the plurality of symbols of the PPDU into sets of symbols in accordance with a dRU tone plan associated with the spreading bandwidth, each set of symbols corresponding to a respective dRU of the one or more dRUs; and demodulate the sets of symbols of the one or more dRUs to process the PPDU.

34. The AP of claim 33, wherein to demap the plurality of symbols the one or more processors are further operable to:

demap a plurality of long training field (LTF) symbols of the plurality of symbols in accordance with a dRU LTF tone plan associated with the spreading bandwidth.

35. The AP of claim 32, wherein the spreading bandwidth is 80 MHz and the distribution bandwidth is 160 MHz, 240 MHz, or 320 MHz, and wherein the one or more processors are further operable to:

demap the plurality of symbols of the PPDU into sets of symbols in accordance with a dRU tone plan associated with the spreading bandwidth, each set of symbols corresponding to a respective dRU of the one or more dRUs; and demodulate the sets of symbols of the one or more dRUs to process the PPDU.

36. The AP of claim 35, wherein to demap the plurality of symbols into the sets of symbols the one or more processors are further operable to:

deinterleave the plurality of symbols of the PPDU to respective dRUs of the one or more dRUs to segment the plurality of symbols into the sets of symbols in accordance with the dRU tone plan associated with the spreading bandwidth, an amount of dRUs of the one or more dRUs, and the distribution bandwidth; and demap the sets of symbols for each dRU of the one or more dRUs in accordance with the dRU tone plan associated with the spreading bandwidth.

37. The AP of claim 36, wherein to deinterleave the plurality of symbols the one or more processors are further operable to:

perform fast Fourier transform (FFT) operations with decimation in frequency in a time domain across the distribution bandwidth of the wireless channel.

38. The AP of claim 32, wherein the spreading bandwidth is 80 MHz and the distribution bandwidth is 160 MHz, 240 MHz, or 320 MHz, and wherein the one or more processors are further operable to:

determine sets of symbols of the plurality of symbols based on subchannels of the distribution bandwidth, each set of symbols corresponding to a respective subchannel of the subchannels of the distribution bandwidth;

demap the sets of symbols of the plurality of symbols in each subchannel of the subchannels in accordance with a dRU tone plan associated with the spreading bandwidth;

deinterleave the demapped symbols from the sets of symbols in accordance with an amount of subchannels of the distribution bandwidth; and demodulate the deinterleaved symbols to process the PPDU.

39. The AP of claim 38, wherein a first set of symbols of the plurality of symbols for a first dRU of the one or more dRUs are received on amount of tones that is less than an amount of tones allocated for a first logical RU of the PPDU which corresponds to the first dRU.

40. The AP of claim 32, wherein the spreading bandwidth is 80 MHz and the distribution bandwidth is 160 MHz, 240 MHz, or 320 MHz, and wherein the one or more processors are further operable to:

demap the plurality of symbols of the PPDU into sets of symbols in accordance with an upclocked version of a dRU tone plan associated with the spreading bandwidth, each set of symbols corresponding to a respective dRU of the one or more dRUs; and demodulate the sets of symbols of the one or more dRUs to process the PPDU.

41. The AP of claim 32, wherein the one or more dRUs includes multiple dRUs, wherein the one or more stations includes a plurality of stations, and wherein the multiple dRU are received from the plurality of stations.

42. The AP of claim 41, wherein each station of the plurality of stations has a different cyclic shift delay (CSD) value, and wherein the one or more processors are further operable to:

determine which dRUs of the one or more dRUs correspond to each station in association with the CSD values of the PPDU.

43. The AP of claim 32, wherein the PPDU further includes at least one non-distributed resource unit (rRU).

44. The AP of claim 32, wherein tone indices for the one or more dRUs in the distribution bandwidth of 160 MHz are derived from the following formula: $2*(\text{dRU\_80}+513-1)+ \text{Idx\_80}-1025$, where dRU_80 is a set of dRU tone indices in for a particular dRU size in 80 MHz and Idx_80 is an index value of a particular 80 MHz segment.

45. The AP of claim 32, wherein tone indices for the one or more dRUs in the distribution bandwidth of 320 MHz are derived from the following formula: $2*(\text{dRU\_80}+513-1)+ \text{Idx\_80}-2049$, where dRU_80 is a set of dRU tone indices in for a particular dRU size in 80 MHz and Idx_80 is an index value of a particular 80 MHz segment.

46. The AP of claim 32, wherein tone indices for a second dRU of the one or more dRUs in the distribution bandwidth of 160 MHz, are equal to tone indices of a first dRU of the one or more dRUs plus a tone shift.

47. The AP of claim 32, wherein only data and pilot tones of dRUs in 80 MHz are used for tone interleaving data tones, pilot tones, or both, across the distribution bandwidth.

48. The AP of claim 32, wherein one or more direct conversion (DC) tones of dRUs in 80 MHz are used for tone interleaving data tones, pilot tones, or both, across the distribution bandwidth.

49. The AP of claim 32, wherein to demap the symbols the one or more processors are further operable to:

demap the plurality of symbols from a first logical RU across the spreading bandwidth in accordance with a dRU tone plan associated with the spreading bandwidth where direct conversion (DC) tones and edge tones are reserved.

50. The AP of claim 32, wherein to demap the symbols the one or more processors are further operable to:

demap the plurality of symbols from a first logical RU across the spreading bandwidth in accordance with a dRU tone plan associated with the spreading bandwidth and utilizing direct conversion (DC) tones.

51. A wireless station, comprising:

one or more memories storing processor-readable code; and one or more processors coupled with the one or more memories and individually or collectively operable to:

receive, from an access point (AP), scheduling information for a physical layer (PHY) protocol data unit (PDU) (PPDU) to be transmitted by the AP over a wireless channel, the scheduling information indicating one or more distributed resource units (dRUs) within the wireless channel, each dRU comprising a respective set of tones distributed across a distribution bandwidth of the wireless channel, the distribution bandwidth being larger than 80 MHz, the one or more dRUs including a first dRU for the wireless station; and receive a plurality of symbols for the PPDU in accordance with a resource unit (RU) tone plan associated with a spreading bandwidth, wherein the spreading bandwidth is less than the distribution bandwidth.

52. An access point (AP), comprising:

one or more memories storing processor-readable code; and one or more processors coupled with the one or more memories and individually or collectively operable to:

transmit, to a wireless station, scheduling information for a physical layer (PHY) protocol data unit (PDU) (PPDU) for the wireless station over a wireless channel, the scheduling information indicating one or more distributed resource units (dRUs) within the wireless channel, each dRU comprising a respective set of tones distributed across a distribution bandwidth of the wireless channel, the distribution bandwidth being larger than 80 MHz, the one or more dRUs including a first dRU from the AP to the wireless station; and modulate a plurality of symbols for the PPDU onto the set of tones of the first dRU over the distribution bandwidth in accordance with a resource unit (RU) tone plan associated with a spreading bandwidth, wherein the spreading bandwidth is less than the distribution bandwidth; and transmit the plurality of symbols via the first dRU.

* * * * *